US012017188B2

(12) United States Patent
Diallo et al.

(10) Patent No.: US 12,017,188 B2
(45) Date of Patent: Jun. 25, 2024

(54) DENDRIMER PARTICLES AND RELATED MIXED MATRIX FILTRATION MEMBRANES, COMPOSITIONS, METHODS, AND SYSTEMS

(71) Applicants: CALIFORNIA INSTITUTE OF TECHNOLOGY, Pasadena, CA (US); KOREA ADVANCED INSTITUTE OF SCIENCE AND TECHNOLOGY, Daejeon (KR)

(72) Inventors: Mamadou S. Diallo, Pasadena, CA (US); Madhusudhana Rao Kotte, Daejeon (KR); Alex Kuvarega, Daejeon (KR)

(73) Assignees: CALIFORNIA INSTITUTE OF TECHNOLOGY, Pasadena, CA (US); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 0 days.

(21) Appl. No.: 17/524,572

(22) Filed: Nov. 11, 2021

(65) Prior Publication Data
US 2022/0323911 A1    Oct. 13, 2022

Related U.S. Application Data

(63) Continuation of application No. 15/011,547, filed on Jan. 30, 2016, now abandoned.

(60) Provisional application No. 62/164,903, filed on May 21, 2015, provisional application No. 62/110,319, filed on Jan. 30, 2015.

(51) Int. Cl.
| *B01D 69/14* | (2006.01) |
| *B01D 61/02* | (2006.01) |
| *B01D 61/14* | (2006.01) |
| *B01D 67/00* | (2006.01) |
| *B01D 69/12* | (2006.01) |
| *B01D 71/34* | (2006.01) |
| *B01D 71/56* | (2006.01) |
| *B01D 71/60* | (2006.01) |
| *C02F 1/28* | (2023.01) |
| *C02F 1/44* | (2023.01) |
| *C02F 101/20* | (2006.01) |

(52) U.S. Cl.
CPC ......... *B01D 69/141* (2013.01); *B01D 61/145* (2013.01); *B01D 67/0006* (2013.01); *B01D 67/0011* (2013.01); *B01D 69/12* (2013.01); *B01D 69/125* (2013.01); *B01D 71/60* (2013.01); *C02F 1/285* (2013.01); *C02F 1/444* (2013.01); *B01D 61/025* (2013.01); *B01D 67/0009* (2013.01); *B01D 71/34* (2013.01); *B01D 71/56* (2013.01); *B01D 2323/30* (2013.01); *B01D 2323/39* (2013.01); *B01D 2323/42* (2013.01); *C02F 2101/20* (2013.01)

(58) Field of Classification Search
CPC ................ B01D 69/141; B01D 61/145; B01D 67/0006; B01D 67/0011; B01D 69/12; B01D 69/125; B01D 71/60; B01D 61/025; B01D 67/0009; B01D 71/34; B01D 71/56; B01D 2323/30; B01D 2323/39; B01D 2323/42; C02F 1/285; C02F 1/444; C02F 2101/20
See application file for complete search history.

(56) References Cited

U.S. PATENT DOCUMENTS

| 9,302,922 B2 | 4/2016 | Diallo et al. |
| 11,090,616 B2* | 8/2021 | Diallo ................. B01D 67/0013 |
| 11,465,101 B2* | 10/2022 | Diallo ................... B01D 69/12 |
| 2007/0298006 A1* | 12/2007 | Tomalia ............... A61K 9/0019 525/509 |
| 2012/0018382 A1 | 1/2012 | Stein |
| 2013/0213881 A1 | 8/2013 | Diallo et al. |
| 2015/0217236 A1* | 8/2015 | Nishimura ............. B01D 71/02 427/244 |

FOREIGN PATENT DOCUMENTS

| JP | 2014-46305 A  * 3/2014 |
| JP | 2014046305 A  * 3/2014 ........... B01D 53/228 |

(Continued)

OTHER PUBLICATIONS

Corrected Notice of Allowability for U.S. Appl. No. 16/459,299, filed Jul. 1, 2019, on behalf of California Institute of Technology. Mail Date: Jun. 8, 2022. 8 Pages.
Non-Final Office Action for U.S. Appl. No. 16/459,299, filed Jul. 1, 2019, on behalf of California Institute of Technology. Mail Date: Jul. 22, 2021. 23 Pages.
Non-Final Office Action for U.S. Appl. No. 16/039,160, filed Jul. 18, 2018 on behalf of California Institute of Technology Mail Date: Sep. 10, 2020. 8 pages.
Notice of Allowance for U.S. Appl. No. 16/459,299, filed Jul. 1, 2019 on behalf of California Institute of Technology Mail Date: May 3, 2022. 23 pages.
Notice of Allowance for U.S. Appl. No. 16/039,160, filed Jul. 18, 2018 on behalf of California Institute of Technology. Mail Date: Jan. 15, 2021. 9 Pages.

(Continued)

*Primary Examiner* — Ryan B Huang
(74) *Attorney, Agent, or Firm* — Steinfl + Bruno LLP

(57) ABSTRACT

Described herein are mixed matrix filtration membranes and related, dendrimers, dendrimer particles, compositions, methods and systems and in particular mixed matrix filtration membranes with an embedded dendrimer particles and related compositions, methods, and systems wherein each dendrimer particle comprises at least two dendrimers each having at least two core chemical moieties having a core multiplicity Nc; branch cell units attached to the core chemical moiety or one to another, with the branch cell units attached one to another having a branch cells multiplicity Nb; and a number of surface functional groups Z presented on terminal branch cell units, wherein $Z=N_c N_b^G$ with $G \leq 3$.

11 Claims, 59 Drawing Sheets

(56) References Cited

FOREIGN PATENT DOCUMENTS

WO     2013/116408 A1     8/2013
WO     2016/123594 A1     8/2016

OTHER PUBLICATIONS

Strathmann H. et al., "An Introduction to Membrane Science and Technology, Chapter 1", 2006, Institute on Membrane Technology, CNR-ITM, University of Calabria, Rende (CS), Italy. 27 pgs.

Zhang, B. et al. "Synthetic regimes due to packing constraints in dendritic molecules confirmed by labelling experiments", Nature Communications, 4:1993. Published Jun. 13, 2013. 9 pages. Doi: 10.1038/ncomms2993.

Britannica: "Polarity Chemistry". From TheWaybackMachine for Jan. 13, 2023. 16 pages. Website: www.britannica.com/science/polarity-chemistry.

"Eastman TEP (Triethyl Phosphate)" Downloaded from SpecialChem, The material selection platform, on Jan. 13, 2023. 8 pages. Website: polymer-additives.specialchem.com/product/a-eastman-tep-triethyl-phosphate.

* cited by examiner

| Number of Surface Groups | : | $Z = N_c N_b^G$ | | Surface Group Amplification/Gen. |

| Number of Branch Cells | : | $BC = N_c \left[ \dfrac{N_b^G - 1}{N_b - 1} \right]$ | = | Number of Covalent Bonds Formed/Generation |

| Molecular Weights | : | $MW = M_c + N_c \left[ M_{RU} \left( \dfrac{N_b^G - 1}{N_b - 1} \right) + M_t N_b^G \right]$ |

(a) Alkylation Chemistry (Amplification)

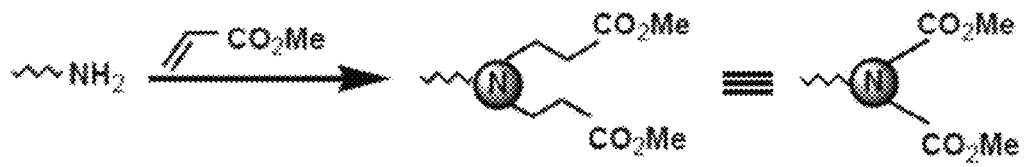

Half Generations = Gn.5

(b) Amidation Chemistry

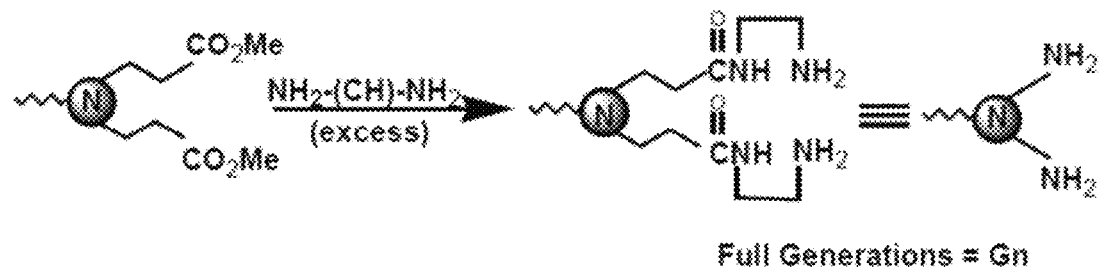

Full Generations = Gn

FIG. 4

A. G0-NH₂ PAMAM
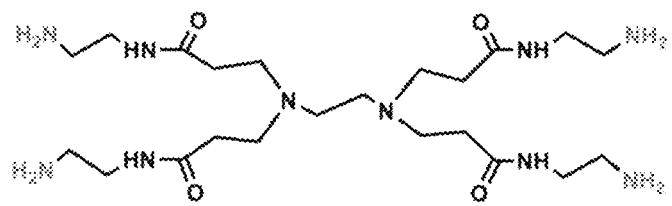
B. G1-NH2 PAMAM
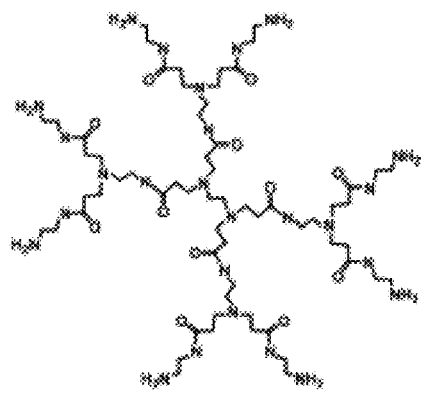
B. G2-NH₂ PAMAM
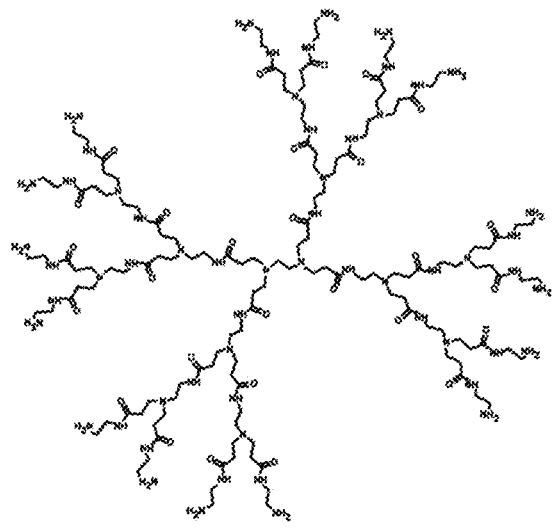
FIG. 9

A. G1-NH₂ PPI
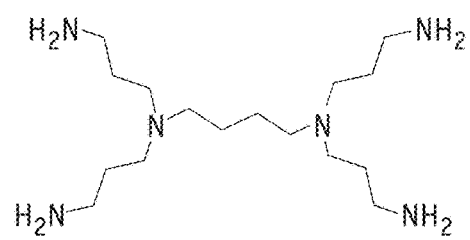
B. G2-NH₂ PPI
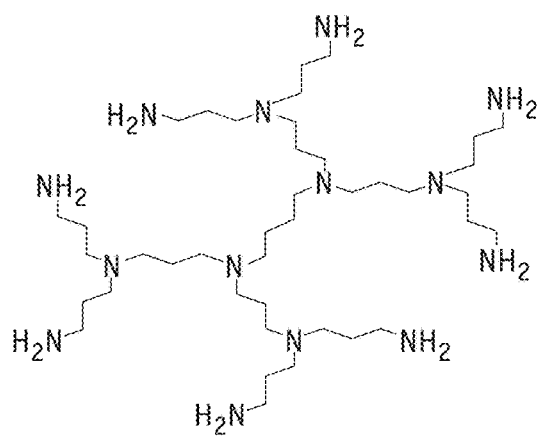
| dendrimer generation (G) | molecular formula | molecular weight | # primary amine endgroups | # interior tertiary amines |
|---|---|---|---|---|
| 1 | $C_{16}N_6H_{40}$ | 316.5 | 4 | 2 |
| 2 | $C_{40}N_{14}H_{96}$ | 773.3 | 8 | 6 |
*FIG. 11*

Phosphorus Dendrimer Structure

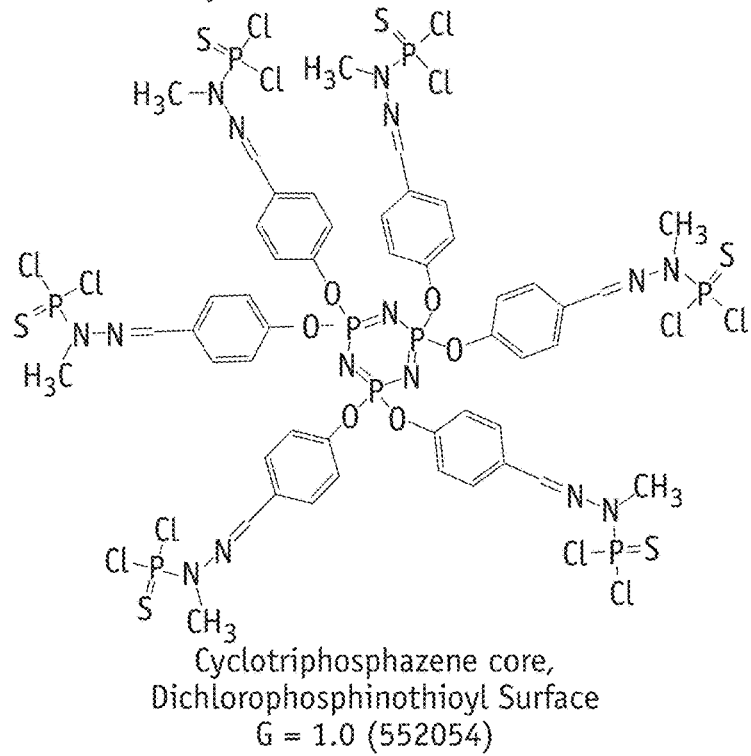

Cyclotriphosphazene core,
Dichlorophosphinothioyl Surface
G = 1.0 (552054)

| Formula | Surface group | Solubility | Stability |
|---|---|---|---|
| ⬡—⌬—OH | Hydroxy | Organic solvent | +++ |
| ⬡—⌬—COOH | Sodium Carboxylate | Water | +++ |
| ⬡—⌬—HN-R | Secondary Amine | Water | +++ |
| ⬡—⌬—N-R | Imine | Organic solvent | - |
| ⬡—⌬—P(O)(ONa)(OH)—HN-R | Alpha-imino phosphonic acid | Water | +++ |
| ⬡—⌬—P(S)(HN-NH+)(N-N-NH+) | Tertiary amine | Water | ++ |

FIG. 13

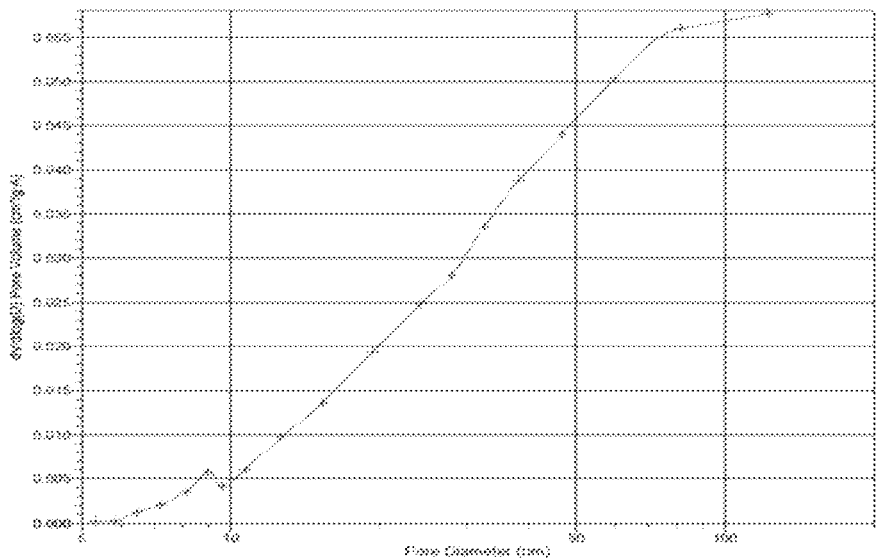
A. Barrett-Joyner-Halenda adsorption pore volume
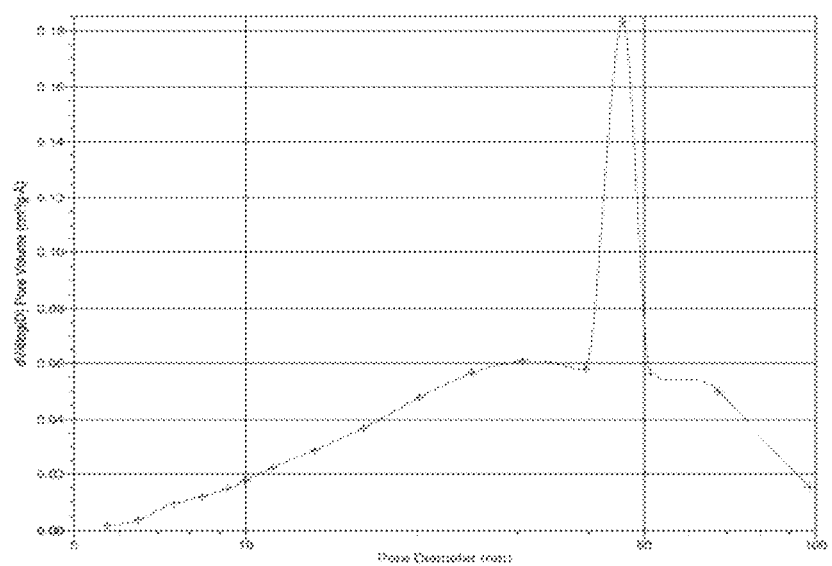
B. Barrett-Joyner-Halenda desorption pore volume
FIG. 24

A. Barrett-Joyner-Halenda adsorption pore volume
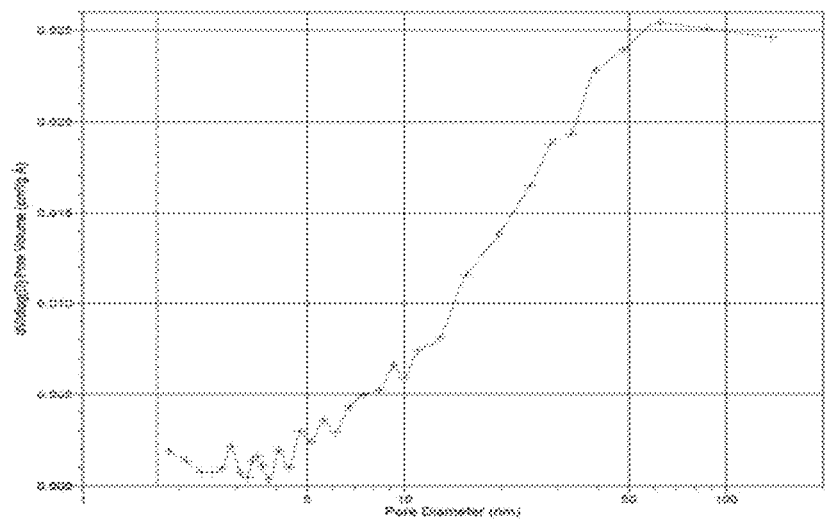
B. Barrett-Joyner-Halenda desorption pore volume
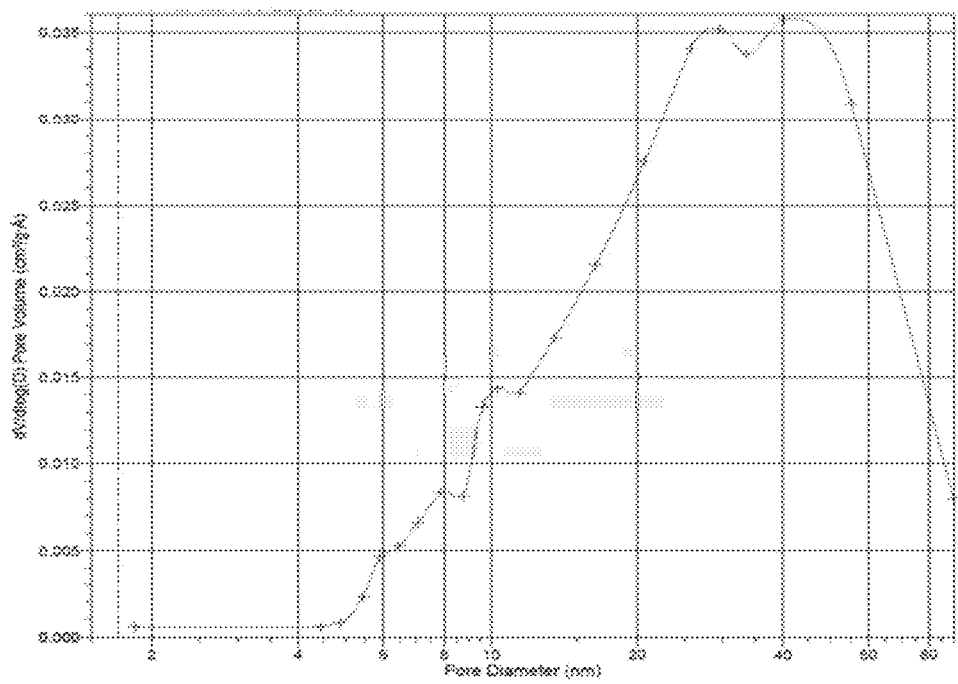
FIG. 25

A. Barrett-Joyner-Halenda adsorption pore volume
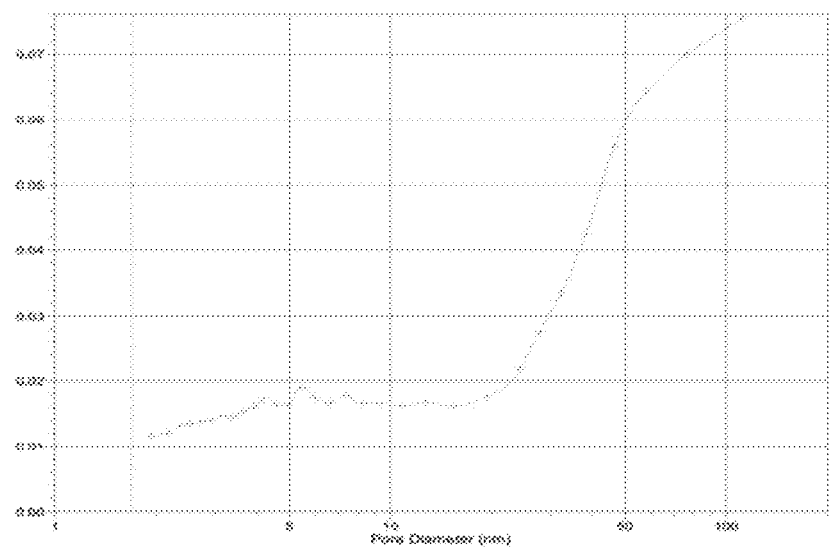
B. Barrett-Joyner-Halenda desorption pore volume
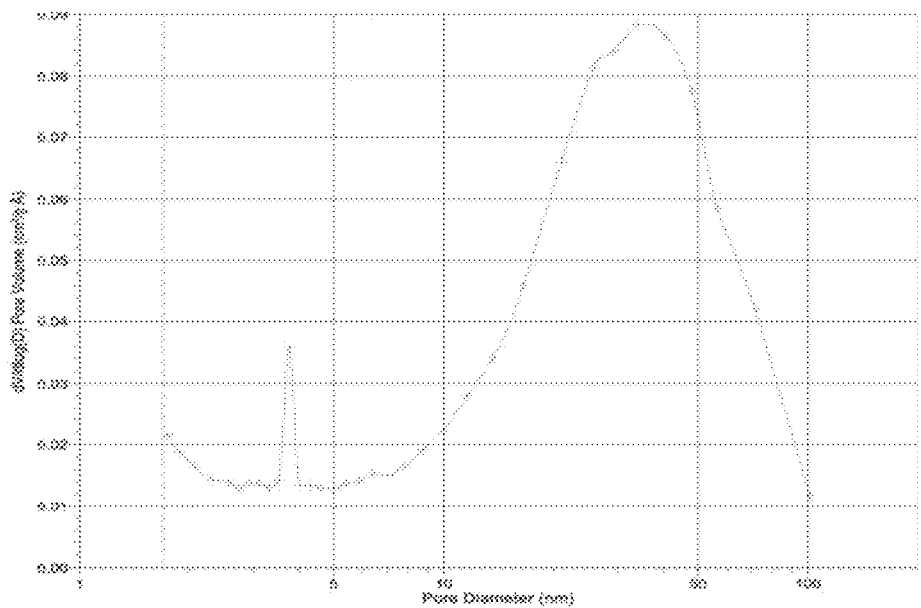
FIG. 26

| Time (Minutes) | DIW Flux @ pH 7.0 (LMH) | |
|---|---|---|
| | MDP-G0 | MDP-G1 |
| 0 | 0 | 0 |
| 5 | 440.66 | 107.14 |
| 10 | 440.11 | 108.24 |
| 15 | 439.01 | 107.69 |
| 20 | 436.26 | 108.79 |
| 25 | 433.52 | 109.89 |
| 30 | 420.88 | 109.34 |
| 35 | 433.52 | 109.89 |
| 40 | 397.25 | 107.69 |
| 45 | 429.67 | 105.49 |
| 50 | 413.19 | 106.04 |
| 55 | 416.48 | 99.45 |
| 60 | 423.63 | 98.9 |
| Average | 427.02 | 106.55 |
| SD | 13.20 | 3.71 |

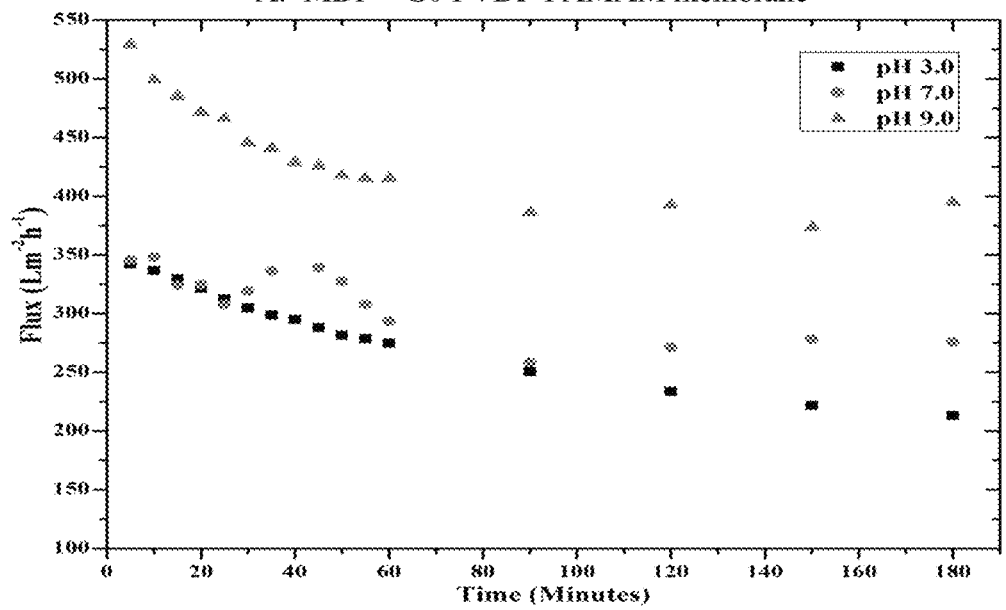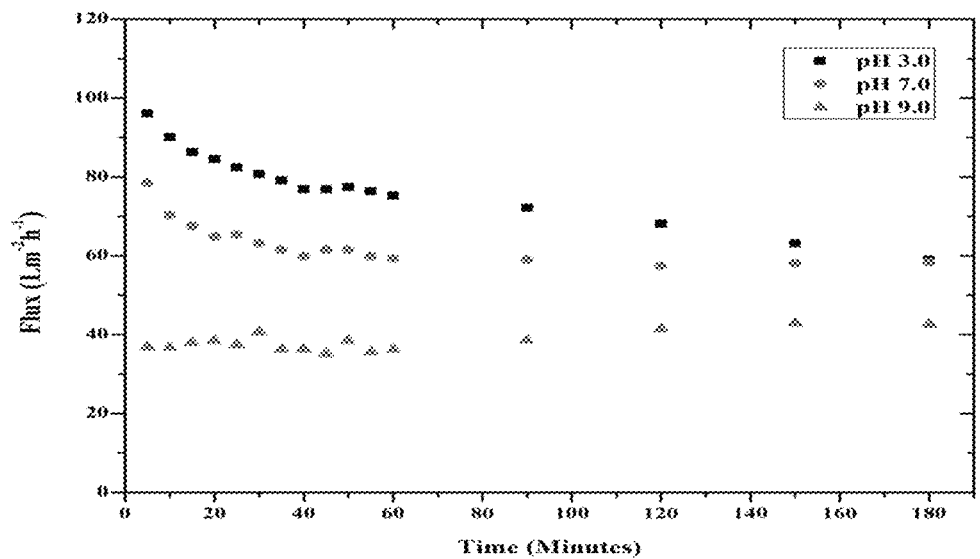
FIG. 32

A. Membrane preparation
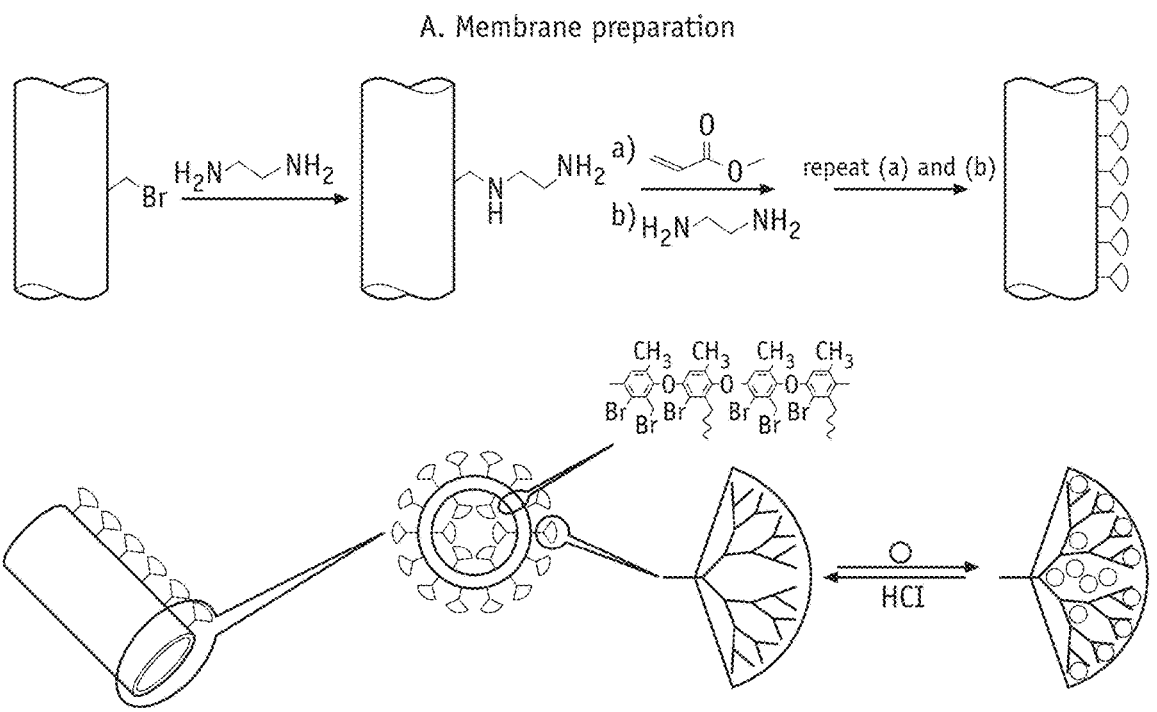
B. SEM images of a Cu(II) loaded G3-NH$_2$ Dendronized PAMAM hollow fiber membrane
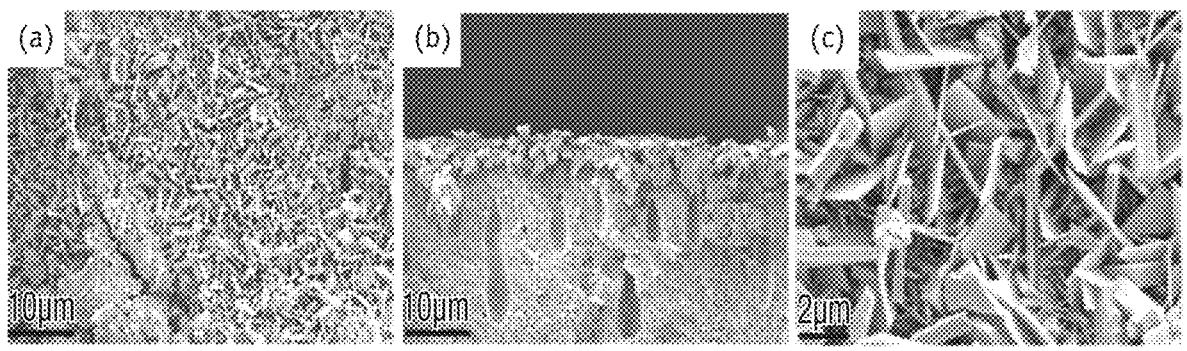
FIG. 37

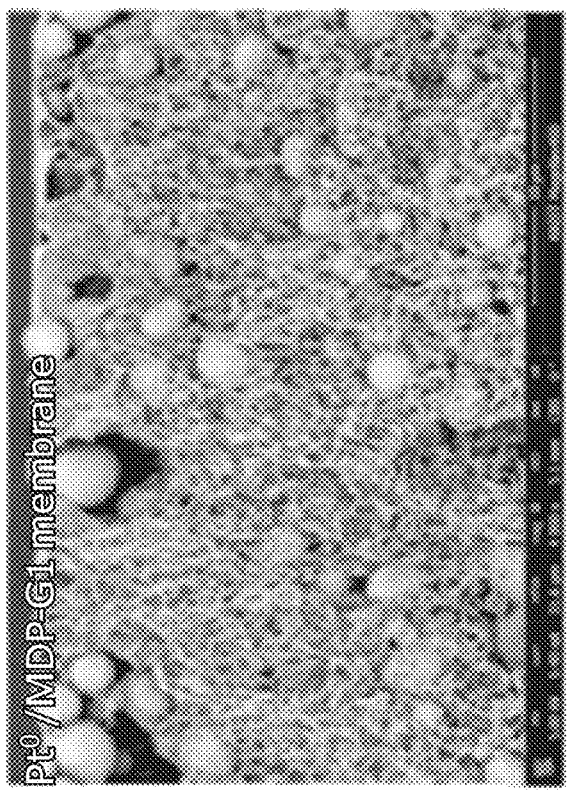
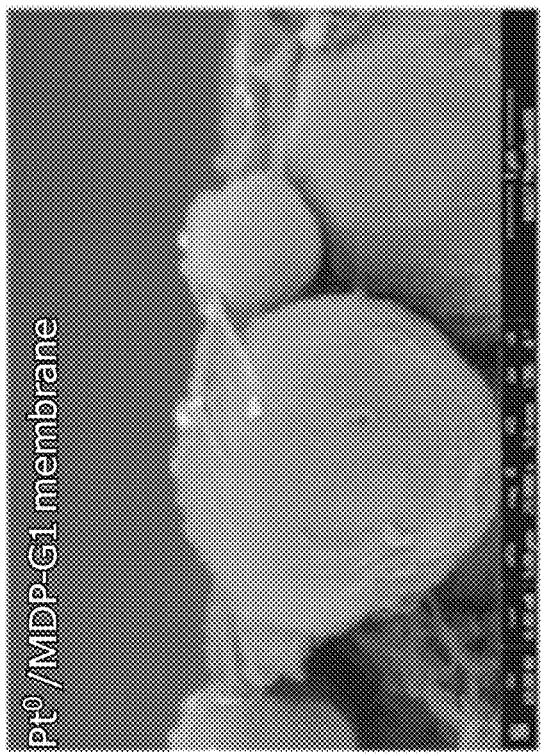
FIG. 43

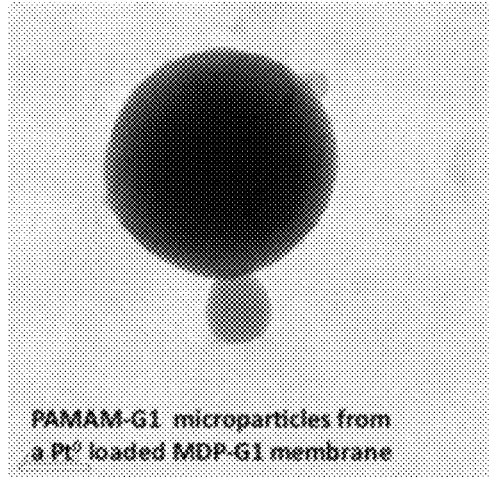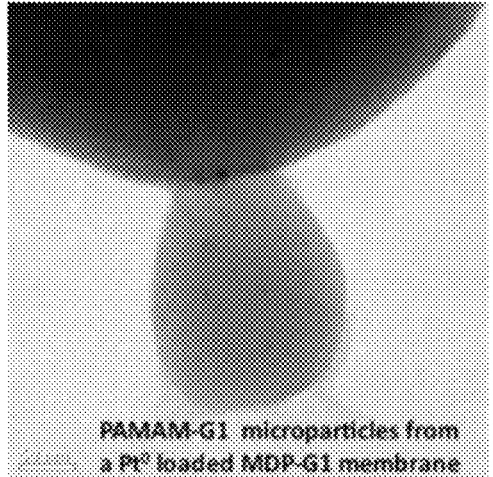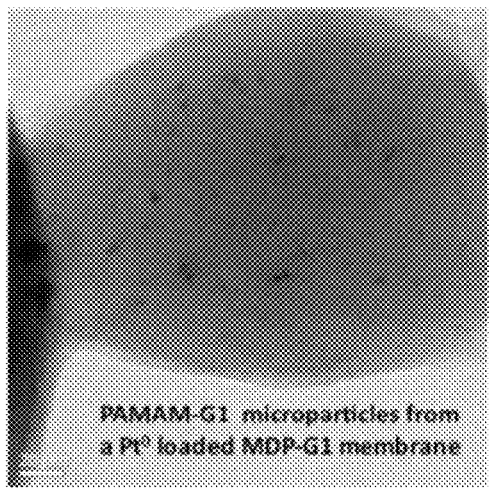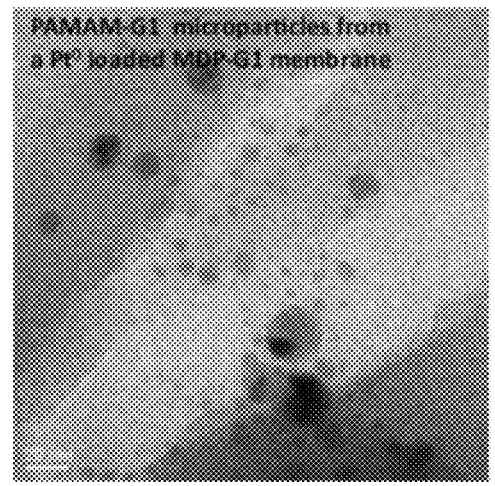
FIG. 47

| Entry | Substrate | Product* | Time (h) | Yield (%) |
|---|---|---|---|---|
| 1 | cyclohexene | cyclohexane | 12.0 | 98 |
| 2 | cyclooctene | cyclooctane | 12.0 | 95 |
| 3 | 1-hexyne | hexane | 12.0 | 98 |
| 4 | 1-hexene | hexane | 12.0 | 96 |
| 5 | 1,5-hexadiene | hexane | 12.0 | 95 |
| 6 | trans-2-hexene | hexane | 24.0 | 0 |
| 7 | mesitylene | 1,3,5-trimethylcyclohexane | 24.0 | 0 |

*The products were characterized by $^1$H NMR and GC.

| Metal Ion | [a]Ionic Radius Å | [b]Pearson HASB Classification | [c]log $K_1$ (OH⁻) | [c]log $K_1$ ($NH_3$) | [c]log $K_1$ (Imidazole) | [c]log $K_1$ ($HOCH_2CH_2S^-$) |
|---|---|---|---|---|---|---|
| $Na^+$ | 1.02 | Hard | -0.20 | 0.043 | -0.17 | 0.208 |
| $Ca^{2+}$ | 1.00 | Hard | 1.30 | 0.09 | 1.14 | -0.07 |
| $Mg^{2+}$ | 0.72 | Hard | 2.50 | 0.19 | 2.34 | -1.42 |
| $Li^+$ | 0.70 | Hard | 0.36 | -0.30 | 0.32 | -1.14 |
| $Cu^{2+}$ | 0.57 | Borderline | 6.52 | 4.40 | 6.33 | 8.09 |
| $Ni^{2+}$ | 0.69 | Borderline | 4.20 | 2.41 | 4.14 | 3.14 |
| $Co^{2+}$ | 0.74 | Borderline | 3.90 | 1.97 | 3.69 | 3.06 |
| [d]$VO^{2+}$ | 0.93 | Hard | 8.30 | 3.20 | 7.64 | 5.63 |
| $Ag^+$ | 1.15 | Soft | 2.02 | 3.41 | 1.76 | 11.34 |
| $Au^+$ | 1.37 | Soft | 2.66 | 5.59 | 2.34 | 18.77 |
| [e]$UO_2^{2+}$ | 1.80 | Hard | 8.25 | 1.92 | 7.34 | 3.42 |

[a]Data taken from Martell and Hancok.[1]

[b]Classification taken from Martell and Hancok.[1]

[c]The stability constant (log $K_1$) of each metal ion was estimated using a modified Drago equation.

[d]Data taken from Karamat et al.[4]

FIG. 58

DENDRIMER PARTICLES AND RELATED MIXED MATRIX FILTRATION MEMBRANES, COMPOSITIONS, METHODS, AND SYSTEMS

CROSS REFERENCE TO RELATED APPLICATIONS

The present application is a continuation of U.S. patent application Ser. No. 15/011,547 filed on Jan. 30, 2016, incorporated herein by reference, which, in turn, claims priority to U.S. Provisional Application No. 62/110,319, entitled "Mixed Matrix Membranes with In Situ Synthesized Supramolecular Containers: Preparation, Characterization and Applications to the Electrochemical Reduction of CO2" filed on Jan. 30, 2015 and to U.S. Provisional Application No. 62/164,903, entitled "Mixed Matrix Membranes with In Situ Synthesized Supramolecular Containers: Preparation, Characterization and Applications to the Electrochemical Reduction of CO2" filed on May 21, 2015, the disclosure of each of which is incorporated by reference in its entirety. The present application is also related to U.S. application Ser. No. 14/447,574 entitled "Mixed Matrix Membranes with Embedded Polymeric Particles and Networks and related Compositions, Methods, and Systems" filed on Jul. 30, 2014, claims priority to U.S. Provisional Application No. 61/860,170, entitled "Mixed Matrix Membranes with In-Situ Generated Polymeric Particles and Networks" filed on Jul. 30, 2013 and to U.S. Provisional Application No. 61/983,131, entitled "Mixed Matrix Membranes with In-Situ Generated Polymeric Particles and Networks" filed on Apr. 23, 2014, the disclosure of each of which is incorporated by reference in its entirety. The present application is also related to U.S. application Ser. No. 13/754,883 entitled "Filtration Membranes and Related Compositions, Methods and Systems" filed on Jan. 30, 2013 claims priority to U.S. Provisional Application No. 61/592,409, entitled "Ion-Selective Nanofiltration Membranes Based on Polymeric Nanofibrous Scaffolds and Separation Layers Consisting of Crosslinked Dendritic Macromolecules" filed on Jan. 30, 2012, to U.S. Provisional Application No. 61/601,410, entitled "Low-Pressure Ion-Selective Membranes for Water Treatment and Desalination: Synthesis, Characterization and Multiscale Modeling" filed on Feb. 21, 2012, to U.S. Provisional Application No. 61/711,021, entitled "Composite and Multifunctional Polymeric Membranes with Embedded Polymeric Micro/Nanoparticles: Compositions, Methods, Systems and Applications" filed on Oct. 8, 2012 and to PCT Patent Application PCT/US2012/050043 entitled "Filtration Membranes, and Related Nano and/or Micro fibers, Composites, Methods and Systems" filed on Aug. 8, 2012 claims priority to U.S. Provisional Application No. 61/521,290, entitled "Low-Pressure Ion-Selective Membranes for Water Treatment and Desalination: Synthesis, Characterization and Multiscale Modeling" filed on Aug. 8, 2011, to U.S. Provisional Application No. 61/592,409, entitled "Ion-Selective Nanofiltration Membranes Based on Polymeric Nanofibrous Scaffolds and Separation Layers Consisting of Crosslinked Dendritic Macromolecules" filed on Jan. 30, 2012, and to U.S. Provisional Application No. 61/601,410, entitled "Low-Pressure Ion-Selective Membranes for Water Treatment and Desalination: Synthesis, Characterization and Multiscale Modeling" filed on Feb. 21, 2012, each of the above mentioned applications is incorporated herein by reference in its entirety.

STATEMENT OF GOVERNMENT GRANT

This invention was made with government support under Grant No. CBET0948485 awarded by the National Science Foundation. The government has certain rights in the invention.

FIELD

The present disclosure relates to dendrimer particles and related polymeric membranes and related compositions, methods and systems. In particular the present disclosure relates to mixed matrix membranes with embedded dendrimer particles and related compositions, methods and systems.

BACKGROUND

Development of efficient membranes has been a challenge in the field of energy generation and storage, fluid filtration, gas separations, biopharmaceutical purifications in particular when aimed at environmental and industrial separations.

Advances in industrial ecology, desalination and resource recovery have established that industrial wastewater, seawater and brines are important and largely untapped sources of critical metals and elements. One of the challenges in metal recovery from industrial wastewater is to design and synthesize high capacity, recyclable and robust chelating ligands with tunable metal ion selectivity that can be efficiently processed into low-energy separation materials and modules.

Despite previous investigation and effort, development of efficient, cost-effective and/or environmentally friendly polymeric membranes and systems has been a challenge, in particular, the development of high capacity chelating membranes to recover metals.

SUMMARY

Provided herein are dendrimer particles, and related mixed matrix filtration membranes compositions, methods, and systems that which can have various applications such as industrial and environmental separations.

According to a first aspect, a dendrimer particle is described. The dendrimer particle comprises at least two dendrimers each having a core chemical moiety having a core multiplicity Nc, branch cell units attached to the at least two core chemical moiety or attached one to another, and a number of surface functional groups Z presented on terminal branch cell units. In each of the at least two dendrimers in the dendrimer particle, the branch cell units attached one to another have a branch cells multiplicity Nb, and the number of surface functional groups Z presented on terminal branch cell units, wherein $Z=N_c N_b^G$ with $G \leq 3$. In some embodiments, in the dendrimer particle, at least some of the branch cell units are functionalized to present reactive sites, and in particular reactive sites capable of binding a metal, such as copper and/or platinum.

According to a second aspect, a mixed matrix filtration membrane is described. The mixed matrix filtration membrane comprises dendrimer particles herein described embedded in a polymer matrix comprising a porous polymeric aggregate formed by a base polymer.

According to a third aspect, a mixed matrix filtration membrane is described. The mixed matrix filtration membrane comprises dendrimer particles herein described in which at least some of the of the branch cell units are functionalized to present reactive sites, the dendrimer particles embedded in a polymer matrix comprising a porous polymeric aggregate formed by a base polymer. In some embodiments, in the dendrimer particle, at least some of the functionalized branch cell units present reactive sites capable of binding a metal, such as copper and/or platinum.

According to a fourth aspect, a method is described for making a mixed matrix filtration membrane with in-situ generated dendrimer particles herein described and mixed matrix filtration membranes obtainable thereby. The method comprises: providing a base polymer substantially soluble in a base polymer solvent; providing particle precursors each having a portion substantially soluble in the base polymer solvent and a portion substantially insoluble in the base polymer solvent the polymeric particle precursor able to provide a dispersion of segregated domains in the base polymer solvent, the polymeric particle precursor comprising one dendrimer having one core chemical moiety with a core multiplicity Nc, branch cell units attached to the core chemical moiety or one to another, and a number of terminal functional groups Z presented on terminal branch cell units. In the polymeric particle precursor, the number of branch cell units attached one to another have a branch cells multiplicity Nb, and the number of surface functional groups Z presented on terminal branch cell units is $Z=NcNb^G$ with $G \leq 3$. The method further comprises, contacting the base polymer, the polymeric particle precursor, and the base polymer solvent to provide a blend, and maintaining the blend for a time and under a condition to allow crosslinking of at least some of the terminal functional groups Z and in situ formation of dendrimer particles herein described, thus providing a dope solution. The method further comprises casting the dope solution to provide a mixed matrix membrane with embedded dendrimer particles herein described. In some embodiments the maintaining comprises contacting the blend with a crosslinker and/or an initiator capable of reacting with the polymer particle precursor and in particular to the terminal functional groups Z. In some embodiments, in the dendrimer particle precursor, at least some of the branch cell units are functionalized to present reactive sites, and in particular reactive sites capable of binding a metal such as copper or platinum.

According to a fifth aspect, a system of making a filtration membrane with in-situ synthesized dendrimer particles is described. The system comprises a base polymer for the membrane matrix substantially soluble in a base polymer solvent, and polymeric particle precursors partially soluble in the base polymer solvent the base polymer solvent, each polymeric particle precursor being capable to form a dispersion of segregated domains in the base polymer solvent, and comprising one core chemical moiety having a core multiplicity Nc, branch cell units attached to the core chemical moiety or one to another, and a number of surface functional groups Z presented on terminal branch cell units. In the polymeric particle precursor, the branch cell units attached one to another have a branch cells multiplicity Nb, and the number of surface functional groups Z presented on terminal branch cell units, wherein $Z=NcNb^G$ with $G \leq 3$. In some embodiments, in the dendrimer particle precursor, at least some the branch cell units are functionalized to present reactive sites, and in particular reactive sites capable of binding a metal such as copper or platinum. In some embodiments, the system also comprises a crosslinker and/or an initiator capable of reacting with the polymer particle precursor and/or the base polymer solvent or a mixture of solvents compatible with the base polymer solvent capable of dissolving the base polymer and/or a non-solvent substantially incompatible with base polymer solvent or a mixture of non-solvents substantially incompatible with the base polymer solvent for the membrane polymer to promote phase separation and subsequent membrane formation.

According to a sixth aspect, a nanofiber or microfiber is described. The nanofiber or microfiber comprises a dendrimer particle embedded in a polymeric component. In some embodiments the nanofiber or microfiber comprises reactive sites, and the reactive sites can be positively and/or negatively charged.

According to a seventh aspect, a method of making a nano and/or micro fibers with embedded dendrimer particles is described, the method comprising contacting a base polymer, a particle precursor having a portion substantially soluble in the base polymer solvent and a portion substantially insoluble in the base polymer solvent the polymeric particle precursor herein described; optionally a cross-linking component, and a solvent for a time and under a condition to allow crosslinking of at least some surface functional groups of the polymeric particle precursors thus allowing the in situ formation of dendrimer particles herein described to provide a dope solution; and spinning the dope solution to provide a nanofiber or microfiber herein described. In some embodiments, the polymeric component and dendritic component are contacted to form a blend and the cross-linking agent is added to the blend to allow in situ formation of the dendrimer particles and obtain the dope. In some embodiments, in the dendrimer particle precursor, the branch cell units are functionalized to present reactive sites, and in particular reactive sites capable of binding a metal such as copper or platinum According to an eight aspect, a bicomposite membrane is described, which comprises a plurality of nanofibers and/or microfibers herein described attached to a polymer matrix formed by a porous polymeric aggregate comprising dendrimer like particles. In some embodiments, in the bicomposite membrane, the plurality of nanofiber and/or microfiber are arranged in a mesh structure forming a layer comprised in the membrane, alone or in combination with additional layers. In some embodiments, the plurality of nanofiber and/or microfibers are arranged in a substantially parallel configuration, in particular in some of these embodiments, one or more nanofibers and/or microfibers of the plurality of the nanofibers and/or microfibers are hollow.

According to a ninth aspect, a method to filter a fluid is described. The method comprises passing the fluid through one or more mixed matrix membranes herein described. In some embodiments the passing can be performed by pumping the fluid into the membrane and extracting the pumped fluid from the mixed matrix membranes.

According to a tenth aspect, a method to perform a reaction catalyzed by one or more metals is described, the method comprises contacting reagents to perform the reaction with one or more mixed matrix membranes herein described in which the branch cell units of dendrimer particles embedded in the polymeric aggregate are functionalized to present reactive sites comprising the one or more metals. In the method the contacting is performed for a time and under condition to allow the reaction catalyzed by the one or more metals. In some embodiments, the one or more metals comprise copper and/or platinum.

Filtration membranes with embedded polymeric micro/nanoparticles and related methods and systems herein described are expected in several embodiments to be used to provide a fast and scalable route for the preparation of a new generation of high performance membranes, Filtration membranes with embedded polymeric micro/nanoparticles and related methods and systems herein described are expected in several embodiments to provide a versatile, flexible and/or tunable membrane platform to perform selective chelating metals from a liquid and in particular of industrial waste water or aqueous solutions, Filtration membranes with embedded polymeric micro/nanoparticles and related methods and systems herein described are expected in several embodiments to provide modules and systems at a low cost for a broad range applications including waste water treatment, metal recovery, catalysis, gas separations, chemical and biological purifications, and energy generation, conversion and storage.

Filtration membranes with embedded polymeric micro/nanoparticles and related methods and systems herein described can be used in several embodiments, to produce high capacity membrane absorbers for the selective extraction and recovery of metals from aqueous solutions. In particular, these mixed matrix filtration membranes can be used as membrane absorbers or sorbents for the selective recovery of dissolved metals from industrial liquid waste stream.

Filtration membranes with embedded polymeric micro/nanoparticles and related methods and systems herein described can be in several embodiments to provide microenvironments formed by where reactions can occur. Mixed matrix filtration membranes with embedded dendrimer micro/nanoparticles and related methods and systems herein described can be used in connection with applications wherein filtration is desired. Exemplary applications comprise fluid filtration, gas separations, biopharmaceutical purifications and energy generation and storage. In particular, the mixed matrix membranes with embedded dendrimer particles can be used in watered desalination, resource recovery and additional applications associated with industrial/environmental separations, including chemical and/or biological purifications, which are identifiable by a skilled person. More particularly, the mixed matrix membranes with embedded dendrimer particles herein described can be used in applications where selective absorption and inclusion or removal/conversion of one more solutes/chemical compounds is desired.

The details of one or more embodiments of the disclosure are set forth in the accompanying drawings and the description below. Other features, objects, and advantages will be apparent from the description and drawings, and from the claims.

BRIEF DESCRIPTION OF DRAWINGS

The accompanying drawings, which are incorporated into and constitute a part of this specification, illustrate one or more embodiments of the present disclosure and, together with the detailed description and the examples, serve to explain the principles and implementations of the disclosure.

FIG. 4 shows in the upper panel the mathematical relationship between the number of surface groups (Z), number of branch cells (NO, molecular weights (MW) of the dendrimers and the generation of the dendrimers (G) and in the lower panel the two-step reaction sequences involving alkylation chemistry and amidation chemistry.

FIG. 9 illustrates chemical structures of low-generation poly(amidoamine) (PAMAM) dendrimers (G0, G1 and G2) with terminal NH2 groups.

FIG. 11 illustrates chemical structures of low-generation poly(propyleneimine) (PPI) dendrimers (G1 and G2) with terminal $NH_2$ groups.

FIG. 13 illustrates chemical structures of low-generation 2 cyclotriphosphazene-phenoxymethyl(methylhydrazono) (PMMH) dendrimer (G1) with various terminal groups.

FIG. 18A shows a schematic illustration of the formation of dendrimer-like particles from G0 dendrimer; FIG. 18 B shows a schematic illustration of mixed matrix membrane preparation with embedded dendrimer-like particles;

FIG. 18 C shows a schematic illustration of the formation of dendrimer-like particles from G1 dendrimer;

FIG. 24 shows characterization of the mixed matrix MDP-G0 membrane by $N_2$ adsorption permporometry. The pore diameters were estimated using the Barrett-Joyner-Halenda (BJH) methodology (4).

FIG. 25 shows characterization of the mixed matrix MDP-G1 membrane by $N_2$ adsorption permporometry. The pore diameters were estimated using the Barrett-Joyner-Halenda (BJH) methodology (4).

FIG. 26 shows Characterization of the control PVDF membrane by $N_2$ adsorption permporometry. The pore diameters were estimated using the Barrett-Joyner-Halenda (BJH) methodology (4).

FIG. 32 shows permeate flux of aqueous solutions of Cu(II) through the mixed matrix MDP-G0 and MDP-G1 membranes as a function of solution pH and filtration time at 2 bar. The composition of each membrane is listed in Table 8. A 2 L solution of Cu(II) [10 mg/L] at constant pH (3, 7 and 9) was pumped through each membrane at 2 bar.

FIG. 37 shows Dendronized PAMAM bromoethylated poly(2,6-dimethyl-1,4-phenylene oxide (BPPO) hollow fiber membranes (HFMs) [7]. FIG. 37A shows a schematic illustration of membrane preparation and FIG. 37B shows representative SEM images of a G3HFM following immersion of a 50-mg sample in an aqueous solution (8 mL) of $Cu_2(OH)_3Cl$ with a Cu(II) concentration of ~12 mg/L at room temperature for 72 h. The SEM images show the precipitation of $Cu_2(OH)_3Cl$ crystals on the surface of the G3-$NH_2$ dendronized PAMAM HFM. The SEM images of the Cu(II) laden PAMAM HFM were acquired following sample free-drying using field emission scanning electron microscopy (FESEM, SIRION 200 Series, FEI Corporation) at an acceleration voltage of 5 Kv.

FIG. 43 shows SEM micrographs of a Pt(0) loaded MDP-G1 membrane using a backscattered electron (BSE) detector in one embodiment.

FIG. 47 shows TEM micrographs of PAMAM-G1 microparticles from a Pt(0) loaded MDP-G1 membrane in one embodiment. For the TEM experiments, a small piece of the reduced platinum loaded membrane (Pt$^0$/MDP-G1) was dissolved in 2 mL of triethyl phosphate (TEP) by sonication for about 30 mins.

FIG. 57A shows ligand chemistry and architecture and FIG. 57B shows Cu(II) coordination to selected monodentate, bidentate, and macrocyclic ligands with nitrogen donors.

FIG. 58 shows a table with a list of physiocochemical properties and binding affinities of selected metal ions to selected monodentate ligands.

DETAILED DESCRIPTION

Figure 1:
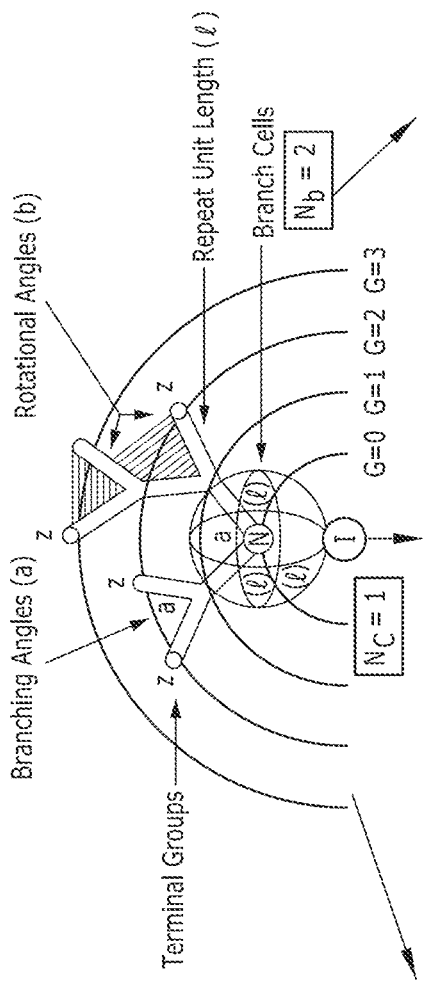
FIG. 1 shows three major classes of branched macromolecules: (I) Statistical (Random Hyperbranched), II (Semi-Controlled (Dendrigrafts) and III Controlled (Dendrimers).

Provided herein are dendrimer particles and related mixed matrix filtration membranes compositions, methods and systems that allow in several embodiment to perform selective filtration of a liquid and in particular of waste water for metal recovery.

The term "filtration" as used herein refers to the mechanical or physical operation which can be used for separating components of a homogeneous or heterogeneous solutions. Types of filtration can be classified by the approximate sizes of chemicals to be separated and can include particle filtration, or PF (>10 μm); microfiltration, or MF (0.1-10 μm); ultrafiltration, or UF (0.01-0.1 μm); nanofiltration, or NF (0.001-0.01 μm); and reverse osmosis, or RO (<0.001 μm).

The term "chemicals" as used herein indicates a substance with a distinct composition that is produced by or used in a chemical process. Exemplary chemicals comprise particles, molecules, metals, ions, organic compounds, inorganic compounds and mixture thereof as well as any additional substance detectable through chemical means identifiable by a skilled person. In particular, in some embodiments, the chemicals can comprise solutes dissolved in a fluid (e.g. water), and in particular dissolved ions.

The term "membrane" as used herein refers to a porous structure that is capable of separating components of a homogeneous or heterogeneous fluid. In particular, "pores" in the sense of the present disclosure indicate voids allowing fluid communication between different sides of the structure. More particular in use when a homogeneous or heterogeneous fluid is passed through the membrane, some components of the fluid can pass through the pores of the membrane into a "permeate stream", some components of the fluid can be retained by the membrane and can thus accumulate in a "retentate" and/or some components of the fluid can be rejected by the membrane into a "rejection stream". Membranes can be of various thicknesses, with homogeneous or heterogeneous structure. Membranes can be comprised within, for example, flat sheets or bundles of hollow fibers. Membranes can also be in various configurations, including but not limited to spiral wound, tubular, hollow fiber, and other configurations identifiable to a skilled person upon a reading of the present disclosure (see, for example the web page kochmembrane.com/Learning-Center/Configurations.aspx). Membrane can also be classified according to their pore diameter. According to IUPAC, there are three different types of pore size classifications: microporous (dp<2 nm), mesoporous (2 nm<dp<50 nm) and macroporous (dp>50 nm). In particular, in some instances, membranes can have pores with a 0.5 nm to 1.0 mm diameters. Membranes can be neutral or charged, and particles transport can be active or passive. The latter can be facilitated by pressure, concentration, chemical or electrical gradients of the membrane process.

In several embodiments, a filtration membrane herein described comprises a polymer matrix formed by a porous polymeric aggregate.

The term "polymer matrix" as used herein refers to three-dimensional network of a polymer component of the membrane. The term "polymer component" as used herein refers to one or more linear polymers forming a polymeric aggregate of the polymer matrix and comprising repeating structural unit forming long chains without branches or cross-linked structures. In some instances molecular chains of a linear polymer can be intertwined, but in absence of modification or functionalization the forces holding the polymer together are physical rather than chemical and thus can be weakened by energy applied in the form of heat. In particular, polymers forming the polymeric component in the sense of the disclosure comprise substituted or unsubstituted aliphatic polymer, a substituted or unsubstituted unsaturated polymer and a substituted or unsubstituted aromatic polymer identifiable by a skilled person upon reading of the present disclosure.

The term "polymer aggregate" or "polymeric aggregate" or "aggregate" as used herein refers to aggregations of linear polymer molecules that form an amorphous network structure. The amorphous network structure can provide structural support to the filtration membranes and pores through which desired substances can pass from one side of the membrane to the other. Exemplary polymer aggregates can be seen, for example, in FIG. 21, FIG. 22 and FIG. 34. In particular, in some embodiments, the pores provided by the polymer aggregate of the polymer matrix can permit the passage of some molecules (e.g. solvent molecules such as water) while preventing the passage of others (e.g. solute molecules such as proteins) thus configuring the membrane to act as a size-exclusion membrane.

In embodiments herein described, the polymeric matrix further includes dendrimer particles embedded in the polymer matrix.

The term "dendrimers" used herein refer to repetitively branched molecules having three basis architectural components namely (i) a dendrimer core, (ii) repetitive branch cell units and (iii) terminal functional groups. In particular, a "dendrimer core" is a chemical moiety presenting a backbone and at least two anchor atoms, each anchor atom defining a bonding position to a head attachment atom of a branch cell unit. An exemplary illustration is provided in FIGS. 9-13. In the dendrimer core, the backbone of the dendrimer core can be any stable chemical moiety having the capability to present anchoring positions for the attachment of branch cell units. In particular, the core backbone structure can be one of aromatic, heteroaromatic rings, aliphatic, or heteroaliphatic rings or chains. In some embodiments, the backbone of the dendrimer core can be one single atom, including C, N, O, S, Si, or P. A "branch cell unit" is a chemical structure presenting one head attachment atom and at least two tail attachment atoms. The head attachment atom defines a bonding position to an anchor atom of a dendrimer core or a tail attachment atom of another branch cell unit. The tail attachment atom defines a bonding position to a head attachment atom of another branch cell unit or to a terminal functional group with the attachment possibly performed directly or indirectly. A generation of branch cell units within a dendrimer defines a shell of the dendrimer as will be understood by a skilled person (see "Dendrimers and other Dendritic polymers" by Jean M. J. Frechet and Donald A. Tomalia 2001 herein incorporated by reference in its entirety). The branch cell units of a generation typically define an interior space inside the dendrimer herein also indicated as interior of shell as will be understood by a skilled person. A "terminal functional group" of a dendrimer, is a functional group presented on the outermost part of the dendrimer attached to an end of a branch cell unit. The branch cell units attaching the terminal functional groups typically provide the outer shell or periphery of the dendrimer. The terms "terminal functional groups" and "surface functional groups" are herein used interchangeably.

Figure 2:
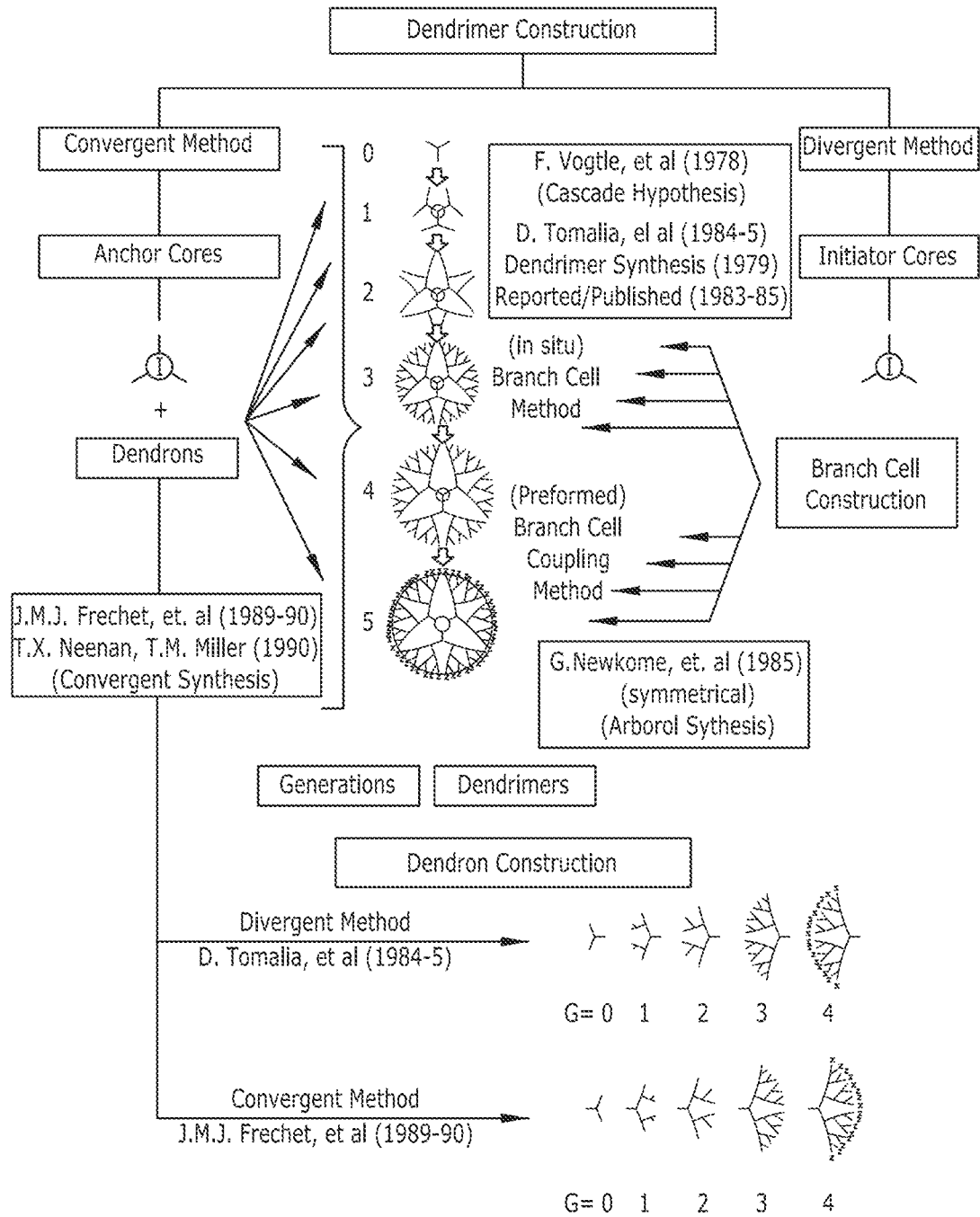
FIG. 2 shows an overview of synthetic strategies for (a) branch cell construction, (b) Dendron construction and (c) dendrimer construction.

Typically, in dendrimers in the sense of the disclosure, the dendrimer core branch cell units and the terminal functional groups can determine the physicochemical properties, as well as the overall sizes, shapes, flexibility and/or container properties of the dendrimers as the dendrimers are grown generation by generation. An exemplary schematic illustration of dendrimer core, branch cell units and terminal functional groups are illustrated in FIGS. 1-3.

Figure 3:
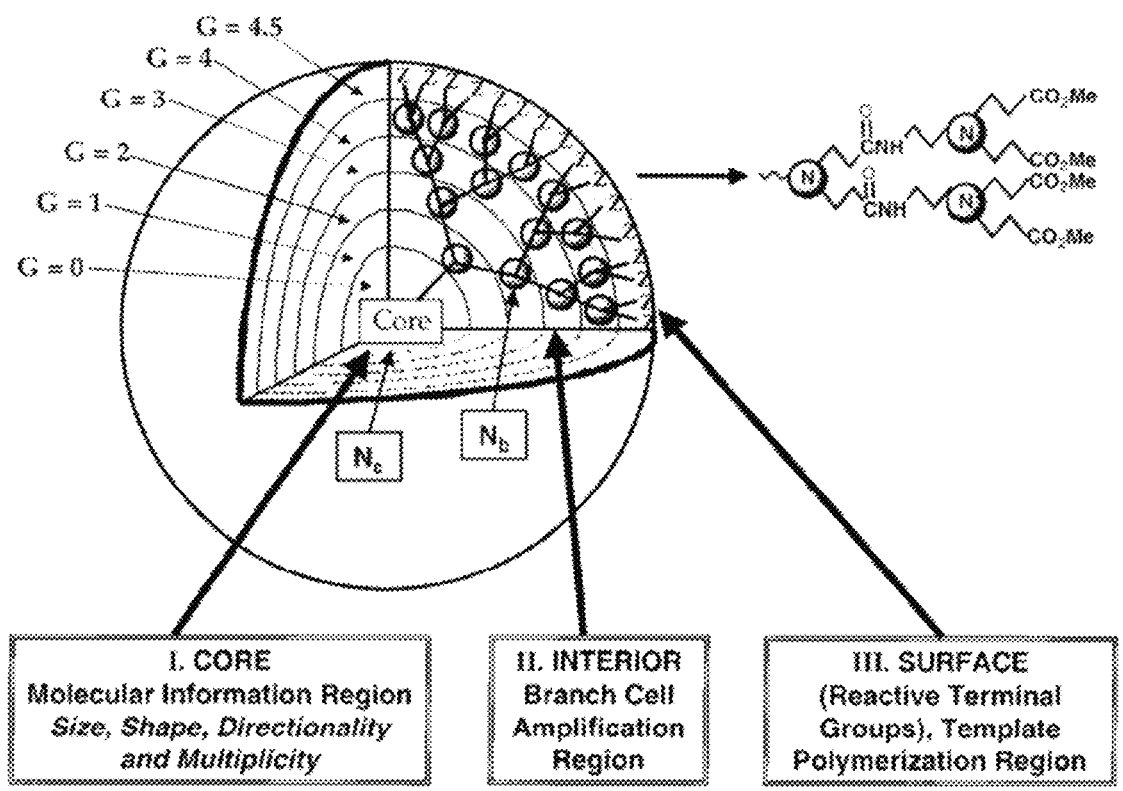
FIG. 3 shows three-dimensional projection of dendrimer core-shell architecture for G=4.5 poly (amidomine) (PAMAM) dendrimer with principal architectural components (i) core, (ii) interior and (iii) surface.

In dendrimers herein described, the core of the dendrimers is typically the center from which size, shape, directionality and multiplicity are expressed via the covalent connectivity to the outer shells (see FIG. 3). One of the properties used to characterize the dendrimer core is referred to as core multiplicity, denoted by $N_c$. $N_c$ represents the total number of anchor atoms, and therefore the number of anchored branches, on a dendrimer core. Examples of the dendrimer cores are shown in FIGS. 10-13 and 14. For example, PAMAM dendrimer core shown in FIG. 10 has a $N_c$ value of four and 2 cyclotriphosphazene-phenoxymethyl(methylhydrazono) (PMMH) shown in FIG. 13 has a $N_c$ value of six.

In dendrimers herein described, the branch cell units of each shell define the type and amount of interior void space that can be enclosed by the terminal groups as the dendrimer is grown also known as interior of shell (see FIG. 3). One of the properties used to characterize the branch cell units is referred to as branch cell units multiplicity, denoted by Nb. Branch cell units multiplicity ("Nb") represents a total number of tail attachment atoms on each branch cell unit and determines the density and degree of amplification as an exponential function of the generation (G) as will be understood by a skilled person. In the embodiment shown in FIGS. 9-11, the branch cell units multiplicity ("Nb") has a value of two. The interior composition and amount of solvent filled void space determines the extent and nature of guest—host (endo-receptor) properties that are associated with a particular dendrimer family and generation. In some embodiments, the solvent filled interior void space can exhibit encapsulation properties that can be amenable to organic, inorganic or metal compounds.

In dendrimers herein described, the surface of the dendrimers consists of reactive or passive terminal groups that can perform several functions (see FIG. 3). With appropriate function, the terminal groups can serve as a template polymerization region as each generation is amplified and covalently attached to the precursor generation. Additionally, the surface groups can function as passive or reactive gates controlling control entry or departure of guest molecules from the dendrimer interior. Example of the terminal groups can be found, for example, in FIG. 10 and FIG. 12, as well as others that can be readily identified by a person skilled in the art.

The configuration of the number of surface functional groups, the number of branch cells, the molecular weights and the number of generation of dendrimers can be expressed by mathematical equation as shown in FIG. 4. In particular, both the core multiplicity (Nc) and branch cell units multiplicity (Nb) determine the precise number of terminal groups (Z) and mass amplification as a function of generation (G). Such relationship can be represented using the mathematical formula below:

$$Z=N_c N_b^G$$

In particular the parameter G indicates the generation number of the dendrimer as will be understood by a skilled person as dendrimers are typically classified by generation number. The common notation for this classification is GX followed by the name of the dendrimer, where X is a number referring to the generation number. A zero generation dendrimer is annotated as G0 followed by the name of the dendrimer; a first generation dendrimer is annotated as G1 followed by the name of the dendrimer and so on. For example, the zero generation PAMAM dendrimer is annotated as G0 PAMAM, the first generation PAMAM dendrimer is annotated as G1 PAMAM, the second generation PAMAM dendrimer is annotated as G2. PAMAM and so on.

The term "low-generation dendrimer" herein described refers to any one of a G0 to G3 dendrimer and "high-generation dendrimer" herein described refers to any one of G4 dendrimers or a higher generation dendrimer.

The dendrimer generation is provided as a result of an iterative manufacturing process by which dendrimers are "grown" off a central core, wherein in each iteration branch cell units are attached to the core of the dendrimer or to terminal branch cell units of the dendrimer. Accordingly, in the iterative manufacturing processes each iteration provides a generation of branch cell units defining a new shell of the dendrimer as well as a new "generation" of the dendrimer. The term "terminal branch cell units" indicates branch cell units presenting functionalized or unfunctionalized tails on the outermost part of the dendrimers and forming the outer shell of the dendrimer. In some embodiments, dendrimers can be synthesized by divergent methods. Divergent synthesis refers to the sequential "growth" of a dendrimer layer by layer, starting with a core moiety Which contains functional groups capable of acting as active sites in the initial reaction. Each round of reactions in the series forms a new generation of dendrimers with exponentially increased number of available surface groups. In other embodiments, dendrimers can also be synthesized by convergent methods as will be understood by a person of ordinary skill in the art. Detailed information about the dendrimer synthesis methods can be found in related publications and textbooks such as "Dendrimers and other Dendritic polymers" by Jean M. J. Frechet and. Donald A. Tomalia 2001 herein incorporated by reference in its entirety.

The dendrimer diameters usually increase linearly as a function of shells or generations added, whereas, the terminal functional groups increase exponentially as a function of generation. Lower generations generally have open, floppy structures, whereas higher generations become robust, less deformable spheroids, ellipsoids or cylinders depending on the shape and directionality of the core.

Higher generation dendrimers also have a high degree of branching and more exposed functional groups on the surface, which can later be used to customize the dendrimer for a given application. For example, highly branched dendrimers typically indicate a macromolecule whose structure is characterized by a high degree of branching that originates from a central core region. Exemplary highly branched dendritic macromolecules comprise dendrimers, hyperbranched polymers, dendrigraft polymers, dendronized linear polymers, tecto-dendrimers, core-shell (tecto) dendrimers, hybrid linear dendritic copolymers, dendronized polymers and additional molecule identifiable by a skilled person (see e.g. US 2006/0021938, US 2008/0185341, US 2009/0001802, US 2010/0181257, US 2011/0315636, and US 2012/0035332 each incorporated by reference in its entirety, also describing method of making highly branched dendritic macromolecules). Exemplary dendritic nanomaterials can include, for example, any highly branched dendritic macromolecules or mixtures thereof, in dendrimer-based supramolecular assemblies, 3-D globular nanoparticles or dendritic nano/microparticles identifiable by a skilled person (see, for example, US 2006/0021938, US 2008/0185341, US 2009/0001802, US 2010/0181257, US 2011/0315636, and US 2012/0035332 each incorporated by reference in its entirety).

Highly branched dendrimers typically comprise dendrimer of generation G4 or higher. Low generation dendrimers typically comprise dendrimer of generation G3 or lower.

An exemplification of dendrimer generations is provided below with reference to the exemplary dendrimer PAMAM. A skilled person will understand the applicability to other dendrimer and dendrimer like particles upon reading of the present disclosure.

In some embodiments, the dendrimers used as building blocks for the formation of dendrimer particles are polyamidoamine (PAMAM) dendrimers. In those embodiments, examples of low generation dendrimers include G0-G3 PAMAM and examples of high generation dendrimer include G4-G6 PAMAM.

Polyamidoamine (PAMAM) dendrimers are hyperbranched polymers with unparalleled molecular uniformity, narrow molecular weight distribution, defined size and shape characteristics and a multifunctional terminal surface. PAMAM dendrimers consist of an ethylenediamine core, a repetitive branching amidoamine internal structure and a primary amine terminal surface. Similar to other dendrimers, PAMAMs have a tree-like branching structure with each outward layer containing exponentially more branching points.

In some embodiments, PAMAM dendrimers can be synthesized by the divergent approach that involves the in situ branch cell construction in stepwise, iterative stages (generation=0, 1, 2, 3 . . . ) around a desired core to produce mathematically defined core-shell structures as illustrated in FIG. 2. Typically, ethylenediamine ($N_c$=4) or ammonia (Nc=3) are used as cores and allowed to undergo reiterative two-step reaction sequences involving: (a) exhaustive alkylation of primary amines by Michael addition with methyl acrylate, and (b) amidation of amplified ester groups with a large excess of ethylenediamine to produce primary amine terminal groups as illustrated in FIG. 3. $N_c$ refers to the number of arms (i.e. dendrons) anchored to the core.

Figure 6:
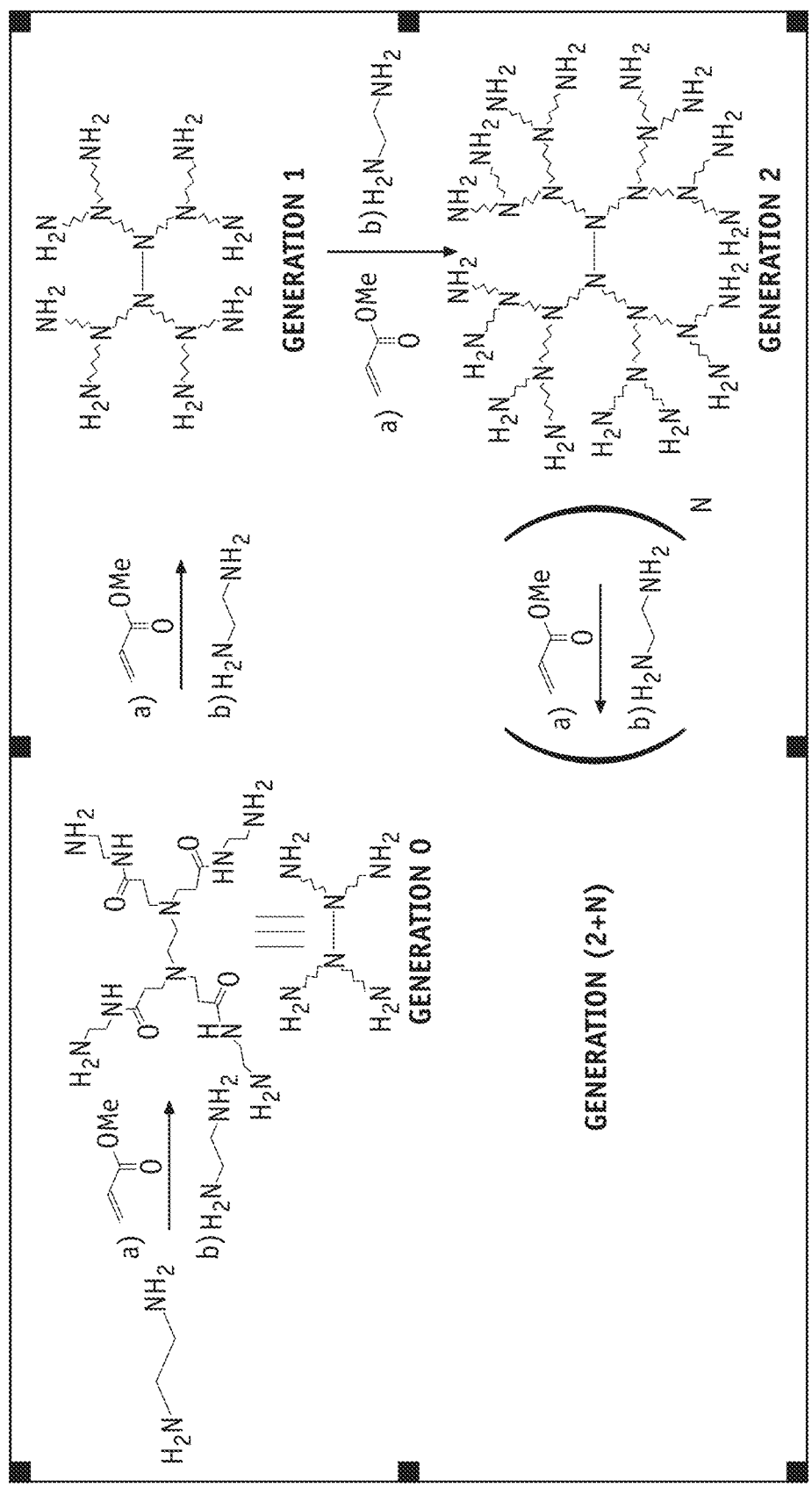
FIG. 6 illustrates an exemplary method of Synthesis of PAMAM dendrimers.

As shown in FIG. 2 and FIG. 6, the first reaction sequence on the exposed dendron creates G=0 (core branch cell). One iteration of the alkylation/amidation sequence produces an amplification of terminal groups from 1 to 2 with the in situ creation of a branch cell at the anchoring site of the dendron that constitutes G=1. Repeating these iterative sequences, produces additional shells (generations) of branch cell units that amplify mass and terminal groups according to the mathematical expressions described in FIG. 4.

Figure 5:
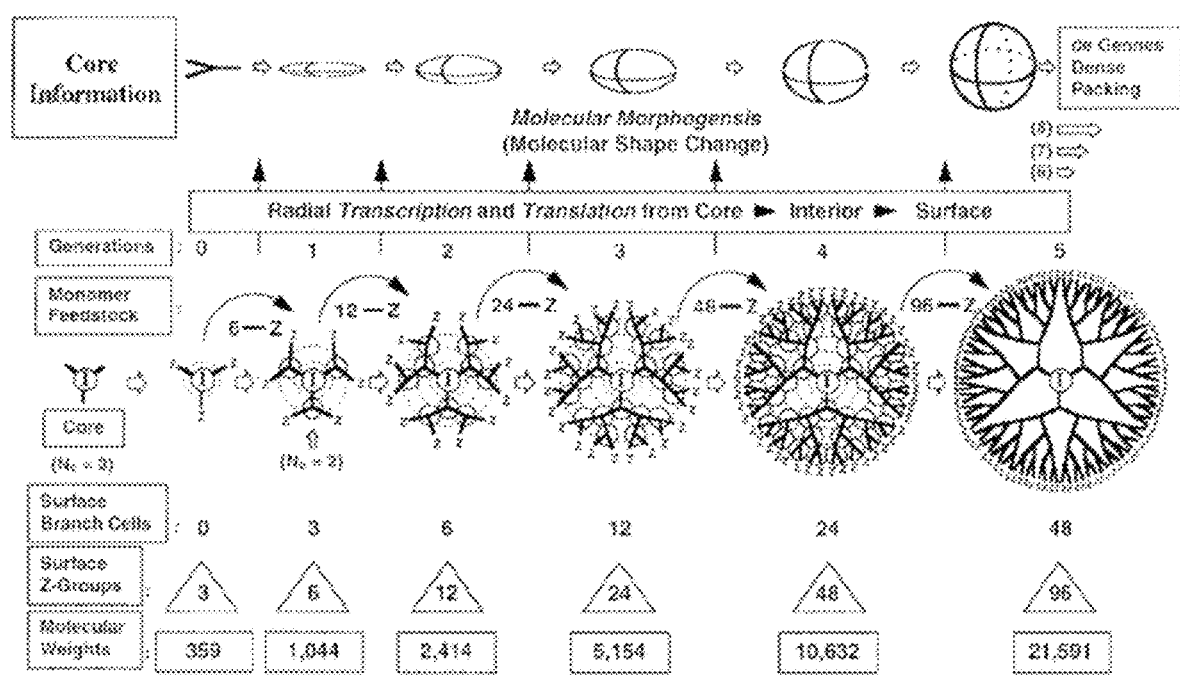
FIG. 5 illustrates a comparison of molecular shape change, two-dimensional branch cell amplification surface branch cells, surface groups (Z) and molecular weights (MW) as function of generation: G=0-6.

Predicted molecular weights can be confirmed by mass spectroscopy and other analytical methods as will be known to a person skilled in the art. Predicted numbers of branch cells, terminal groups (Z) and molecular weights (MW) as a function of generation for ammonia core (Nc=3) PAMAM dendrimers are described in FIG. 5. The molecular weights approximately double as one progresses from one generation to the next. The surface groups (Z) and branch cells (BC) amplify mathematically according to a power function, thus producing discrete, monodispersed structures with precise molecular weights as described in FIG. 5. These predicted values can be verified by mass spectroscopy for the earlier generations. With divergently synthesized dendrimers, minor mass defects can be observed for higher generations as congestion-induced de Gennes dense packing begins to take effect.

Calculated properties such as molecular weight, measured diameter and number of surface groups for PAMAM can be found in Table 1.

Table 1 shows the calculated properties of primary amine surface PAMAM dendrimer by generation.

| Generation (G) | Molar Mass (Daltons) | Number of Terminal Groups | Hydrodynamic Diameter (nm) |
| --- | --- | --- | --- |
| 0 | 517 | 4 | 1.5 |
| 1 | 1,430 | 8 | 2.2 |
| 2 | 3,256 | 16 | 2.9 |
| 3 | 6,909 | 32 | 3.6 |
| 4 | 14,214 | 64 | 4.5 |
| 5 | 28,826 | 128 | 5.4 |
| 6 | 58,048 | 256 | 6.7 |
| 7 | 116,493 | 512 | 8.1 |
| 8 | 233,383 | 1024 | 9.7 |
| 9 | 467,162 | 2048 | 11.4 |
| 10 | 934,720 | 4096 | 13.5 |

Dendrimers, in particular, higher generation dendrimers can serve as supramolecular containers for cations, anions, organic solutes and bioactive molecules depending on dendrimer generation. [1]

Figure 7:
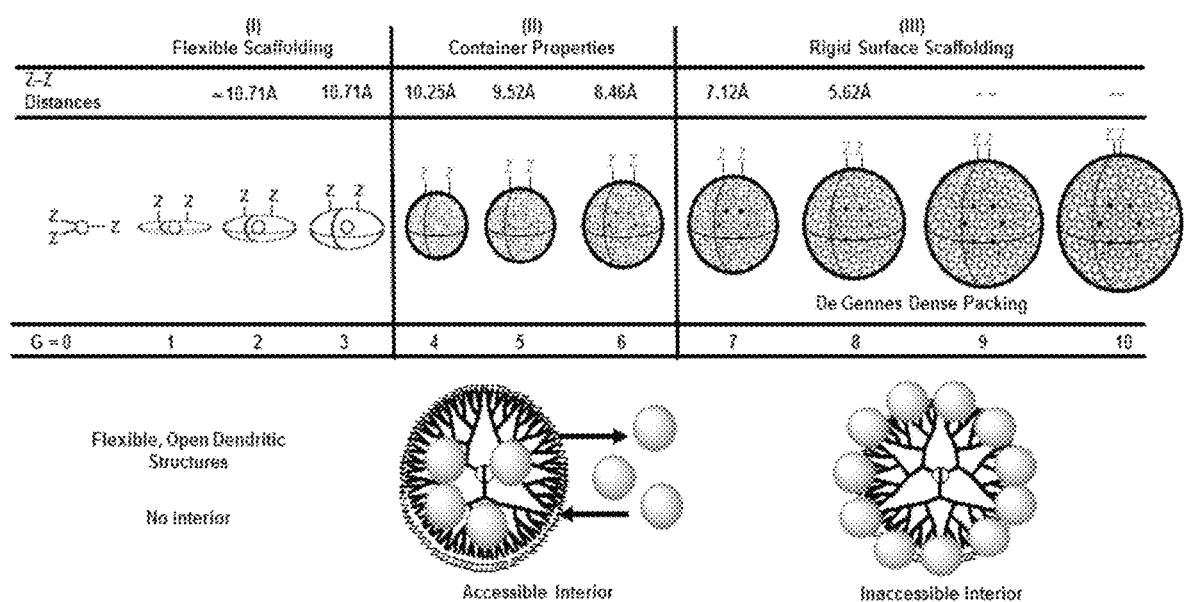
FIG. 7 illustrates congestion induced dendrimer shape changes (I,II,III) with development of container properties (G=4, 5 and 6) for a family of PAMAM dendrimers.

FIG. 7 shows congestion induced dendrimer shape changes (I,II,III) with development of container properties (G=4, 5 and 6) for a family of PAMAM dendrimers. The PAMAM dendrimers can be utilized as templates for the preparation of dendrimer-encapsulated nanoparticles (DENs) (see FIG. 8) with tunable electronic, optical and catalytic properties. [2]

Figure 8:
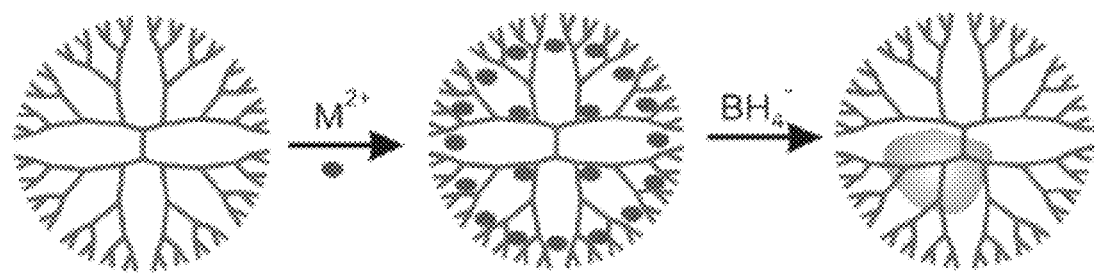
FIG. 8 shows an exemplary method of synthesis of dendrimer-encapsulated nanoparticles (DENS).

FIG. 8 illustrates the synthesis of dendrimer-encapsulated nanoparticles (DENS). These higher generation PAMAM dendrimers (e.g. G4-G6 $NH_2$) are expected to be used as (i) high capacity, selective and selective supramolecular containers for metal ions (e.g. Cu(II), Pt(II), Pd(II), Ag(I), Au(I) and U(VI)) and (ii) templates for the preparation of redox and catalytic DENs [Cu(0), Pt(0) and Pd(0)].

In embodiments herein described low generation dendrimers can be used as building blocks to provide dendrimer particles which have properties comparable with the ones of the more expensive higher generation dendrimers.

The term "dendrimer particles" described herein refer to particles of covalently linked and in particular cross-linked polymeric molecules with low degree of branching in which the covalently linked or cross-linked polymeric molecules form aggregate nanostructures and/or microstructure possessing a high degree of branching and a controlled composition, architecture, and/or size. Polymeric molecules with low degree of branching that can form polymeric particle comprise low-generation dendrimer, for example, low-generation PAMAM, PPI, 2,2-bis(methylol)propionic acid (MPA).

Accordingly in embodiments herein described polymeric molecules with low degree of branching and in particular low generation dendrimers can be used as polymeric particle precursors in the formation of the dendrimer particles herein described.

The term "polymeric particle precursor" described herein refer to a chemical compound that can covalently link another same or different chemical compound, through a cross-linking agent or reactive surface functional group to produce a third compound with resulting increased covalent bonds formed.

In embodiments herein described, the low-generation dendrimers covalently link one to another through their respective surface functional groups In particular, a low-generation dendrimers forming a polymeric particle precursor comprises one core chemical moiety having a core multiplicity Nc, branch cell units attached to the core chemical moiety or one to another, and a number of surface functional groups Z presented on terminal branch cell units. In the polymeric particle precursor, the number of branch cell unit attached one to another have a branch cells multiplicity Nb, and the number of surface functional groups Z presented on terminal branch cell units, wherein $Z=N_c N_b^G$ with G≤3. In the method, the polymeric particle precursors can present functional groups that can crosslink with corresponding functional groups from other polymeric particle precursors either directly or indirectly.

The term "functional group" as used herein indicates specific groups of atoms within a molecular structure that are responsible for the characteristic chemical reactions of that structure. Exemplary functional groups include hydrocarbons, groups containing halogen, groups containing oxygen, groups containing nitrogen and groups containing phosphorus and sulfur all identifiable by a skilled person. In particular, functional groups in the sense of the present disclosure include a carboxylic acid, amine, triarylphosphine, azide, acetylene, sulfonyl azide, thio acid and aldehyde. In particular, for example, the first functional group and the second functional group can be selected to comprise the following binding partners: carboxylic acid group and amine group, azide and acetylene groups, azide and triarylphosphine group, sulfonyl azide and thio acid, and aldehyde and primary amine. Additional functional groups can be identified by a skilled person upon reading of the present disclosure.

As used herein, the term "corresponding functional group" refers to a functional group that can react with another functional group under appropriate conditions. Thus, functional groups that can react one with the other can be referred to as corresponding functional groups. Typically, a reaction between one functional group and its corresponding functional results in binding together of the two molecular structures presenting these two functional groups.

In embodiments where the corresponding functional groups are in the dendrimer forming a first polymeric particle precursor and in the dendrimer forming a second polymeric particle precursor, the corresponding functional groups react to form a covalent bond thus attaching the first polymeric particle precursor and the second polymeric particle precursor as will be understood by a skilled person upon reading of the present disclosure.

The term "attach" or "attachment" as used herein, refers to connecting or uniting by a bond, link, force or tie in order to keep two or more components together, which encompasses either direct or indirect attachment such that, for example, a first compound is directly bound to a second compound or material, and the embodiments wherein one or more intermediate compounds, and in particular molecules, are disposed between the first compound and the second compound or material. In particular, in some embodiments, the polymeric nanomaterial can be associated with the polymer matrix by, for example, by being physically embedded in the polymer matrix, by being covalently bonded to the polymeric component, or through a combination of both. In some embodiment, the functional groups as used herein refer to specific groups of atoms within a molecular structure such as a dendrimer or specific groups of atoms that can attached to the molecular structure of the dendrimer, which are responsible for a characteristic chemical reaction between one functional group and its corresponding functional group. Exemplary functional groups include groups containing double or triple bonds, groups containing halogen, groups containing unsaturated hydrocarbon group, oxygen, groups containing nitrogen and groups containing phosphorus and sulfur all identifiable by a skilled person.

In some embodiments herein described, the functional groups presented in one dendrimer can crosslink with a corresponding functional group of another dendrimer directly to form a covalent bond thus linking the one dendrimer with the another dendrimer. Alternatively, the functional groups presented in one dendrimer can crosslink with its corresponding functional group from another dendrimer indirectly through a crosslinking agent.

The term "crosslinking" herein used generally refer to a direct or indirect linking of two separate polymers. Crosslinking can occur through chemical reactions by addition of a crosslinking agent or through chemical reactions that are initiated by heat, pressure, change in pH, radiation or a free radical initiator that are commonly referred to as "initiator" as will be understood by a person skilled in the art.

In some embodiments, corresponding functional groups can react in absence of an initiator. Exemplary, corresponding functional groups which can react in absence of an initiator are functional groups comprising one double and/or triple bond such as. an unsaturated hydrocarbon group, a group containing oxygen, a group containing nitrogen and a group containing phosphorus and/or sulfur, and more particularly diacetylene groups, methacrylate groups, acryloyl groups, sorbyl ester groups, diene groups, styrene groups vinyl groups and isocyano groups. Additional functional groups that can react in absence of an initiator can be identified by a skilled person upon reading of the present disclosure.

In some embodiments, corresponding functional groups can react in presence of an initiator. Exemplary functional groups capable of reacting in presence of an initiator to provide crosslinked dendrimer are diacetylene groups (initiator—UV exposure), methacrylate groups (initiator—UV exposure, azobisisobutyronitrile (AIBN)+heat), acryloyl groups (initiator—(AIBN)+heat), sorbyl ester groups (initiator—UV exposure, azobisisobutyronitrile (AIBN)+heat), diene groups (initiator—UV exposure, azobisisobutyronitrile (AIBN)+heat, azobis(2-amidinopropane) dihydrochloride (AAPD)+heat), styrene groups (initiator—UV exposure), vinyl groups (initiator—UV exposure) and isocyano groups (initiator—UV exposure). In some embodiments, in a crosslinkable dendrimer herein described at least one functional group is selected from diacetylenyl, acryloyl, methacryloyl and dienyl groups.

In some embodiments, a functional group of one dendrimer can be directly cross-linked to a corresponding functional group of another dendrimer and the functional group and the corresponding functional group can have different chemical structures. In one example, the functional group on one dendrimer comprises an alkynyl group and its corresponding functional group from another dendrimer comprises azide. At the presence of a copper(I) catalyst, azide reacts with the alkynyl group to form 1,4-disubstituted-1,2,3-triazole, resulting in the crosslinking of the two dendrimers Other functional groups that identifiable by a person of skill in the art, including those of Diels Alder reactions.

In some embodiments, the polymeric particle precursor used as building blocks for the formation of dendrimer particles are low generation dendrimers In some embodiments, the low-generation dendrimers are low-generation Polyamidoamine (PAMAM) dendrimers such as G0, G1, G2 or G3 PAMAM, in particular, low generation Polyamidoamine (PAMAM) dendrimers with terminal $NH_2$ groups as shown in FIG. 9.

Figure 10:
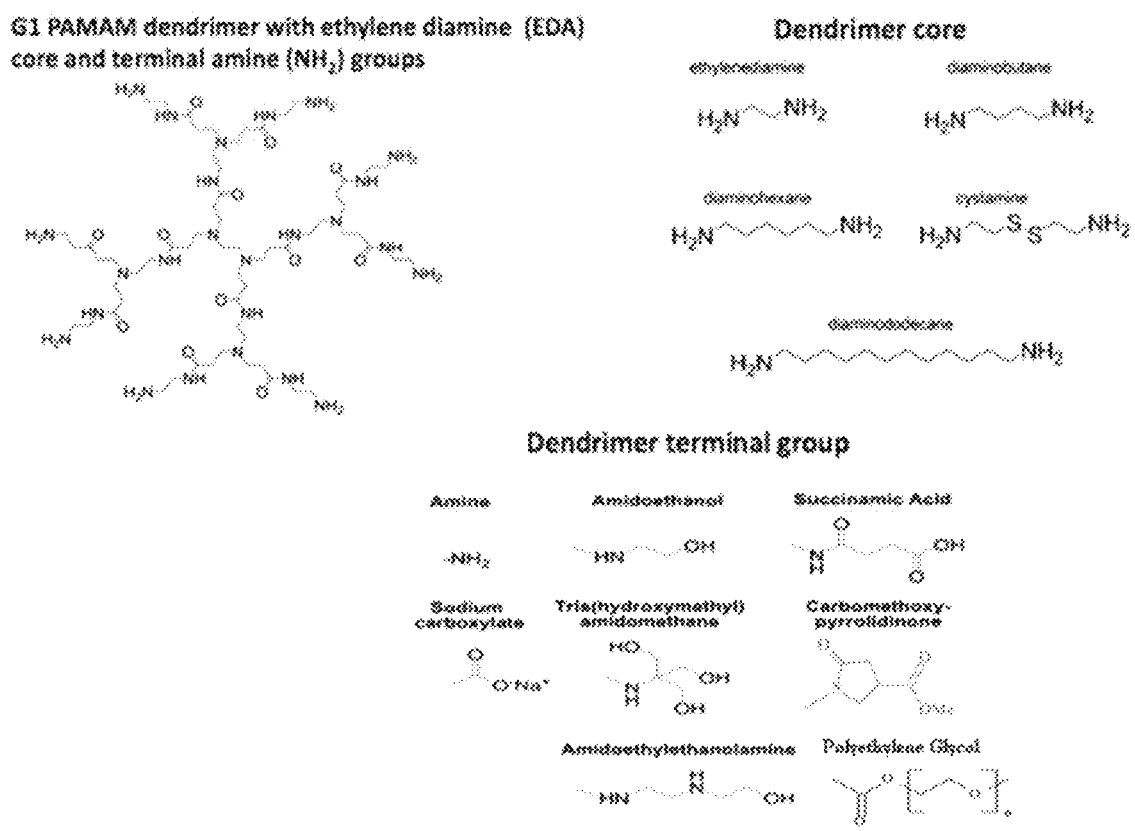
FIG. 10 illustrates chemical structures of low-generation PAMAM dendrimers (G1) with different core and terminal group chemistry.

In some embodiments, the terminal groups of the low generation PAMAM dendrimers can be amine, amidoethanol, succinamic acid, sodium carboxylate, tris(hydroxymethyl) amidomethane, carbomethoxy-pyrrolidinone, amidoethylethanolamine, polyethylene glycol as shown in FIG. 10 and others that can be readily identified by a person skilled in the art.

In some embodiments, the dendrimers used as building blocks for the formation of dendrimer particles are low generation poly(propyleneimine) (PPI] dendrimers such as G1 or G2 PPI with terminal $NH_2$ groups (see FIG. 11). This family of dendrimers is commercially available from SyMO-Chem (http://www.symo-chem.nl/dendrimer.htm).

Figure 12:
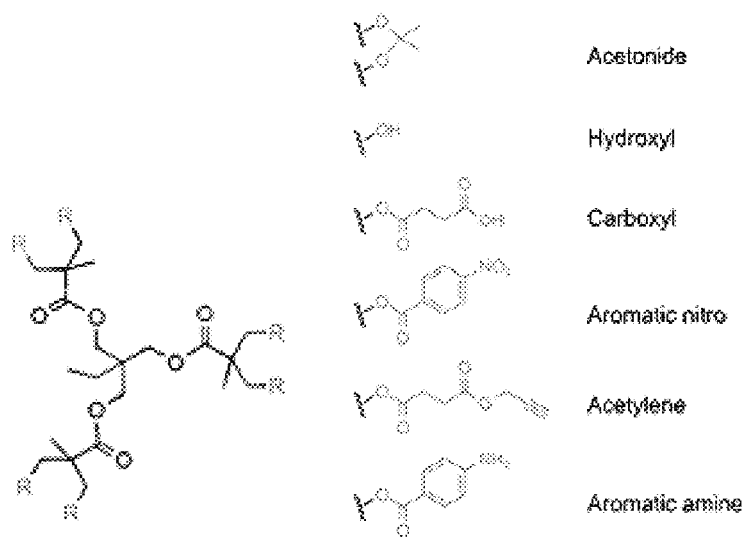
FIG. 12 illustrates chemical structures of low-generation 2,2-bis(methylol)propionic acid (bis-MPA) dendrimers with various terminal groups.

In some embodiments, the dendrimers used as building blocks for the formation of dendrimer particles are low generation 2,2-bis(methylol)propionic acid (bis-MPA) dendrimers with various terminal groups (see FIG. 12). This family of dendrimers is commercially available from Polymer Factory (see web page http://www.polymerfactory.com/dendrimers at the filing date of the present disclosure).

In some embodiments, the dendrimers used as building blocks for the formation of dendrimer particles are low generation 2 cyclotriphosphazene-phenoxymethyl(methylhydrazono) (PMMH) dendrimer (G1) with various terminal groups (see FIG. 13). This family of dendrimers is commercially available from Biodendrimers International (http://www.biodendrimers.com/products/).

Figure 14:
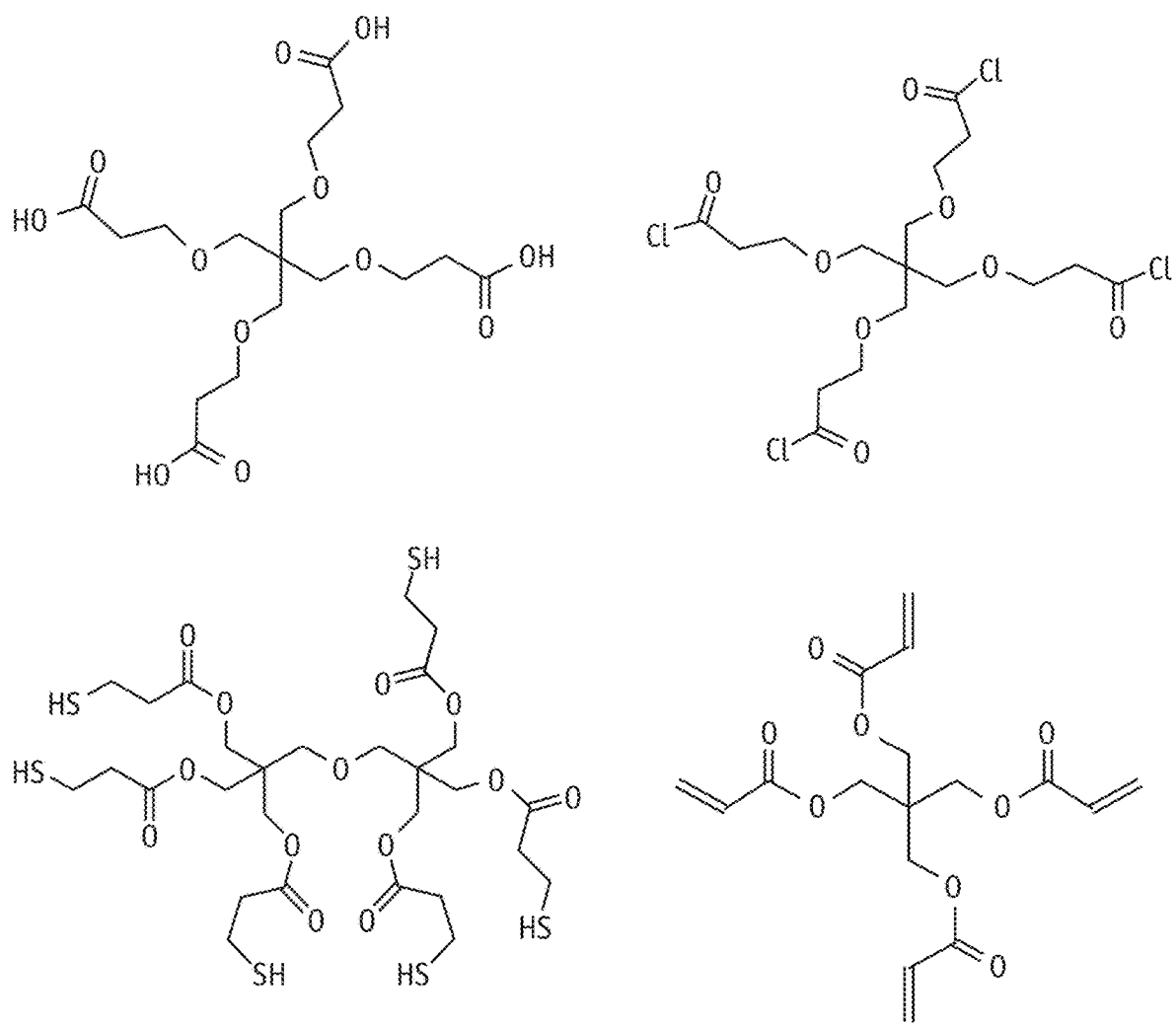
FIG. 14 illustrates chemical structure of other low-generation dendrimers of various core chemistry and terminal groups.

In some embodiments, the dendrimers that can be used as building blocks for the formation of dendrimer particles include low-generation dendrimers of various core chemistry and terminal groups are shown in FIG. 14 as well as others that can be readily identified by a person skilled in the art.

In some embodiments, the polymeric molecules forming the dendrimer particle precursor can include branched polymers such as low-generation dendrimers, for example, low generation poly(amidoamine) (PAMAM) (see, for example, Example 5).

In some embodiments, the low-generation dendrimers used as the building blocks to form dendrimer particles have a molecular weight less than 5000 daltons.

In some embodiments, the low-generation dendrimers used as the building blocks to form dendrimer particles have a number of terminal groups less than 30.

In some embodiments, the low-generation dendrimers used as the building blocks to form dendrimer particles have a hydrodynamic diameter less than 5 nm.

The dendrimer particles formed by the covalent linking of polymeric particle precursors herein described comprises at least two core chemical moieties having a core multiplicity Nc, branch cell units attached to the at least two core chemical moiety or attached one to another, and a number of surface functional groups Z presented on terminal branch cell units. In the dendrimer particles, the branch cell units attached one to another have a branch cells multiplicity Nb, and the number of surface functional groups Z presented on terminal branch cell units, wherein $Z=NcNb^G$ with $G \leq 3$.

In particular, in dendrimer particles herein described at least some of the interior of shells of the dendrimers forming the dendrimer particles exhibit encapsulation properties that can be used to encapsulate organic, inorganic or metal compounds In mixed membrane herein described the dendrimer particles are embedded in a polymer matrix alone or in combination with other particles.

The term "embed" or "embedded" as used herein refers to a spatial relationship of an item relative to a structure in which the item is at least partially enclosed within the structure. In particular, when used in connection to spatial relationship of nanoparticle with reference to a polymer matrix the term "embed" refers to the nanoparticles being at least partially enclosed by the matrix in a suitable configuration within the polymeric aggregate. In particular, in dendrimer particles herein described embedded in a polymer matrix corresponding functional groups in the polymer forming the polymer matrix and in the polymer forming the nanoparticle typically react to form a covalent bond, a hydrogen bond or other bond functional to the attachment of the polymer forming the polymer matrix and the polymer forming the nanoparticle identifiable by a skilled person upon reading of the present disclosure.

Figure 21:
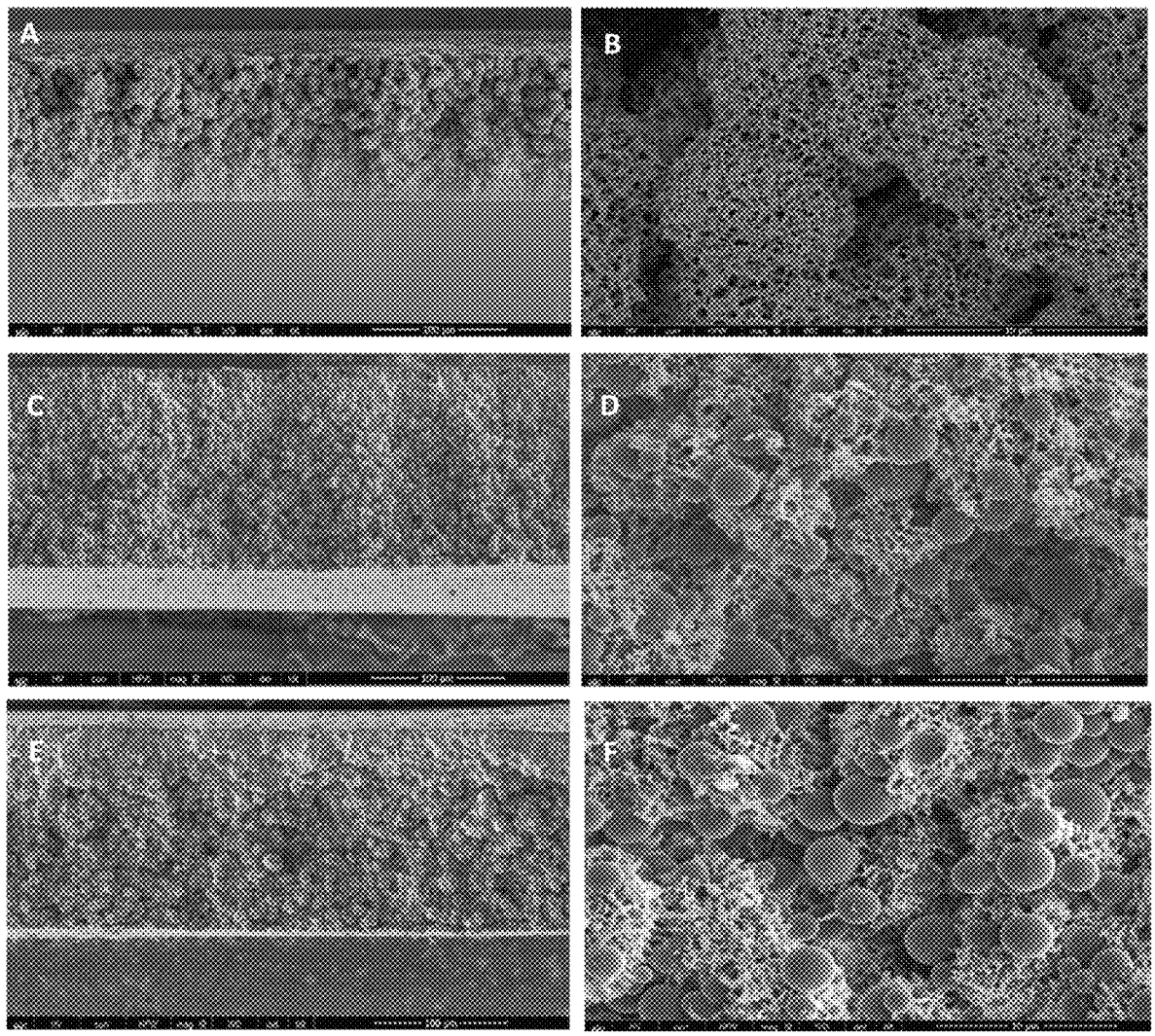
FIG. 21 shows exemplary FESEM micrographs showing the overall cross-sections of the neat PVDF membrane and mixed matrix PVDF membranes with in situ synthesized PAMAM particles. Panels A and B (FIG. 21A and FIG. 21B) show neat PVDF membrane; Panels C and D (FIG. 21C and FIG. 21D) show mixed matrix MDP-G0 membrane; Panels E and F (FIG. 21E and FIG. 21F) show mixed matrix MDP-G1 membrane. The estimated composition of each membrane is listed in Table 8.
Figure 22:
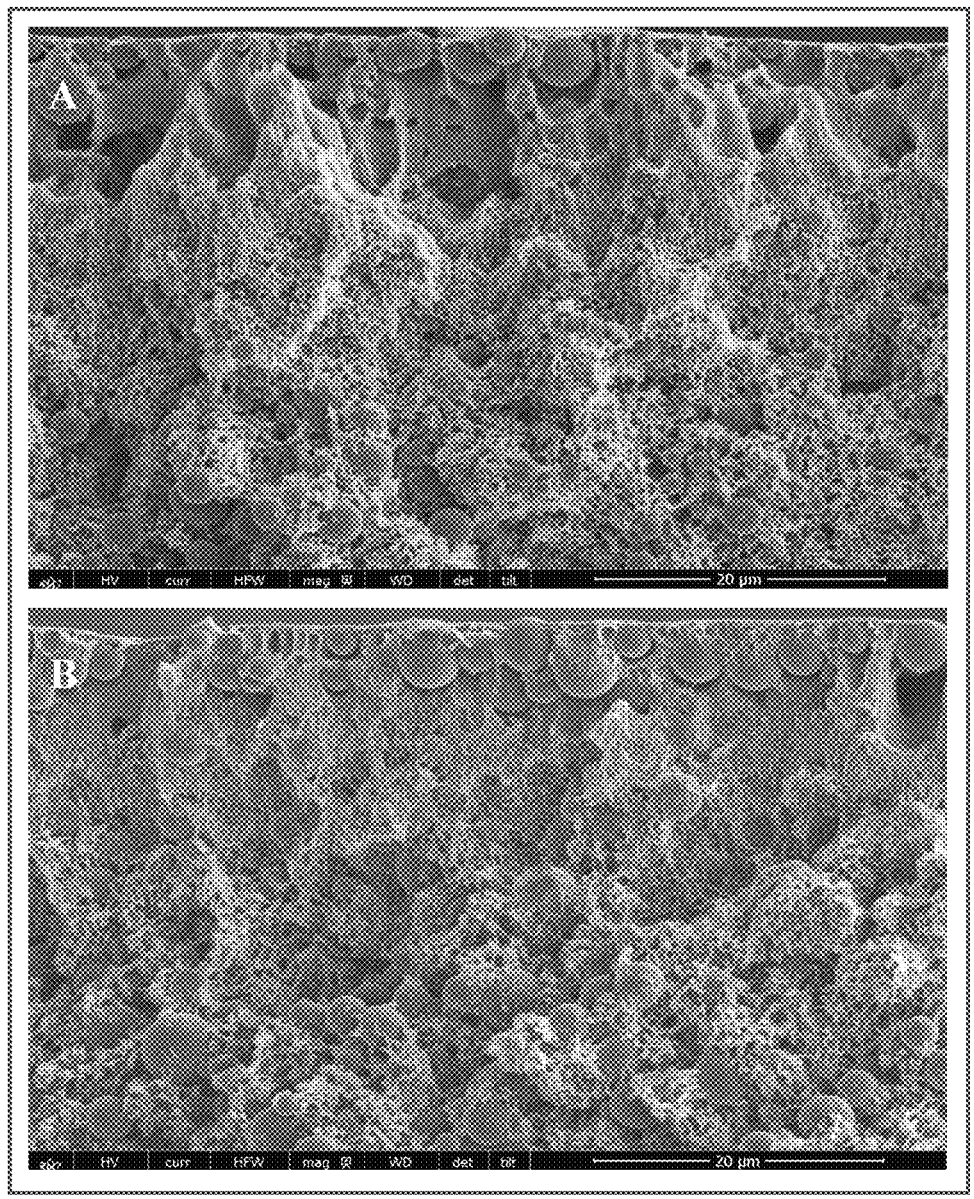
FIG. 22 shows representative magnified FESEM micrographs (1000×) showing the presence of PAMAM particles at both the surface layers and inside the matrices of the mixed matrix PVDF membranes. Panel A: mixed matrix PVDF MDP-G0; Panel B: mixed matrix PVDF MDP-G1. The estimated composition of each membrane is listed in Table 7.
Figure 34:
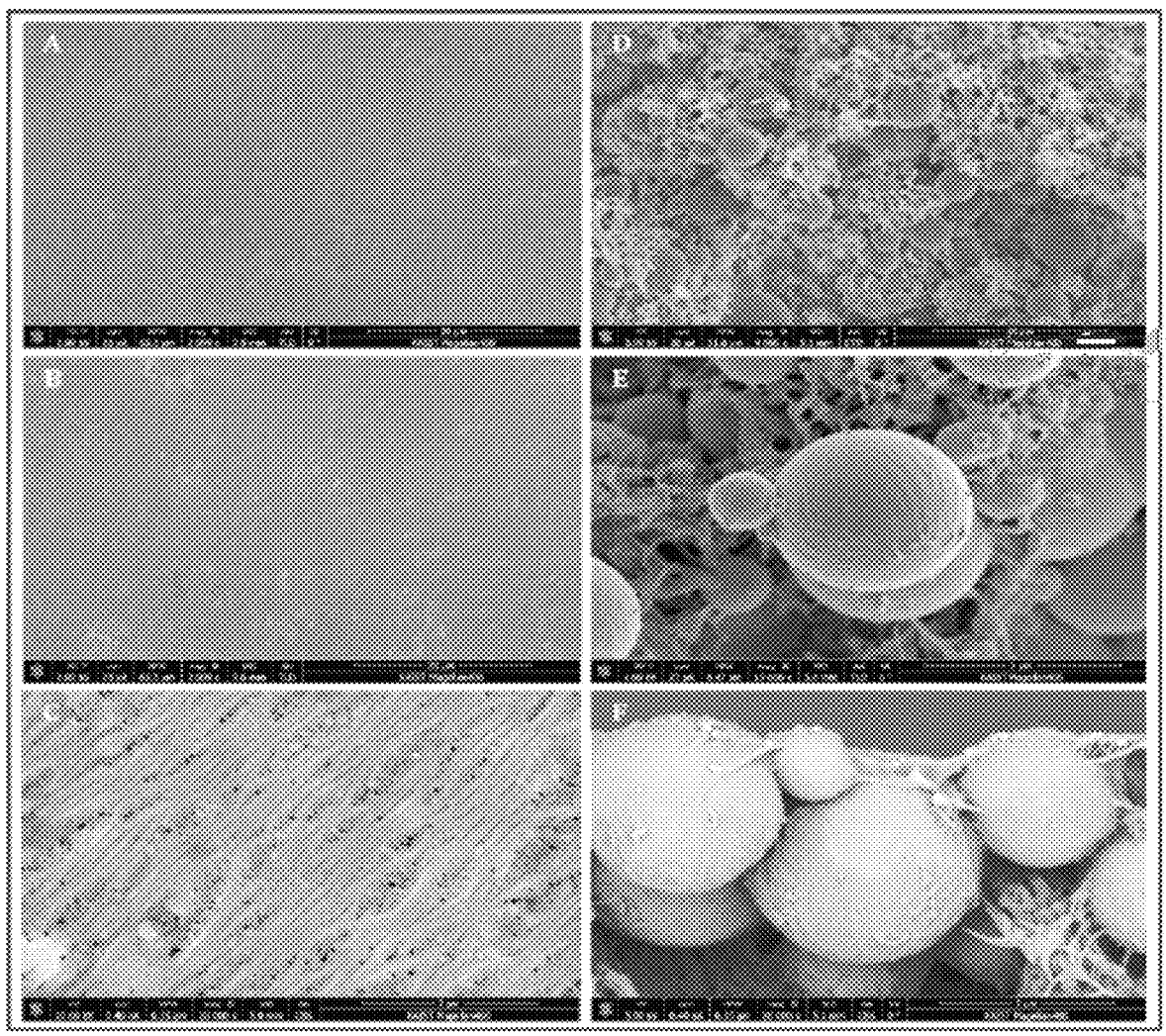
FIG. 34 shows representative FESEM micrographs illustrating the surface and cross-sections of the bare and Cu(II) saturated PAMAM-PVDF MDP-G0 membrane using different electron detectors. A 2 L solution of Cu(II) [10 mg/L] at pH 9 was pumped through the membrane at 2 bar. Panel A shows a micrograph of the surface of the bare MDP-G0 membrane using FESEM with a Through-the-lens Detector (TLD); Panels B and C show micrographs of the Cu(II) MDP-G0 membranes using FESEM with TLD and Concentric Backscatter Detector (CBS), respectively; Panel D shows a micrograph of the cross section of the bare MDP-G0 membrane using FESEM with a Everhart-Thornley Detector (ETD) and Panels E and F show the micrographs of the Cu(II) MDP-G0 membranes using FESEM with TLD and CBS.

In some embodiments the nanoparticles can be attached (e.g. through covalent bonds or through non-covalent interactions such as, for example, van Der Waals forces) to the polymer molecules forming the porous aggregate in particular in correspondence to pores of the porous aggregate structure of the polymer matrix (see e.g. FIG. 21, FIG. 22 and FIG. 34).

In embodiments herein described, at least one polymer of the polymers forming the polymer component of the polymer matrix has a functional group capable of interacting with a corresponding functional group on the dendrimer particles.

In some embodiments herein described, the polymer matrix with embedded dendrimer particles can behave similarly as those formed by high-generation dendrimers in various filtration purposes and particularly serve as multifunctional membranes for a variety of SusChEM related applications, including water treatment, metal extraction and recovery, (biochemical separations and purifications and catalysis and reaction engineering, with similar or even improved properties and performance including higher permselectivity and flux, greater mechanical strength and lower fouling propensity.

The membrane absorbers can be utilized as templates for preparation of dendrimer-encapsulated nanoparticles (DENs) with tunable electronic, optical and catalytic properties. The membrane absorbers described herein with in-situ synthesized dendrimer particles can also serve as multifunctional membranes for a variety of SusChEM related applications In some particular embodiments, the polymeric matrix with embedded dendrimer particles can serve as supercontainers. The term "supercontainers" herein used refer to polymeric material exhibiting encapsulation properties for retaining target compounds including cations, anions, organic solutes, bioactive molecules and catalytic and redox active metallic/bimetallic nanoparticles and cluster.

Figure 18:
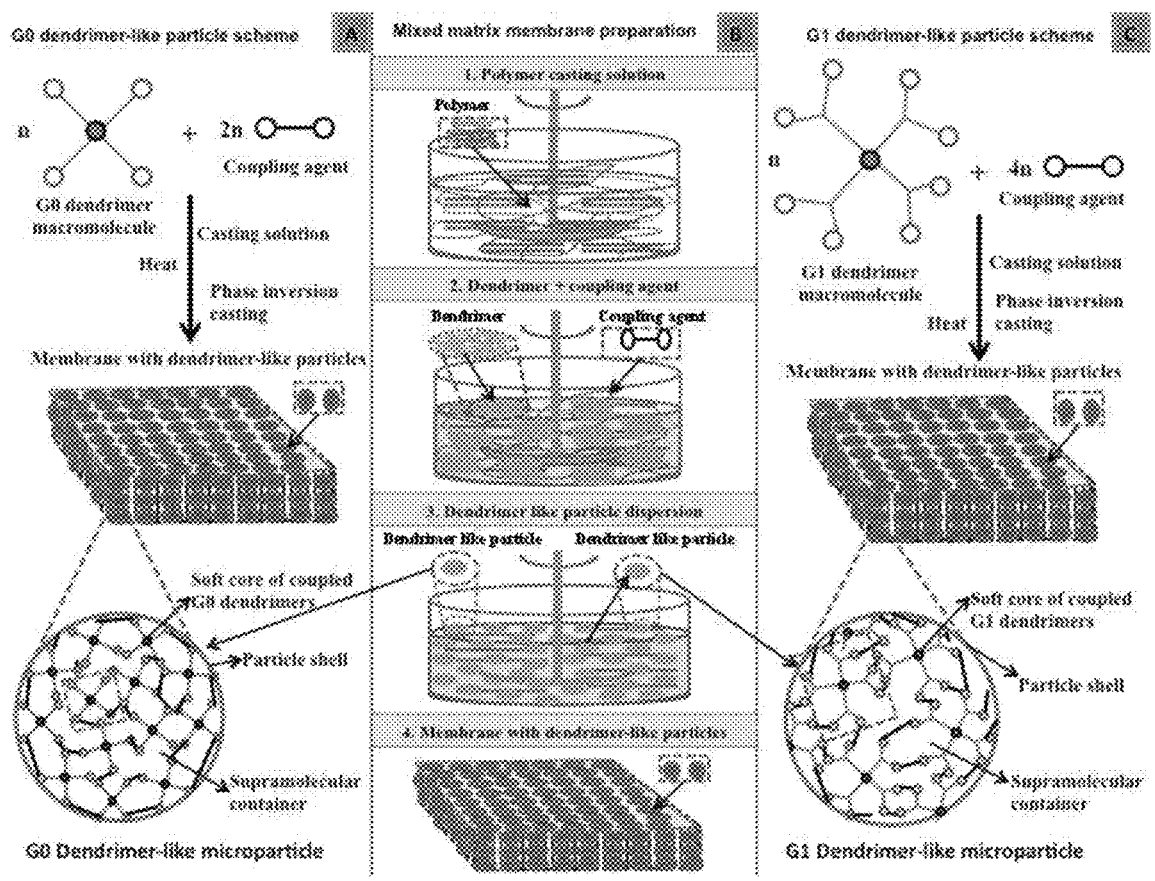
FIG. 18 illustrates an exemplary embodiment of preparation of mixed matrix membrane with in-situ synthesized dendrimer-like particles.

In the embodiments shown in FIG. 18, the supercontainer formed by G0 dendrimer particles and G1 dendrimer particles have a hard shell formed by crosslinking primary amine groups of the G0 or G1 dendrimer and a soft core of G0 or G1 dendrimers crosslinked to the shell.

In some embodiments, target compounds to be contained in the supercontainers can form complex with the dendrimers in the soft core depending on the identity of the target compounds and the chemical reaction between the target compounds and the branch cell units of the dendrimer. For example, the N and O donors of the dendrimer particles as well as water molecules and/or counterions trapped inside the dendrimer particles can chemically coordinate with metals in order to contain the metals in the supercontainers (see Examples 7-9 and FIGS. 38-39)

Figure 59:
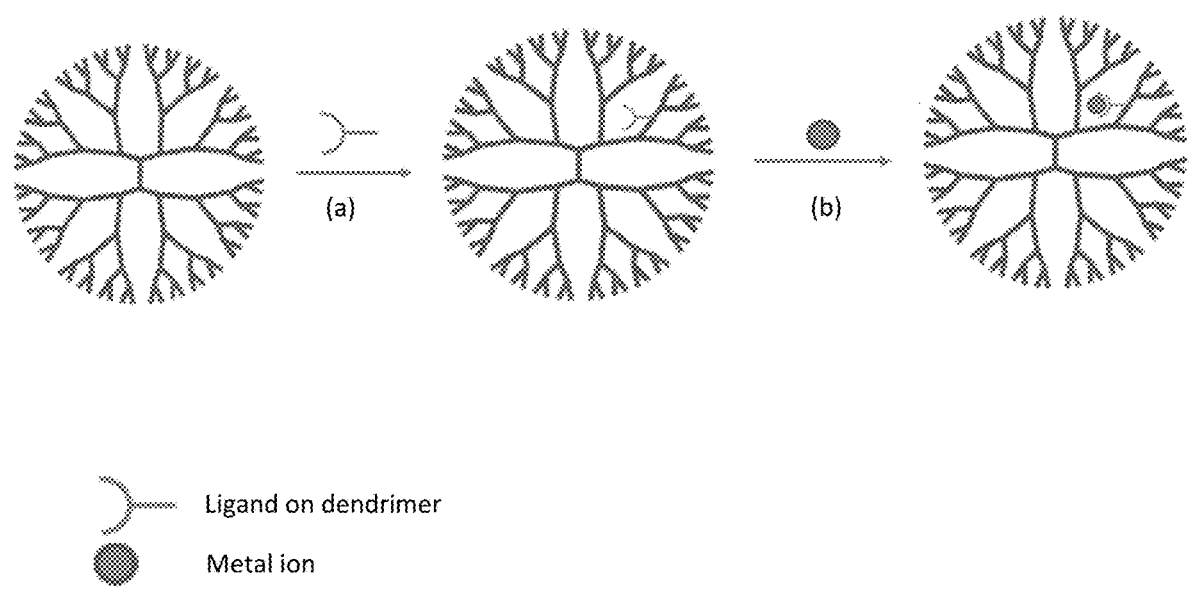
FIG. 59 illustrates introduction of one reactive site into the dendritic component after a chemical transformation in step (a) and the binding of a metal ion in step (b).

In some embodiments, the supercontainers can be functionalized with ligand groups further presenting a reactive site that can selectively bind and contain specific target compounds, such as metal ions (see FIG. 59).

Figure 57:
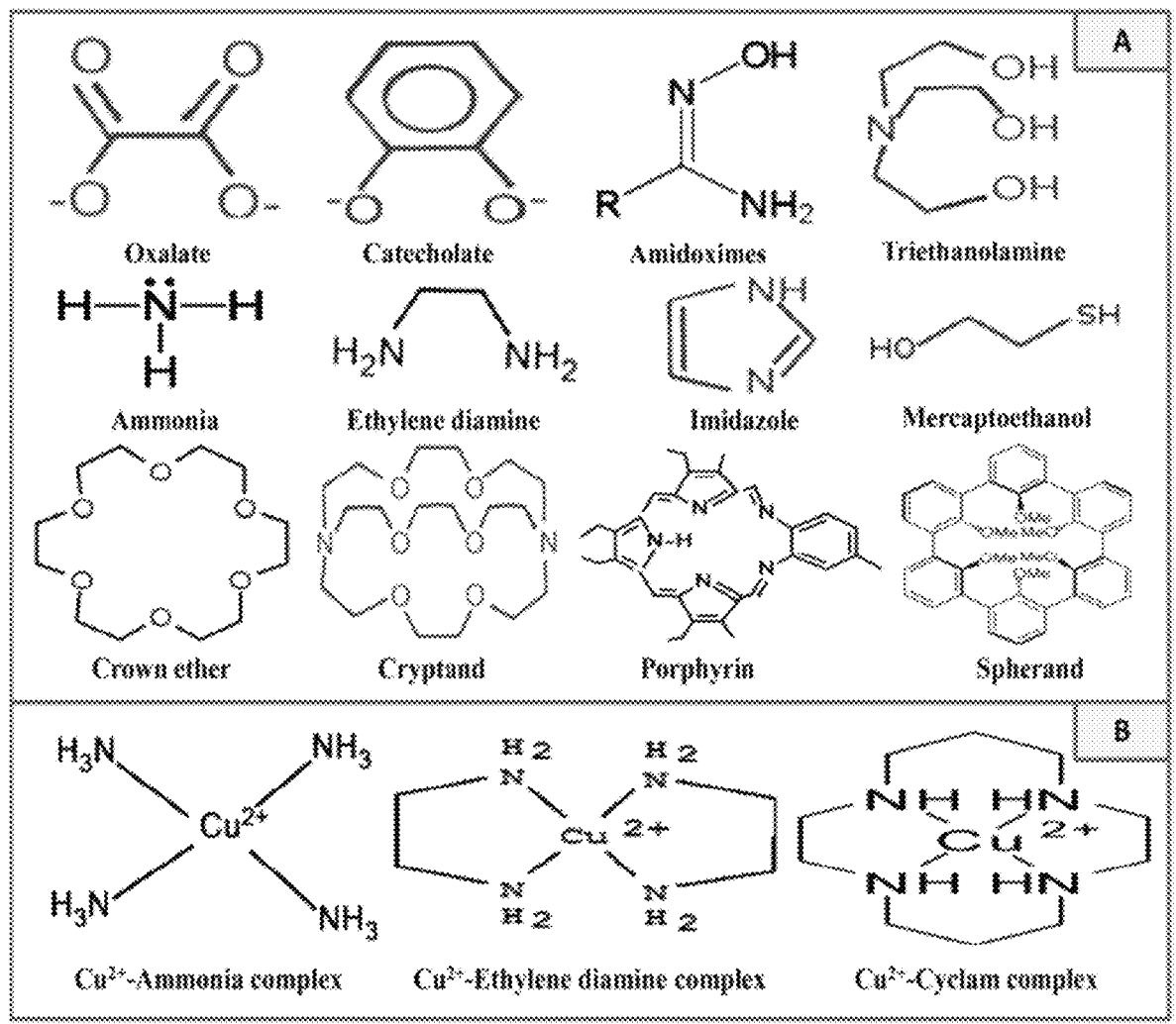
FIG. 57 shows examples of chelating agents that can be used as ligand groups for the selective recovery of metal ions from aqueous solutions.

In some embodiments, the metal ion can form complexation with selected ligand groups based on a ligand exchange reaction. In some particular embodiments, metal ion complexation is an acid-base reaction that depends on several parameters including (i) ion size and acidity, (ii) ligand basicity and molecular architecture and (iii) solution physical-chemical conditions. FIG. 57 shows a broad range of ligand groups with different chemistry and architectures including (i) unidentate ligands, (ii) chelating ligands, (iii) macrocycles, (iv) cryptands and (v) dendrimers.

As a person skilled in the art will understand, the Hard and Soft Acids and Bases (HSAB) principle provides a general guidance for selecting an effective ligand (i.e. Lewis base) for a given metal ion (i.e. Lewis acid). [3-6] The table shown in FIG. 58 lists the physicochemical properties of selected metal ions present in seawater along with their binding constants to selected unidentate ligands in aqueous solution. [3-6] The OH$^-$ ligand is representative of ligands with negatively charged "hard" O donors such as oxalate and catecholate (FIG. 57). Conversely, NH$_3$ and imidazole (FIG. 57) are representative of ligands with saturated hard N donors (e.g. ammonia and ethylene diamine (EDA)) and unsaturated N donors, respectively. In contrast, the mercaptoethanol group (HOCH$_2$CH$_2$S$^-$) (FIG. 57) is representative of ligands with soft donors (e.g. thiols).

The table in FIG. 58 lists the stability constants of selected metal ions in aqueous solution to selected unidentate ligands. The stability constant (log Ki) is one the most widely utilized indicator of the binding affinity of a metal ion to a ligand. The higher the log Ki of a metal ion is, the higher its binding affinity to the target ligand is. Consistent with the HSAB principle, the table in FIG. 58 shows that soft metal ions (e.g. Ag$^+$ and Au$^+$) tend to form more stable complexes with soft ligands containing S donors (e.g. mercaptoethanol) (FIG. 57). In contrast, hard metal ions (e.g. UO$_2^{2+}$ and VO$^{2+}$) tend to prefer hard ligands with negatively charged O donors (e.g. oxalate and catecholate); whereas metal ions of borderline hardness/softness (e.g. Cu$^{2+}$, Ni$^{2+}$ and Co$^{2+}$) bind with soft/hard ligands containing nitrogen, oxygen and sulfur donors [e.g. EDA, oxalate and mercaptoethanol) depending on their specific affinity toward the ligands. It is worth mentioning that alkaline-earth metal ions such as Na$^+$ and Li$^+$ have low binding affinities to the ligands listed in the table; i.e., they preferentially bind to macrocycles and macropolycyclic ligands with neutral oxygen donors (e.g. crown ethers and cryptands).

In embodiments herein described, the mixed matrix filtration membranes can have embedded dendrimer particles in which the concentration of the embedded dendrimer particles can be between about 1 and 50 wt % of the membrane weight as determined by, for example, x-ray photoelectron spectroscopy of the membranes (see, e.g. Examples section). In particular, in some embodiments, the concentration of the embedded dendrimer particles and/or nanoparticles can be between about 1 and 10 wt %. In particular, in other embodiments, the concentration of the embedded dendrimer particles and/or nanoparticles in the matrix can be greater than about 10 wt %, and more particularly greater than about 20 wt %, and more particularly greater than about 40 wt %. In some embodiments, the concentration of the embedded dendrimer particles and/or nanoparticles articles can be up to about 50%. In some embodiments, the concentration of the embedded dendrimer particles and/or nanoparticles can be between about 25% to about 50%, above 50%, and also between about 50% and about 60% (see Examples section).

In some embodiments, the embedded dendrimer particles \ can have a homogeneous distribution throughout the membrane wherein similar numbers of nanoparticles are observed within same sized areas (e.g. in SEM images at the same magnification) throughout different portions of the membrane (see, e.g. Example section). In particular, in some embodiments, some (greater than about 5%) the microparticles and/or nanoparticles can be present as clusters of nanoparticles as can be observed by imaging the membrane (e.g. with SEM images of the membrane). In other embodiments, the particles can be discrete and not detectable as clusters (see, e.g. Example section).

In particular, in some embodiments, the filtration membranes can have particles approximately 1-3000 nm in size as can be determined, for example, by SEM and AFM imaging (see e.g. Examples section).

In particular, in some embodiments, the filtration membranes herein described can have pores formed by the polymer aggregates forming the polymer matrix that range in size from approximately 0.5 microns to 10 microns as can be observed by imaging the membrane, for example, by SEM (see e.g. Example section).

In some embodiments, the polymer matrix and the dendrimer particles can be brought together to form membranes comprising the polymer matrix and the dendrimer particles such that the dendrimer particles are embedded in the polymer matrix. In particular, in some embodiments, the formation of the membranes with embedded dendrimer particles can be accomplished by allowing formation of polymeric nanoparticle in situ.

In particular, in some of those embodiments, a method for making a filtration membrane in situ herein described comprises preparing a blend comprising the base polymer that will form the polymeric aggregate and the polymeric particle precursors that will form the dendrimer particle in a suitable solvent or mixture of solvents. In embodiments where crosslinking of corresponding functional groups in the polymeric particle precursor requires an initiator and/or a crosslinking agent can be added to the blend to allow crosslinking and formation of the particles and/or the blend can be maintained under condition allowing formation of the covalent link between corresponding functional groups.

Embodiments wherein formation of polymeric particles is performed in situ allow under appropriate conditions formation of homogeneous membrane having a concentration of particles up to about 50% and/or in which fractal formation of nanoparticle is not detectable. In addition or in the alternative to the particle distribution, concentration and configuration, filtration membrane obtainable by in situ formation can have further controllable features identifiable by a skilled person upon reading of the present disclosure.

In some embodiments, the method to prepare a filtration membrane herein described in situ comprises preparing a base polymer solution by dissolving the target amount of base polymer in a suitable and good/compatible solvent. In particular, in in situ method a good/compatible solvent is a solvent where the base polymer is substantially soluble wherein the term "substantially soluble" as used herein with reference to a polymer and a solvent and/or a composition indicates the ability of the polymer to dissolve in the solvent and/or composition. Accordingly, the backbone of the base polymers as herein described can be substantially soluble in a good solvent when the polymer backbone and the good solvent have similar Hildebrand solubility parameters ($\delta$) which is the square root of the cohesive energy density:

$$\delta = \sqrt{\frac{\Delta H_v - RT}{V_m}}$$

wherein $\Delta H^v$ is equal to the heat of vaporization, R is the ideal gas constant, T is the temperature, and $V_m$ is the molar volume. Similarly two solvents or more solvents are compatible when they have similar solubility parameters. In particular, similar solubility parameters between a polymer or a portion thereof and a solvent and/or composition, and similar solubility parameters between two or more solvents can be found when the absolute value of the difference between their solubility parameters is within 1-10% (see also Tables 2 to 4 herein).

A polymer or portion thereof in accordance with the present disclosure is partially soluble in a certain solvent or composition, when the polymer or portion thereof has partially similar solubility parameters with the solvent or compositions. Analogously two or more solvents are partially compatible one with the other when the two or more solvents have partially similar solubility parameters. Partially similar solubility parameters are found when the absolute value of the difference between their solubility parameters is within 5 to 10% (see also Tables 2 to 4 herein).

A polymer or portion thereof in accordance with the present disclosure is substantially insoluble in a certain solvent or composition, when the polymer or portion thereof has dissimilar solubility parameters with the solvent or compositions. Analogously two or more solvents are substantially incompatible one with the other when the two or more solvents have dissimilar solubility parameters. Dissimilar solubility parameters are found when the absolute value of the difference between their solubility parameters is higher than 10% (see also Tables 2 to 4 herein).

A skilled person will realize that the ability of the backbone to dissolve in the solvent can be verified, for example, by placing an amount of the homopolymer or copolymer to be used in the solvent or composition as herein described, and observing whether or not it dissolves under appropriate conditions of temperature and agitation that are identifiable to a skilled person.

In particular, an exemplary reference providing solubility parameters is the website www.sigmaaldrich.com/etc/medialib/docs/Aldrich/General_Information/polymer_solutions.Par.0001.File.tmp/polymer_solutions.pdf [7] at the time of filing of the present disclosure (see Tables 2-4). More particularly, a skilled person will know that Sigma-Aldrich and other chemical companies provide exemplary tables showing exemplary solubility parameter values for various non-polar compositions and polymers. A skilled person can also refer to sources such as the Polymer Handbook to find solubility parameter values Brandrup, J., et al., "Polymer handbook". Vol. 1999. 1999: Wiley New York [8].

TABLE 2

Table II: Solubility Parameters for Plasticizers and Solvents (Alphabetical sequence)

| Solvent | δ (cal/cm³)^F | H-Bonding Strength[3] | Solvent | δ (cal/cm³)^{1/2} | H-Bonding Strength[3] |
|---|---|---|---|---|---|
| Acetone | 9.9 | m | Dioctyl sebacate | 8.6 | m |
| Acetonitrile | 11.9 | p | 1,4-Dioxane | 10.0 | m |
| Amyl acetate | 8.5 | m | Di(propylene glycol) | 10.0 | s |
| Aniline | 10.3 | s | Dipropylene glycol | 9.3 | m |
| Benzene | 9.2 | p | monomethyl ether | | |
| Butyl acetate | 8.3 | m | Dipropyl phthalate | 9.7 | m |
| Butyl alcohol | 11.4 | s | Ethyl acetate | 9.1 | m |
| Butyl butyrate | 8.1 | m | Ethyl amyl ketene | 8.2 | m |
| Carbon disulfide | 10.0 | p | Ethyl n-butyrate | 8.5 | m |
| Carban tetrachloride | 8.6 | p | Ethylene carbonate | 14.7 | m |
| Chlorobenzene | 9.5 | p | Ethylene dichloride | 9.8 | p |
| Chloroform | 9.3 | p | Ethylene glycol | 14.6 | s |
| Cresol | 10.2 | s | Ethylene glycol diacetate | 10.0 | m |
| Cyclohexanol | 11.4 | s | Ethylene glycol diethyl ether | 8.3 | m |
| Diamyl ether | 7.3 | m | Ethylene glycol dimethyl ether | 8.6 | m |
| Diamyl phthalate | 9.1 | m | Ethylene glycol monobutyl ether | 9.5 | m |
| Dibenzyl ether | 9.4 | m | (Butyl Cellosolve) | | |
| Dibutyl phthalate | 9.3 | m | Ethylene glycol monoethyl ether | | |
| Dibutyl sebacate | 9.2 | m | (Cellosolves) | 10.5 | m |
| 1 2-Dichlorobenzene | 10.0 | p | Furfuryl alcohol | 12.5 | s |
| Diethyl carbonate | 8.8 | m | Glycerol | 16.5 | s |
| Di(ethylene glycol) | 12.1 | s | Hexane | 7.3 | p |
| Di(ethylene glycol) monobutyl | 9.5 | m | Isopropyl alcohol | 8.8 | m |
| ether (Butyl CarbitoF) | | | Methanol | 14.5 | s |
| Di(ethylene glycol) monoethyl | 10.2 | m | Methyl amyl ketone | 8.5 | m |
| ether (Carbitol) | | | Methylene chloride | 9.7 | p |
| Diethyl ether | 7.4 | m | Methyl ethyl ketone | 9.3 | m |
| Diethyl ketone | 8.8 | m | Methyl isobutyl ketone | 8.4 | m |
| Diethyl phthalate | 10.0 | m | Propyl acetate | 8.8 | m |
| Di-n-hexyl phthalate | 8.9 | m | 1,2-Propylenecarbonate | 13.3 | m |
| Diisodecyl phthalate | 7.2 | m | Propylene glycol | 12.6 | s |
| N, N-Dimethy lacetamide | 10.8 | m | Propylene glycol methyl ether | 10.1 | m |
| Dimethyl ether | 8.8 | m | Pyridine | 10.7 | s |
| N N-Dimethyformamide | 12.1 | m | 1.1,2,2-Tetrachloroethane | 9.7 | p |
| Dimethyl phthalate | 10.7 | m | Tetrachloroethylene | 9.3 | p |
| Dimethylsiloxanes | 4.9-5.9 | p | (perchloroethylene) | | |
| Dimethyl sulfoxide | 12.0 | m | Tetrahydrofuran | 9.1 | m |
| Dioctyl adipate | 8.7 | m | Toluene | 8.9 | p |
| Dioctyl phthalate | 7.9 | m | Water | 23.4 | s |

[2]"Polymer Handbook", Eds. Brandrup, J.; Immergut, E.H.: Grulke, E.A., 4th Edition, John Wiley New York, 1999, VII/675-711. Aldrich Catalog Number
[3]H-Bonding: p = poor; m = moderate; s = strong

TABLE 3

Table III: Solubility Parameters (δ) for Plasticizers and Solvents (increasing δ value sequence)

| Solvent | δ (cal/cm³)^{1/2} | H-Bonding Strength[4] | Solvent | δ (cal/cm³)^{1/2} | H-Bonding Strength[4] |
|---|---|---|---|---|---|
| Dimethylsiloxanes | 4.9-5.9 | p | Di(ethylene glycol) monobutyl | 9.5 | m |
| Diisodecyl phthalate | 7.2 | m | ether (Butyl Carbitol ®) | | |
| Hexane | 7.3 | p | Chlorobenzene | 9.5 | p |
| Diamyl ether | 7.3 | m | Methylene chloride | 9.7 | p |
| Diethyl ether | 7.4 | m | Dipropyl phthalate | 9.7 | m |
| Dioctyl phthalate | 7.9 | m | 1,1,2,2-Tetrachloroethane | 9.7 | p |
| Butyl butyrate | 8.1 | m | Ethylene dichloride | 9.8 | p |
| Ethyl amyl ketone | 8.2 | m | Acetone | 9.9 | m |
| Ethylene glycol diethyl ether | 8.3 | m | 1,2-Dichlorobenzene | 10.0 | p |
| Butyl acetate | 8.3 | m | Diethyl phthalate | 10.0 | m |
| Methyl isobutyl ketone | 8.4 | m | Ethylene glycol diacetate | 10.0 | m |
| Methyl amyl ketone | 8.5 | m | Di(propylene glycol) | 10.0 | s |
| Amyl acetate | 8.5 | m | Carbon disulfide | 10.0 | p |
| Ethyl n-butyrate | 8.5 | m | 1,4-Dioxane | 10.0 | m |
| Ethylene glycol dimethyl ether | 8.6 | m | Propylene glycol methyl ether | 10.1 | m |
| Carbon tetrachloride | 8.6 | p | Difsthylene glycoli monoethyl | 10.2 | m |
| Dioctyl sebacate | 8.6 | m | ether (Carbitol ®) | | |
| Dioctyl adipate | 8.7 | m | Cresol | 10.2 | s |
| Isopropyl alcohol | 8.8 | m | Aniline | 10.3 | s |

TABLE 3-continued

Table III: Solubility Parameters (δ) for Plasticizers and Solvents (increasing δ value sequence)

| Solvent | δ (cal/cm$^3$)$^{1/2}$ | H-Bonding Strength[4] | Solvent | δ (cal/cm$^3$)$^{1/2}$ | H-Bonding Strength[4] |
|---|---|---|---|---|---|
| Diethyl carbonate | 8.8 | m | Ethylene glycol monoethyl ether (Cellosolve ®) | 10.5 | m |
| Propyl acetate | 8.8 | m | | | |
| Diethyl ketone | 8.8 | m | Pyridine | 10.7 | s |
| Dimethyl ether | 8.8 | m | Dimethyl phthalate | 10.7 | m |
| Toluene | 8.9 | p | N,N-Dimethylacetamide | 10.8 | m |
| Di-n-hexyl phthalate | 8.9 | m | Cyclohexanol | 11.4 | s |
| Ethyl acetate | 9.1 | m | Butyl alcohol | 11.4 | s |
| Diamyl phthalate | 9.1 | m | Acetonitrile | 11.9 | p |
| Tetrahydrofuran | 9.1 | m | Dimethyl sulfoxide | 12.0 | m |
| Dibutyl sebacate | 9.2 | m | Di(ethylene glycol) | 12.1 | s |
| Benzene | 9.2 | p | N,N-Dimethylformamide | 12.1 | m |
| Tetrachloroethylene (perchloroethylene) | 9.3 | p | Furfuryl alcohol | 12.5 | s |
| | | | Propylene glycol | 12.6 | s |
| Di(propylene glycol) monomethyl ether | 9.3 | m | 1,2- Propylenecarbonate | 13.3 | m |
| | | | Methanol | 14.5 | s |
| Chloroform | 9.3 | p | Ethylene glycol | 14.6 | s |
| Dibutyl phthalate | 9.3 | m | Ethylene carbonate | 14.7 | m |
| Methyl ethyl ketone | 9.3 | m | Glycerol | 16.5 | s |
| Dibenzyl ether | 9.4 | m | Water | 23.4 | s |
| Ethyleneglycol monobutyl ether (Butyl Cellosolve ®) | 9.5 | m | | | |

[4]H-Bonding. p = poor; m = moderate; s = strong
Carbitol and Cellosoive are registered trademarks of Unien Carbide Corp.

TABLE 4

Table IV: Solubility Parameters for Homopolymers5

| Repeating Unit (Alphabetical Sequence) | δ(cal/cm$^3$)$^{1/2}$ | Repeating Unit (Increasing δ Value Sequence) | δ(cal/cm$^3$)$^{1/2}$ |
|---|---|---|---|
| Acrylonitrile | 2.5 | Tetrafluoroethylene | 6.2 |
| Butyl acrylate | 9.0 | Isobutyl methacrylate | 7.2 |
| Butyl methacrylate | 8.8 | Dimethylsiloxane | 7.5 |
| Cellulose | 15.6 | Propylene oxide | 7.5 |
| Cellulose acetate (56% Ac groups) | 27.8 | Isobutylene | 7.8 |
| Cellulose nitrate (11.8% N) | 14.8 | Stearyl methacrylate | 7.8 |
| Chloroprene | 9.4 | Ethylene | 8.0 |
| Dimethylsiloxane | 7.5 | 1,4-cis-Isoprene | 8.0 |
| Ethyl acrylate | 9.5 | Isobornyi methacrylate | 8.1 |
| Ethylene | 8.0 | Isoprene, natural rubber | 8.2 |
| Ethylene terephthalate | 10.7 | Lauryl methacrylate | 8.2 |
| Ethyl methacrylate | 9.0 | isobornyl acrylate | 8.2 |
| Formaldehyde (Oxymethylene) | 9.9 | Octyl methacrylate | 8.4 |
| Hexamethylene adipamide (Nylon 6/6) | 13.6 | n-Hexyl methacrylate | 8.6 |
| n-Hexyl methacrylate | 8.6 | Styrene | 8.7 |
| Isobornyl acrylate | 8.2 | Propyl methacrylate | 8.8 |
| 1,4-cis-Isoprene | 8.0 | Butyl methacrylate | 8.8 |
| Isoprene, natural rubber | 8.2 | Ethyl methacrylate | 9.0 |
| Isobutylene | 7.8 | Butyl acrylate | 9.0 |
| Isobornyl methacrylate | 8.1 | Propyl acrylate | 9.0 |
| Isobutyl methacrylate | 7.2 | Propylene | 9.3 |
| Lauryl methacrylate | 8.2 | Chloroprene | 9.4 |
| Methacrylonitrile | 10.7 | Tetrahydrofuran | 9.4 |
| Methylacrylate | 10.0 | Methyl methacrylate | 9.5 |
| Methyl methacrylate | 9.5 | Ethyl acrylate | 9.5 |
| Octyl methacrylate | 8.4 | Vinyl chloride | 9.5 |
| Propyl acrylate | 9.0 | Formaldehyde (Oxymethylene) | 9.9 |
| Propylene | 9.3 | Methyl acrylate | 10.0 |
| Propylene oxide | 7.5 | Vinyl acetate | 10.0 |
| Propyl methacrylate | 8.8 | Methacrylonitrile | 10.7 |
| Stearyl methacrylate | 7.8 | Ethylene terephtalate | 10.7 |
| Styrene | 8.7 | Vinylidene chloride | 12.2 |
| Tetrafluoroethylene | 6.2 | Acrylonitrile | 12.5 |
| Tetrahydrofuran | 9.4 | Vinyl alcohol | 12.6 |
| Vinyl acetate | 10.0 | Hexamethylene adipamide(Nylon 6/6) | 13.6 |
| Vinyl alcohol | 12.6 | Cellulose nitrate (11.8% N) | 14.8 |
| Vinyl chloride | 9.5 | Cellulose | 15.6 |
| Vinylidene chloride | 12.2 | Cellulose acetate (56% Ac groups) | 27.8 |

[3]Values reported are for homopolymers of the Repeating Unit. Reported δ values vary with the method of determination and test conditions. Averaged values are given in this table.

Additional exemplary empirical solubility parameters (e.g. Flory Huggins are identifiable by a skilled person (see, e.g., Brandrup, J., et al., "Polymer handbook". Vol. 1999. 1999: Wiley New York [8]. and other available references known or identifiable by one skilled in the art)) Exemplary good solvents for the exemplary base polymer PVDF comprise Tetrahydrofuran, Methyl EThyl Ketone, Dimethyl formamide, Dimethyl acetamide, Tetramethyl urea, Dimethyl Sulfoxide, Trimethyl phosphate, N-Methyl-2-Pyrrolidone. Additional indication concerning good solvents for a PVDF polymer can be found in F. Liu et al./Journal of Membrane Science 375 (2011) 1-27 [9]. A skilled person can determine if other solvents would be good solvents for PVDF or if other base polymers or other polymers (e.g. functionalizing polymers their precursor, polymeric particle precursors) would be substantially soluble in these solvents or other solvents or compositions by applying the same calculations using the particular solubility parameters for the particular solvent and/or composition.

Exemplary linear polymers that can be used as building blocks for the base polymer of membranes with in-situ generated dendrimer particles include polyvinylidene fluoride (PVDF), polyethersulfone (PES), polysulfone (PSI), polyacrylonitrile (PAN) and polyamides (PAM) and additional polymer of formula (I) herein described. Good solvents for these polymers are expected to comprise n-methyl-2-pyrrolidone (NMP), dimethyl formamide (DMF), dimethyl acetamide (DMAc), triethyl phosphate (TEP) and dimethyl sulfoxide (DMSO).

The method further comprises adding a polymeric particle precursor in the base polymer solution to obtain a blend and in particular a dispersion of particle precursor in the base polymer solution. Given a certain base polymer solution a particle precursor can be selected to have: a portion substantially soluble in a solvent (or mixture of solvents) compatible with that used to dissolve the base polymer and a portion substantially insoluble with said solvent. Accordingly, the particle precursor can be selected for the ability to form dispersed/segregated domains and in particular aggregates of surfactant molecules (e.g. micelles) dispersed in the base polymer solution as will be understood by a skilled person. Exemplary expected membrane particle precursors include functional monomers/polymers, block copolymers: branched polymers/dendrimers. Preferred particle precursors include aliphatic amines, aromatic amines, anhydrides, polyamines (linear, branched and dendritic) and epoxides and other compound presenting hydroxyl groups.

A variety of low-generation dendrimers and coupling agents (for example, crosslinkers) can be utilized as precursors for the preparation of dendrimer particles in a membrane casting solution. FIGS. 9-14 list selected low-generation dendrimers from several commercial sources.

In some embodiments, preparing a base polymer solution and adding a particle precursor is performed to control the sizes of the segregated domains of precursor particles, which on their turn control the sizes of the in-situ synthesized dendrimer particles and/or nanoparticles. In particular, with the in situ method the dendrimer particles and/or nanoparticles can be synthesized which have a diameter in a range of from approximately 10-100 nm to approximately 2-4 µm and depend on several factors including the (i) chemistry and molecular weight of the particle precursor, (ii) intensity and duration of mixing (e.g. sonication versus slow stirring) and (ii) the addition of a dispersion stabilizer (e.g. surfactant). For example, a mixture of (i) base polymer and solvent, (ii) particle precursor formed by a monomer/oligomer of [molecular weight ($M_n$) of 100-1000] and (iii) a surfactant (e.g. sodium dodecyl sulfate) is expected to be sonicated to prepare a membrane casting solution containing segregated domains of particle precursors of 10-100 nm in sizes. In contrast, the slow stirring of a mixture of base polymer and solvent and (ii) monomer/polymer [Molecular weight ($M_e$) of 300-100000] is expected to be required to prepare a membrane dope containing segregated domains of particle precursors of sizes ranging from 0.5 to 4 µm depending on the specific combination of based polymer, polymer particles precursor and/or stirring conditions.

Figure 15:
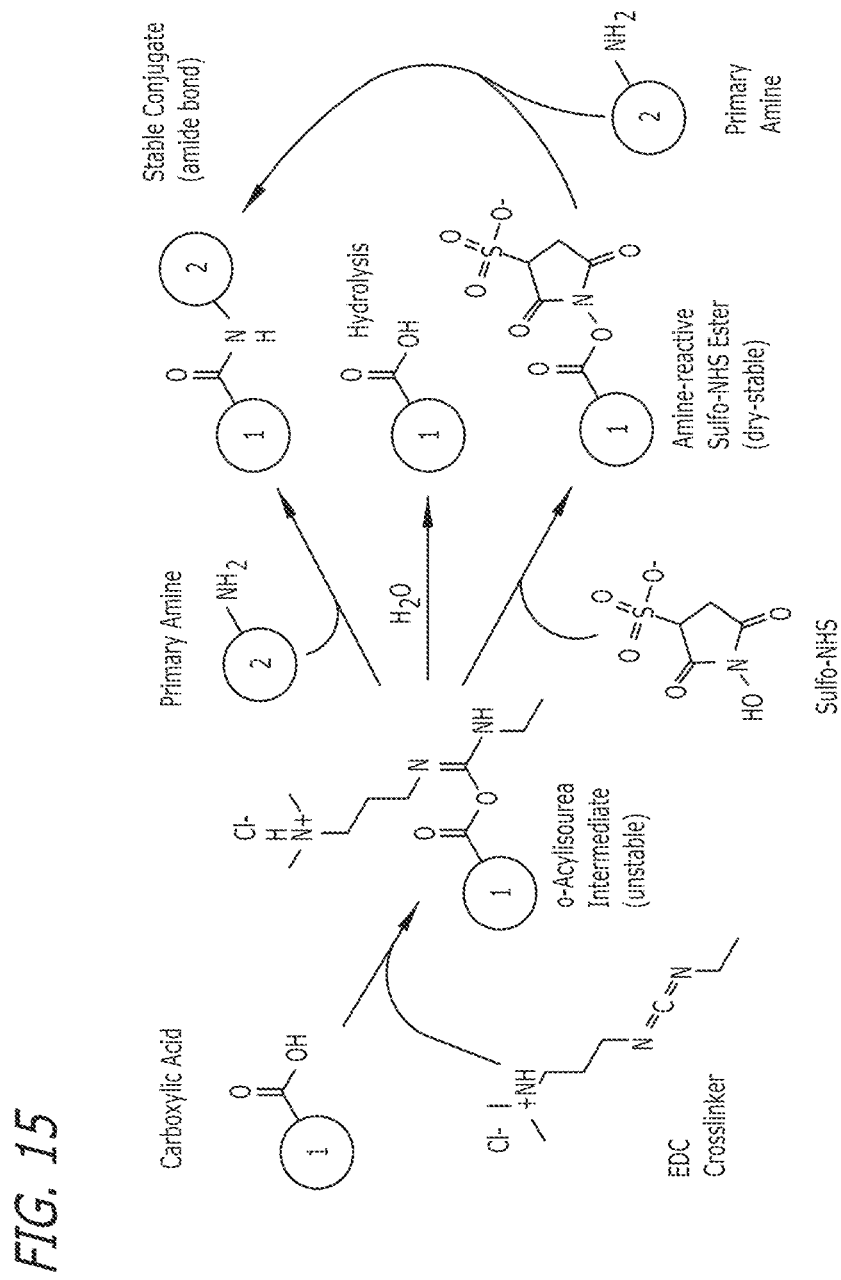
FIG. 15 illustrates an exemplary embodiment of forming dendrimer particles using EDC coupling.
Figure 16:
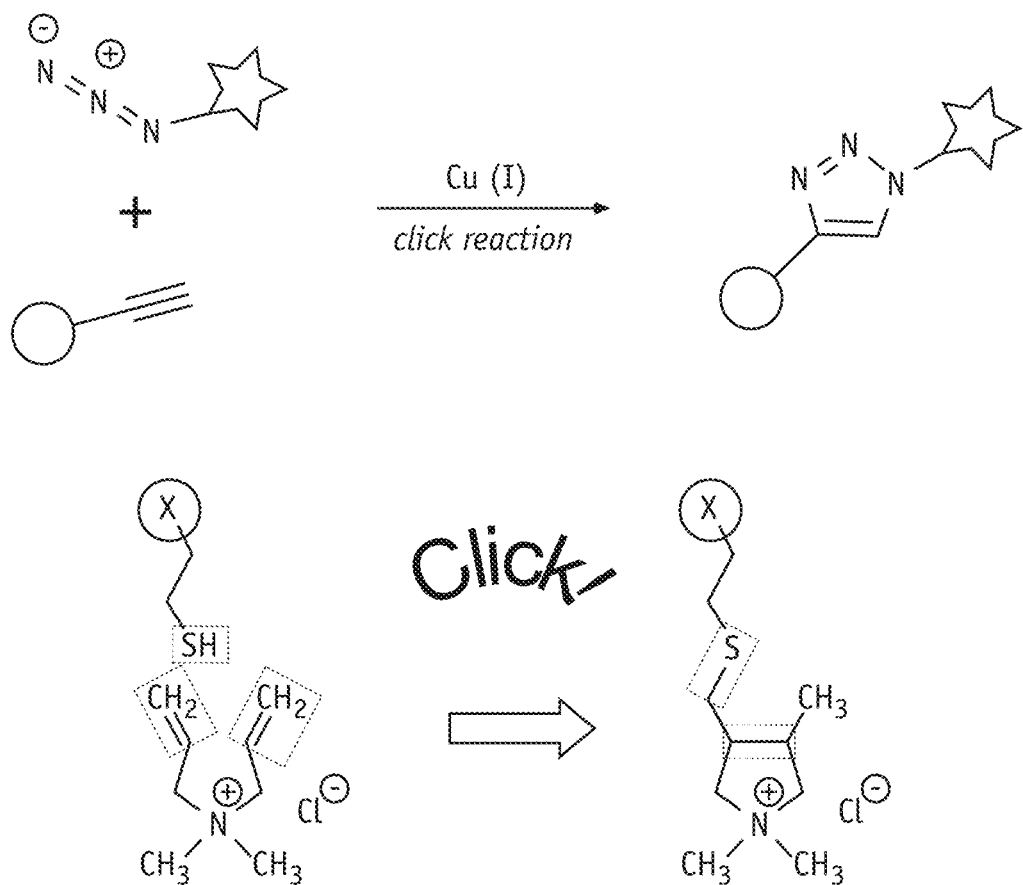
FIG. 16 illustrates an exemplary embodiment of forming dendrimer particles using click chemistry.
Figure 17:
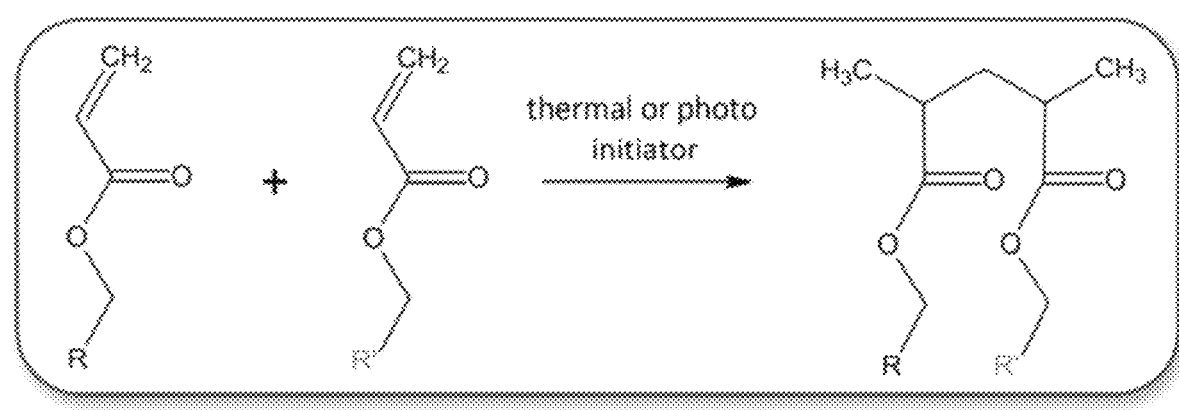
FIG. 17 illustrates an exemplary embodiment of forming dendrimer particles using acrylate polymerization with an initiator.

The method to prepare dendrimer particles by coupling low-generation dendrimers in a membrane casting solution varies depending on the chemistry of the dendrimer terminal groups (e.g. amines, carboxylic acids, azides, thiols and acrylates). The methods can include (i) EDC coupling (FIG. 15), (ii) click chemistry (FIG. 16) and (iii) in-situ polymerization using an initiator (FIG. 17).

In some embodiments, the method to prepare an in situ membrane further comprises adding crosslinker and/or an initiator capable of reacting with the polymer particle precursor to the blend to synthesize the polymeric particles in a membrane casting solution formed by a base polymer a solvent, polymeric particle precursor and the crosslinker and/or initiator.

A cross-link is a bond that links one polymer chain to another. They can be covalent bonds or ionic bonds. Exemplary crosslinkers include diacrylates, dimethacrylates, diepoxides, dihalides, diisocyanates, diacyl chlorides, dianhydrides.

Preferred crosslinkers include diepoxides, dihalides, diacyl chlorides and dianhydrides with small molecular weights (Mn of 90-300). Preferred crosslinker monomers include epoxides, acrylics, amines, acid chlorides and others that can be used to prepare polymeric particles in solutions herein described. Exemplary crosslinkers for particle formation herein described comprise the compounds described in Table 5 corresponding to Table 2 of U.S. Pat. No. 7,459,502 [10].

TABLE 5

| Structure | Mw |
|---|---|
|  | 92.52 |
|  | 174.19 |
|  |  |
|  | 302.37 |

TABLE 5-continued
| Structure | Mw |
|---|---|
| 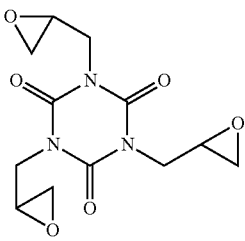 [SMILES: O=c1n(CC2CO2)c(=O)n(CC2CO2)c(=O)n1CC1CO1] | 297.27 |
| 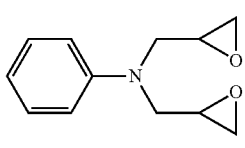 | 277.32 |
| 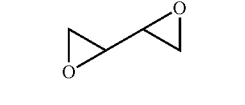 | 86.09 |
| 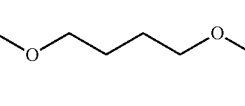 | 202.25 |
| 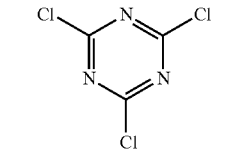 | 184.41 |
| 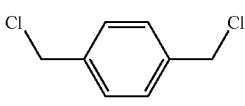 | 175.06 |
| 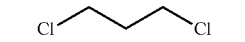 | 112.99 |
| 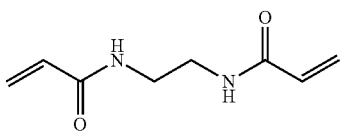 | 168.2 |
| 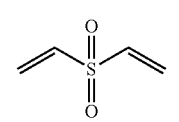 | 118.16 |
| 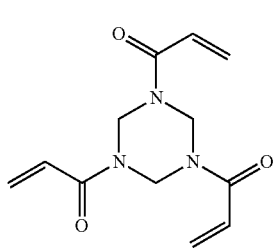 [SMILES: C=CC(=O)N1CN(C(=O)C=C)CN(C(=O)C=C)C1] | 249.27 |
| 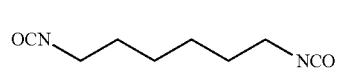 | 168.19 |
TABLE 5-continued
| Structure | Mw |
|---|---|
|  | 174.16 |
| 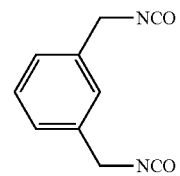 | 188.18 |
| 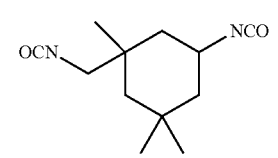 | 222.28 |
| 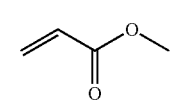 | 86.00 |
| 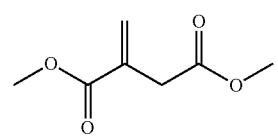 | 158.16 |
| 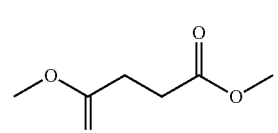 | 146.14 |
| 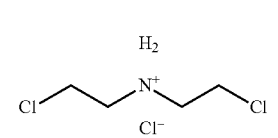 | 178.49 |
| 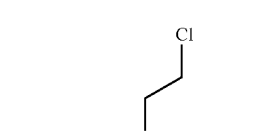 | 240.99 |
| 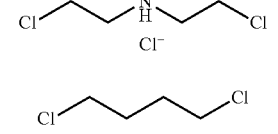 | 127.01 |
| 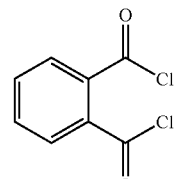 | 203.02 |

TABLE 5-continued

| Structure | Mw |
|---|---|
| 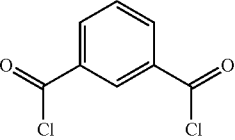 [SMILES: O=C(Cl)c1cccc(C(=O)Cl)c1] | 203.02 |
| 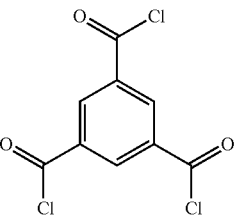 [SMILES: O=C(Cl)c1cc(C(=O)Cl)cc(C(=O)Cl)c1] | 265.48 |
| 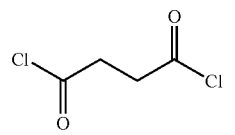 | 154.98 |
| 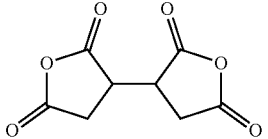 [SMILES: O=C1CC(C2CC(=O)OC2=O)C(=O)O1] | 198.13 |
| 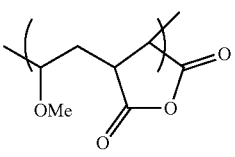 | |
| 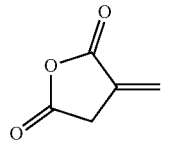 | 112.08 |
| 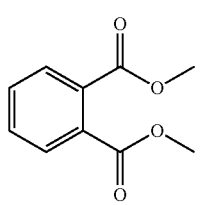 | 194.19 |
| 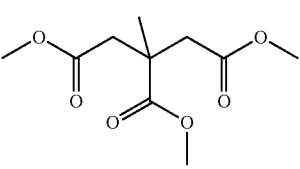 | 234.2 |
| 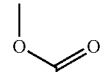 | 252.22 |
| 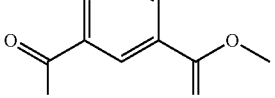 | 194.19 |
| 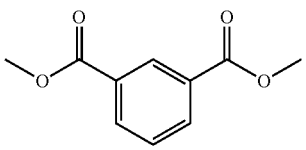 | 178.14 |
| 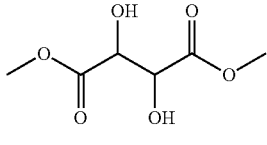 | 108.53 |

An initiator indicates a source of any chemical species that reacts with a monomer (single molecule that can form chemical bonds) to form an intermediate compound capable of linking successively with a large number of other monomers into a polymeric compound. The most widely used initiators produce free radicals (reactive atoms or groups of atoms that contain odd numbers of electrons); examples include peroxides and aliphatic azo compounds used to polymerize vinyl chloride, methyl methacrylate, and other monomers. Acid-forming systems such as boron trifluoride with traces of water react with a monomer to produce a positively charged (cationic) intermediate. Such initiation is used in the conversion of isobutylene to butyl rubber. Reaction of metallic sodium and biphenyl produces an anionic initiator that causes formation of polymer chains with reactive sites at both ends; these may be further treated with a different monomer to yield block copolymers. For example, Polypropylene and high-density polyethylene are prepared by use of Ziegler catalysts, which are initiators composed of organometallic compounds and metallic halides, such as triethylaluminum and titanium tetrachloride.

An exemplary initiator capable of reacting with a polymeric particle precursor herein described is benzyl chloride. Additional initiators can be identified by a skilled person in view of information known to a skilled person (see e.g. M. Talha Gokmen, Filip E. Du Prez*Progress in Polymer Science 37 (2012) 365— 405 [11]) and the content of the present disclosure. Additional methods and techniques to make polymeric particles known to a skilled person (e.g. Strathmann, Introduction to Membrane Science and Technology.Wiley-VCH Verlag: Weinheim, 2011, and V. Mittal, (Ed). Advanced Polymer Nanoparticles-Synthesis and Surface Modifications. CRC Press; Boca Raton (Florida), 2011, Chap 1, 1-28 [12]) can also be adapted to in situ particle formation by modifications that allow to avoid precipitation.

In some embodiments, the method further comprises performing membrane preparation by phase inversion casting by mixing the dope with a non-solvent (a solvent substantially incompatible with the base polymer solvent). Note that the membrane can be casted onto a suitable support (e.g. s glass plate) and then peeled off to form a self-supporting membrane. Alternatively, the membrane can be casted onto a microporous [e.g. polyethylene terephthalate (PET)] support, a layer of a multilayered membrane or another membrane (e.g. a mesh) to form a bicomposite membrane herein described.

In some embodiments, the concentration of base polymer in the membrane is not less than about 40%, and preferable not less that about 50%, In some embodiments the concentration of polymeric particles is about 50% possibly about 60%. In some embodiments the concentration of polymeric particles is not more than 60% to conserve the support to the membrane provided by the porous polymeric aggregate formed by the base polymer.

In some embodiments, the polymer that will form the porous polymer aggregate can be selected based on desired features such as morphology, structural strength, and others known to a skilled person [13] as well as compatibility based on thermodynamic parameters identifiable to a skilled person. For example, one desired feature can be the presence of skin layers on either side of the membrane when observed in cross section (see e.g. FIG. 21-23 of the instant application and FIG. 6 of related application U.S. Ser. No. 13/754,883 published as US20130213881). In particular, the thickness of one of the skin layers can be decreased by increasing the amount of polymer to form the polymeric nanoparticles in the blend of polymer to form the polymeric nanoparticles and polymer to form the polymer matrix (see, e.g. Example 5 and FIG. 21 of the instant application and Example 2 and FIG. 6 of related application U.S. Ser. No. 13/754,883 published as US20130213881).

For example, another desired feature can be particle size. In particular, the size of the dendrimer particles can be decreased by increasing the amount of polymer to form the polymeric nanoparticles in the blend of polymer to form the polymeric nanoparticles and polymer to form the polymer matrix (see, e.g. Example 1 and FIGS. 4-7 of the related U.S. Ser. No. 14/447,574 and Example 2 and FIG. 6 and FIG. 7 related application U.S. Ser. No. 13/754,883 published as US20130213881).

For example, another desired feature can be porosity as determined by imaging (e.g. with SEM) of the surface of the membrane. In particular, the number of pores can be increased by increasing the amount of polymer as well as the type of polymer to form the dendrimer particles in the blend of polymer to form the polymeric nanoparticles and polymer to form the polymer matrix (see, e.g., Example 5 and FIGS. 22-26 of the instant application, Example 1 and FIG. 4, FIG. 5, FIG. 6 and FIG. 7 of U.S. Ser. No. 14/447,574 and Example 2 and FIG. 7 of related application U.S. Ser. No. 13/754,883 published as US20130213881).

Factors to be considered comprise having a solubility parameter (see, e.g., [7, 14, 15]) similar to that of polymer that will form the polymeric nanoparticles, as well as favorable interactions between the comprising the polymer that will form the polymer matrix and the polymer that will form the polymeric nanoparticles. In particular, the similarity of solubility parameters can ensure that the polymer forming the polymeric nanoparticles is sufficiently distributed in the blend of polymer that will form the polymeric nanoparticles and polymer that will form the polymer matrix (as determined, for example, by inspection of the turbidity and viscosity of the blend) such that a membrane with a desired concentration of nanoparticles is obtained. For example, in embodiments, wherein a concentration of greater than about 20 wt % is desired, PVDF or other fluorinated polymer can be chosen as the polymer for the polymer matrix. In another example wherein a membrane with similar features is desired a poly(ether sulfone) polymer or other polymer with ether groups and/or sulfonyl and/or carbonyl groups can be chosen as the polymer for the polymer matrix thus providing a homogeneous blend adapted to form particles, and in particular discrete particles, in situ when a cross-linker is added to the blend form a dope with homogeneously distributed discrete to form the membrane as described herein (see, e.g., Example 2 of the instant application, Example 1 and 2 of U.S. Ser. No. 14/447,574 and Examples 1-3 and 21 of related application U.S. Ser. No. 13/754,883 published as US20130213881).

In particular, the in situ formation of the microparticles and/or nanoparticles can be controlled by parameters such as relative concentration of the polymers to form the matrix and nanoparticles and cross linker (see, e.g. Example 2 of the instant application, Examples 1 and 2 of U.S. Ser. No. 14/447,574 and Example 21 of related application U.S. Ser. No. 13/754,883 published as US20130213881) such that the membranes produced have discrete particles in which formation of nanoparticle clusters is minimized (see e.g. FIG. 58B of related application U.S. Ser. No. 13/754,883 published as US20130213881) as well as fractal growth as can occur in membranes when the particles are preformed and blended with the polymer that will form the polymer matrix. In particular, the membranes with in situ generated nanoparticles can have nanoparticles in concentrations exceeding about 20 wt % and in particular, exceeding about 40 wt %.

In particular, in some embodiments, membrane compositions, methods and applications herein described comprise (i) a linear polymer (e.g. poly(vinylidinefluoride) [PVDF]) as base membrane polymer, (ii) a polyamine (e.g. G0 or G1 Poly(amidoamine) (PAMAM) as polymeric particle precursor, (iii) a crosslinker, (e.g. an epoxide such as epichlrohydrin [ECM]) and (iv) an initiator (e.g. hydrochloric acid (HCl).

In other embodiments, filtration membranes herein described can be formed by a process wherein nanoparticles can be added to the membrane ex situ in addition or in the alternative to nanoparticles formed with the in situ method. In particular, in some of these embodiments, the nanoparticles can be performed by cross linking suitable polymeric nanomaterial separately from the polymer forming the matrix (see e.g. Examples 4, 5, and 14 of related application U.S. Ser. No. 13/754,883 published as US20130213881) and then mixed with the polymer that will form the polymer matrix to form a dope with preformed polymeric nanoparticles. The method can further comprise casting the dope to form the membranes as described herein (see, e.g., Examples 1 and 20 of U.S. Ser. No. 14/447,574). In particular, the membranes made with preformed nanoparticles in the dope can have clusters of nanoparticles (see e.g. FIG. 58B of related application U.S. Ser. No. 13/754,883 published as US20130213881) from fractal growth. In particular, the membranes with ex situ generated preformed nanoparticles can have nanoparticles in concentrations between about 1 wt % and about 10 wt %.

In some embodiments, the polymer aggregate of the polymer matrix can be formed by a polymer having a formula

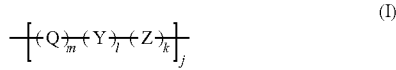
(I)

wherein:
Q, Y, and Z comprise saturated aliphatic hydrocarbon, aromatic hydrocarbon, or unsaturated aliphatic hydrocarbons;
m, l, and k independently are integers ranging between 0-50;
at least one of m, l, k is not equal to zero;
j is an integer ranging between 50-500; and
at least one of Q (when Q 0), Y (when Y 0), or Z (when Z 0), comprises the polymer corresponding functional group.

The term "saturated aliphatic hydrocarbon" as used herein refers to a hydrocarbon comprising, carbon atoms that are joined together in straight chains, branched chains, or non-aromatic rings in which the carbon-carbon bonds are saturated with hydrogen (e.g. methane, ethane, propane, isobutane, and butane). For example, in saturated aliphatic hydrocarbons have a general formula of $C_nH_{2n+2}$ for acyclic saturated aliphatic hydrocarbons and $C_nH_{2n}$ cyclic saturated aliphatic hydrocarbons. Saturated aliphatic hydrocarbon can be substituted with one or other elements, for example, N, O, S, P, F, Cl, Br, and I.

The term "aromatic hydrocarbon" as used herein refers to a hydrocarbon comprising a conjugated ring of unsaturated bonds, lone pairs, and/or empty orbitals which can exhibit a stabilization stronger than expected by the stabilization by conjugation alone. An exemplary aromatic compounds is benzene which is a six-membered ring having alternating double and single bonds between carbon atoms. Aromatic hydrocarbons can be monocyclic (MAH) (e.g. benzene) or polycyclic (PAH) (e.g. naphthalene, anthracene, pyrene). Aromatic hydrocarbons can be substituted with one or other elements, for example, N, O, S, P, F, Cl, Br, and I.

The term "unsaturated aliphatic hydrocarbon" as used herein refers to a hydrocarbon comprising carbon atoms that are joined together in straight chains, branched chains, or non-aromatic rings and comprise at least one of a double or a triple bond between adjacent carbon atoms, referred to as "alkenes" and "alkynes", respectively. An unsaturated hydrocarbon can comprise one or more of double or triple bonds. In hydrocarbons having more than one double or triple bond, the unsaturated hydrocarbon can be conjugated (e.g. 1,4-hexadiene) or can be isolated (e.g. 1,5-hexadiene). In hydrocarbons comprising internal alkenes, the alkenes can be in a "cis" or a "trans" configuration (e.g. trans-2-butene or cis-2-butene). Unsaturated aliphatic hydrocarbon can be substituted with one or other elements, for example, N, O, S, P, F, Cl, Br, and I.

In particular in some embodiments, Q, Y, and Z in formula (I) can independently selected from the following formulas:

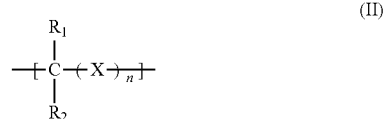
(II)

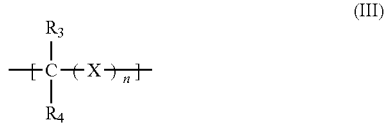
(III)

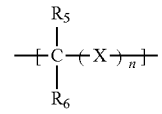
(IV)

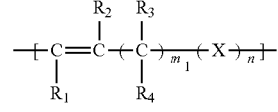
(V)

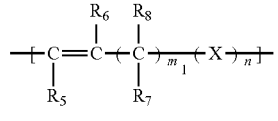
(VI)

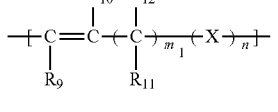
(VII)

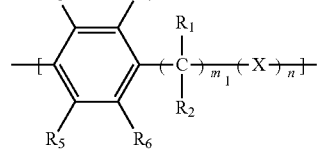
(VIII)

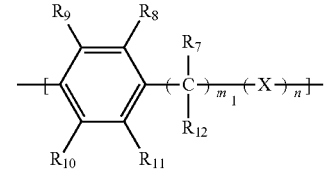
(IX)

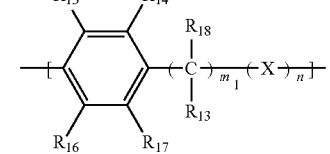
(X)

wherein:
n=0 or 1;
$m_1$ is an integer ranging from 0-15;
X is a functional group comprising an atom selected from O, S, N, P, or F; and
$R_1$-$R_{18}$ are independently selected from: the polymer component functional group; hydrogen; $C_1$-$C_{20}$ linear, branched, saturated, unsaturated, or aryl hydrocarbon which are either substituted or unsubstituted with O, N, B, S, P; or substituted O, N, B, S, or P;
and at least one of $R_1$-$R_{18}$ is the polymer corresponding functional group attaching the dendrimer component.

Exemplary linear polymer materials for producing a polymeric aggregate made from linear polymers herein described comprise polysulfone (PS), polyether sulfone (PES), poly(vinylidene) fluoride (PVDF), poly(tetrafluoroethylene) (PTFE), poly(acrylonitrile) (PAN), poly(methacrylic acid) (PMAA), poly(acrylic acid) (PAA), poly(vinyl methyl ketone), and poly(ethylene terephthalate) (PET).

In some embodiments, the polymer forming the polymeric microparticles and/or nanoparticles embedded in the polymer matrix can be one or more polymers of formula (I)

covalently linked (e.g. by a suitable initiator to form microparticles and/or nanoparticles). In particular, exemplary linear polymer materials for producing polymeric nanoparticles made from linear polymers herein described comprise polysulfone (PS), polyether sulfone (PES), poly (vinylidene) fluoride (PVDF), poly(tetrafluoroethylene) (PTFE), poly(acrylonitrile) (PAN), poly(methacrylic acid) (PMAA), poly(acrylic acid) (PAA), poly(vinyl methyl ketone), and poly(ethylene terephthalate) (PET). Additional polymers suitable as a polymer component herein described comprise polymers which can be used as base polymers in the fabrication of commercial UF/MF membranes, polymer which is either partially soluble or can be dispersed in solvents with different physicochemical properties together with nanoparticles according to the disclosure, and polymers which can be functionalized, which are identifiable by a skilled person upon reading of the present disclosure (see e.g. [7, 12, 14]).

Suitable polymeric nanoparticles according to embodiments herein described can be selected for a given polymer matrix based on compatibility with the polymer aggregate which can be determined based on the presence of corresponding functional group capable of attachment as well as possibly other features such as solubility of the polymer that forms the polymeric nanoparticles for in situ nanoparticle formation (or solubility of the preformed polymeric nanoparticles for preformed nanoparticle formation) together with the polymer that forms the polymer matrix in a particular solvent or mixture of solvents, affinity of the dendritic component for polymeric component, and/or stability of the dendritic component in a solvent to be used in the fabrication of the membrane. By way of example, compatibility can be determined by the polymeric nanoparticle possessing functional groups (e.g. amine groups or carboxylic acid or hydroxyl groups) capable of interacting with functional groups on the polymer matrix (e.g. fluoride atoms or oxygen atoms) and/or by the polymers used to make the polymer matrix and polymeric nanoparticles having similar solubility parameters (see e.g. [7, 12, 14]). In particular, if the polymeric nanoparticle possesses amine groups (e.g. PMAM, PPI, or bis-MPA) then a polymer to form the polymer matrix can be chosen which possesses fluoride atoms; if the polymeric nanoparticle possesses carboxylic acid or hydroxyl groups (e.g. MPA or bis-MPA polyester-16-hydroxyl) then a polymer to form the polymer matrix can be chosen which possesses oxygen atoms (e.g. a poly(sulfone) or poly(ether sulfone) polymer).

In some embodiments, the polymers that can be used as polymeric particle precursor to form dendrimer particles herein described can be a branched low-generation dendritic molecules and in particular the branched low-generation dendritic molecules according to general formula (XI) for a dendrimer core having four anchor atoms.

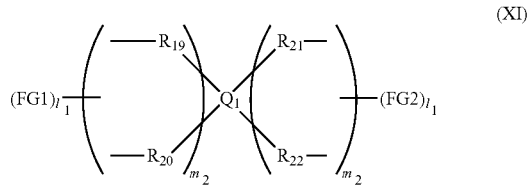
(XI)

wherein:
$m_2$ is an integer ranging from 1-4;
$R_{19}$-$R_{22}$ are branch cell units, each branch cell unit comprising a head attachment atom and one to four tail attachment atoms joined to form a chemical moiety wherein the head attachment atom and one to four tail attachment atoms are linked by covalent bond, such as carbon-nitrogen bond of an amide, carbon-oxygen bond an ester, carbon-carbon single or double bond.
FG1 and FG2 are terminal functional groups, independently selected from amines, hydroxyl group, carboxylic acids, azides, thiols, diacetylenyl, and acrylates. The FG1 and FG2 groups can be the same or different.
$L_1$ is equal to $2m_1$; and
$Q_1$ is a core, having a formula selected from:

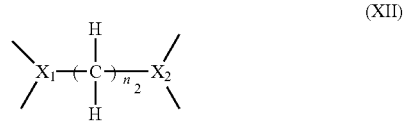
(XII)

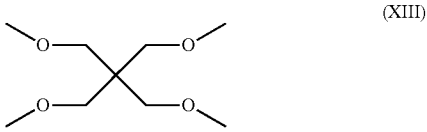
(XIII)

(XIV)

wherein $n_2$ is an integer from 1 to 18

In formula (XI), the dendrimer core Q has four anchor atoms connecting to the branch cell units. In some other embodiments, the dendrimer core can have two to six anchor atoms.

In embodiments of the precursor of formula (XI), FG1 and FG2 are directly or indirectly attached to the terminal groups of the outmost shell of the dendritic molecules. In embodiments herein described $2l_1$=Z wherein Z is the number of terminal functional groups.

In some embodiments, a branch cell unit can include amidoamine groups or ester hydroxyl groups.

In some embodiment, the head attachment atom and tail attachment atom of a successive branch cell unit can form a chemical group selected from one of 1,4-disubstituted-1,2,3-triazole, carbonato (—O—(CO)—O—), carbamoyl (—(CO)—NH—), thiocarbamoyl (—(CS)—NH—), carbamido (—NH—(CO)—NH—), carbamate (—O(CO)—NH—), imino (—CR=N—) where R=$C_1$-$C_{12}$ alkyl, $C_5$-$C_{12}$ aryl, $C_6$-$C_{12}$ alkaryl, $C_6$-$C_{12}$ aralkyl), boronato (—B(OR)O—) wherein R=$C_1$-$C_{12}$ alkyl, $C_5$-$C_{12}$ aryl, $C_6$-$C_{12}$ alkaryl, $C_6$-$C_{12}$ aralkyl), phosphonato (—P(O)(O$^-$)OR—, wherein R=$C_1$-$C_{12}$ alkyl, $C_5$-$C_{12}$ aryl, $C_6$-$C_{12}$ alkaryl, $C_6$-$C_{12}$ aralkyl), and chemical group form by any coupling chemistry that is known to a person of skill.

In some embodiment, a branch cell unit of head attachment atom and tail attachment atoms can be an alkyl, aryl, substituted aryl aromatic (e.g. benzene, naphthalene, anthracene or others identifiable to a skilled person) or aliphatic (e.g. cyclobutane, cyclopentane, cyclohexane, decalin, or others identifiable to a skilled person), spirane, fused rings.

In some embodiment, a branch cell unit of head attachment atom and tail attachment atoms can be C1-C15 alkyl; branched linear C3-C15 alkyl; cyclic C3-C15 alkyl; linear, cyclic, or branched C2-C15 alkenyl; linear, cyclic, or branched C2-C15 alkynyl; C6-C20 substituted or unsubstituted aryl; and C6-C20 substituted or unsubstituted heteroaryl groups.

Examples of heteroaryl groups include pyrrolyl, pyrrolidinyl, pyridinyl, quinolinyl, indolyl, pyrimidinyl, imidazolyl, and examples of heteroatom-containing alicyclic groups are pyrrolidino, morpholino, piperazino, piperidino groups.

In some embodiment, a branch cell unit of head attachment atom and tail attachment atoms can be aryl groups having 5 to 24 carbon atoms, or aryl groups can contain 5 to 14 carbon atoms. Exemplary aryl groups can contain one aromatic ring or two fused or linked aromatic rings, e.g., phenyl, naphthyl, biphenyl, diphenylether, diphenylamine, benzophenone, and the like.

In particular, in some embodiments, the low-generation dendrimers according to some embodiments have the general formula XV below:

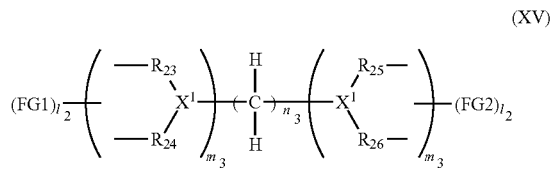

$m_3$ is an integer from 1 to 4;
$X^1$ is N;
$R_{23}$-$R_{26}$ are independently amidoamine groups;
FG1 and FG2 are terminal groups, independently selected from amines, hydroxyl group, carboxylic acids, azides, thiols, diacetylenyl, and acrylates, and connected to each of the $R_{23}$, $R_{24}$, $R_{25}$ and $R_{26}$;
$n_3$ is an integer from 1 to 18 and
$L_2$ is equal to $2m_3$.

In embodiments herein described in polymeric particle precursor of formula (XV) $2l=Z$ wherein Z is the number of terminal functional groups.

More particularly, in some embodiments, the low-generation dendrimers according to some embodiments have the general formula XVI below:

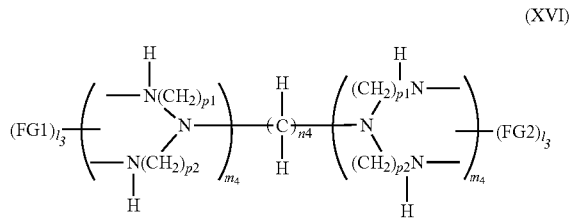

wherein $n_4$ is an integer from 2-10; $p_1$ and $p_2$ are independently an integer from 2-5; $m_4$ is an integer from 1-4; $l_3$ is equal to $2m_4$; FG1 and FG2 are terminal groups, independently selected from amines, carboxylic acids, azides, thiols, diacetylenyl, and acrylates.

In embodiments herein described in polymeric particle precursor of formula (XVI) $2l_3=Z$ wherein Z is the number of terminal functional groups.

In some embodiments, the low-generation dendrimer to form dendrimer particles according to some embodiments comprises a core, a plurality of arms extending from the core, the arms having a branched structure, and within the branched structure, a plurality of units satisfying having the formula:

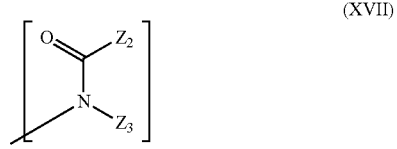

where $Z_2$ and $Z_3$ are independently a C1 to C20 substituted or unsubstituted alkyl or aromatic moiety wherein $Z_2$ comprises no nitrogen atoms that are simultaneously bound to two or more carbon atoms, for example, secondary and tertiary amines or amides.

In some embodiments the dendritic component comprises the formula:

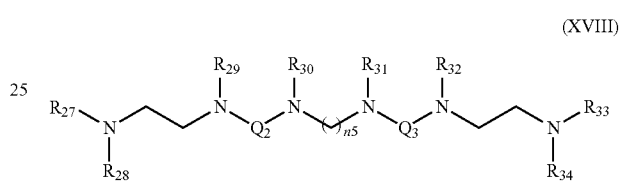

where $n_5$ is an integer ranging from 2-5, each of $Q_1$ and $Q_2$ comprises linear or branched polymer moiety, and $R_{27}$ to $R_{34}$ are independently selected from hydrogen, an substituted or unsubstituted alkyl or aromatic group, or a substituted or unsubstituted 2-hydroxyalkyl group.

In particular, in some embodiments, when groups $Z_1$, $Z_2$, $Z_3$ and $Q_1$, $Q_2$ and $Q_3$ of formulas XI-XVIII comprise linear or branched polymer moieties with amino and/or alcohol groups, the molecules can be converted to nano/microparticles by cross linking the molecules with cross-linking reagents described herein (e.g. 1,3-dibromopropane or epichlorohydrin) using inverse micelles as described herein (see e.g. Examples). In particular, in some embodiments, the formation of the particles can occur by blending polymers that comprise the polymer matrix with polymers that form the polymeric nanoparticles to form a blend, and adding a cross-linker to form a dope with in situ generated dendrimer particles, and in particular dendritic nanoparticles as described herein (see, e.g. Examples 1 and 2).

In particular, in some embodiments, the branched dendritic molecules to form polymeric nanoparticles can comprise low generations of poly(amidoamine) (PAMAM) dendrimers (for example, G0, G1, G2 or G3 PAMAM); low generations of poly(propyleneimine) (PPI) (for example, G1 or G2 PPI); low generation 2,2-bis(methylol)propionic acid (bis-MPA); 2 cyclotriphosphazene-phenoxymethyl(methylhydrazono) (PMMH) dendrimer (G1 PMMH) and other low-generation dendrimers of various core chemistry and terminal groups are shown in FIGS. 9-14.

Suitable polymer components comprising the polymer matrix can be selected for a given dendritic component based on compatibility which can be determined based on the presence of corresponding functional group capable of attachment as well as possibly other features such as thermodynamic parameters such as solubility of the polymer component together with the dendrimer component in a particular solvent or mixture of solvents, affinity of the polymer component for the dendritic component (e.g. the ability to hydrogen bond or have an electrostatic attraction), and/or stability of the polymer component in a solvent to be used in the fabrication of the membrane.

In some embodiments, the dendrimer particles formed by polymeric particle precursor of formula (XI) herein described can have in the following formula:

polymer component of the polymer matrix typically through a covalent and/or a hydrogen bond. For example, in some embodiments, when the polymeric components of formulas I-XI comprise fluorine and/or sulfonyl groups (e.g. PVDF or PES), dendritic components of formulas XII-XV comprising amino groups can attach to the polymeric component through hydrogen bonds from the amino hydrogen atoms to

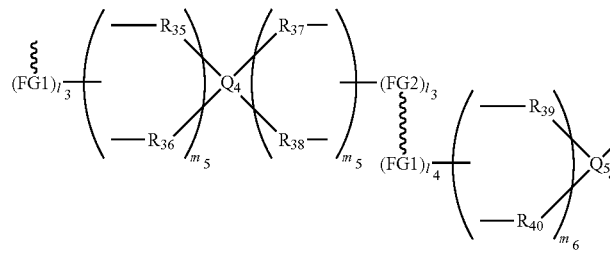

(XIX)

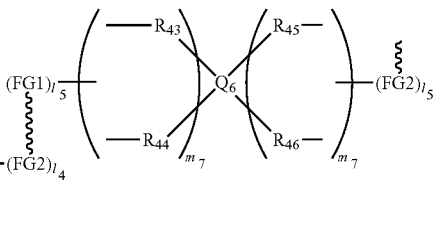

$m_5$, $m_6$, or $m_7$ are independently an integer selected from 1-4;
$l_3$ is equal to 2 $m_5$; $l_4$ is equal to 2 $m_6$; $l_5$ is equal to 2 $m_7$; $R_{35}$-$R_{46}$ are branch cell units each independently comprising a head attachment atom and one to four tail attachment atoms joined to form a chemical moiety wherein the head attachment atom and one to four tail attachment atoms are linked by covalent bond, the branch cell unit chemical moiety comprising amidoamine groups and/or ester hydroxyl groups;
$Q_4$, $Q_5$ and $Q_6$ are independently a core, having a formula selected from:

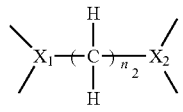

(XII)

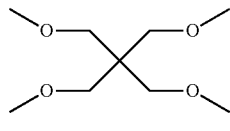

(XIII)

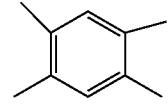

(XIV)

wherein $n_2$ is an integer from 1 to 18
FG1 and FG2 are terminal functional groups, independently selected from amines, hydroxyl group, carboxylic acids, azides, thiols, diacetylenyl, and acrylates. In particular, FG1 and FG2 are cross-linked to one another either directly or indirectly via a cross-linking agent.

In embodiments of dendrimer particle of formula (XIX) $l_3+l_4+l_5=Z$ wherein Z is the number of terminal functional groups. In embodiments of dendrimer particle of formula (XIX), the head attachment atom and tail attachment atom of each cell unity can be a covalent bond such as carbon-nitrogen bond of an amide, carbon-oxygen bond an ester, carbon-carbon single or double bond.

In filtration membranes herein described, nanoparticles formed by a linear or dendritic polymers, are attached to the the fluorine or carbonyl oxygen atoms. In other embodiments, when the polymeric components comprise oxygen groups (e.g. ethers, carbonyls, and sulfonyls), dendritic components comprising hydroxyl or carboxylic acid groups can attach to the polymeric component through formation of hydrogen bonds.

In particular, in embodiments of the filtration membrane herein described, the nanoparticles of the matrix are embedded in the polymer aggregate of the polymer matrix to present reactive sites in the membrane.

The term "present" as used herein with reference to a compound or functional group indicates attachment performed to maintain the chemical reactivity of the compound or functional group as attached. Accordingly, a functional group presented on a surface, is able to perform under the appropriate conditions the one or more chemical reactions that chemically characterize the functional group.

The term "reactive site" as used herein refers to a chemical functional group capable of attracting, rejecting, and/or binding to a chemical of interest. In particular, reactive sites herein described are able to attract, reject or bind selectively a chemical to be filtered. Exemplary functional groups suitable as reactive sites include, but are not limited to, amines, quaternary ammonium groups, amides, hydroxyl groups, ethers, carboxylates, esters, sulfonates, sulfiniates, sulfonate esters, sulfinate esters, sulfonamides, sulfonamides, phosphates, carbamates, ureas, imidines, guanidines, oximes, imidazoles, pyridines, thiols, thioethers, thiocarboxylates, and phosphines.

In particular, in some embodiments, the reactive sites can be located on the functional groups of the linear polymer forming the polymeric nanoparticles. By way of example, the reactive sites can comprise carboxylic acid groups in polymeric nanoparticles formed with a linear polymer such as poly(methacrylic acid).

In particular, in some embodiments, the reactive site can be located on a dendrimer forming the dendrimer polymeric nanoparticles (for example, amino groups on PAMAM or carboxylic acid groups on MPA) without any chemical transformation being necessary. In other embodiments, one or more reactive sites can be introduced into the dendritic component after a chemical transformation. Exemplary chemical transformations suitable for the introduction of a reactive site comprise reductive amination of amine groups to form alkylated amino groups, alkylation of amines to form quaternary ammonium groups, alkylation of hydroxyl groups to form ethers, reaction of amines or hydroxyls with haloalkyl carboxylic acids and/or derivatives (such as, for example, 2-chloroacetic acid or methyl 2-chloroacetate) to form carboxylic acids and/or derivatives, reaction of amines or hydroxyls with haloalkyl sulfonic acids and/or derivatives (such as, for example, 2-(chloromethyl)sulfonic acid or methyl 2-(chloromethyl)sulfonate to form sulfonic acids and/or derivatives, and reaction of amines with epoxides to form alcohols. Other transformations are identifiable to a skilled person upon a reading of the present disclosure (see, for example, US 2010/0181257 and US 2011/0315636 each incorporated by reference in its entirety). In some embodiments, the chemical transformation of the reactive site on the dendritic component can be performed before the dendritic component is associated with the polymeric component as herein described. In other embodiments, the chemical transformation of the reactive site on the dendritic component can be performed after the dendritic component is associated with the polymeric component as herein described.

In particular, in some embodiments where dendrimer particles are formed in situ, the dendrimer particles can be functionalized when the particles are formed in the polymer blend and before casting of the membrane. In other embodiments where dendritic nanoparticles are formed in situ, the dendritic nanoparticles can be functionalized after the casting of the membranes, for example by contacting the membrane with the functionalization reagents to functionalize the nanoparticles and then rinsing the membrane. For example, if a cation-rejecting membrane with a cation-rejecting nanoparticle concentration of greater than about 20 wt % is desired, polymeric nanoparticles with amine groups can be formed in situ in the dope and the particles quaternized using an alkyl iodide or bromide (see, e.g. FIG. 49 and Example 15 of related application U.S. Ser. No. 13/754,883 published as US20130213881) by treating the dope with the alkyl iodide or bromide, casting the membrane and rinsing the membrane to produce a cation-rejecting membrane with a nanoparticle concentration of greater than about 20 wt %. If a cation-rejecting membrane with a cation-rejecting nanoparticle concentration of between about 1 and about 10 wt % is desired, PAMAM nanoparticles or other polymeric nanoparticles with amine groups can be formed ex situ (see, e.g., Example 14 of related application U.S. Ser. No. 13/754,883 published as US20130213881) and quaternized using an alkyl iodide or bromide (see, e.g. FIG. 49 and Example 15 of related application U.S. Ser. No. 13/754,883 published as US20130213881) and then mixed with the polymer to form the polymer matrix to form a dope for casting a membrane with a cation-rejecting nanoparticle concentration of between about 1 and about 10 wt % (see, e.g. Examples 3 and 19). As another example, if a cation-selective membrane with a cation-selective nanoparticle concentration of greater than about 20 wt % is desired, PAMAM nanoparticles or other polymeric nanoparticles with amine groups can be formed in situ in the dope and the particles functionalized with N, O, and S donors (see, e.g., Example 17 and FIG. 51 of related application U.S. Ser. No. 13/754,883 published as US20130213881).

In particular, in some embodiments, the cross-linking of polymers in the polymer blend herein described to form polymeric nanoparticles as described herein can result in the formation of additional reactive sites in addition to those already present on the polymer forming the polymeric nanoparticle. For example, if the polymer comprises carboxylic acids groups (e.g., as in poly(methacrylic acid) or MPA) and the cross-linker used is a diamine, the cross-linking can give rise to amide reactive sites in addition to the carboxylic acid reactive sites.

In some embodiments reactive sites can be introduced in the polymeric particles post membrane formation e.g., as described in related application U.S. Ser. No. 13/754,883 published as US20130213881

In embodiments herein described of filtration membrane herein described the reactive site can be selected and configured on the polymer forming the polymeric nanoparticles of the matrix to provide selective filtration of one or more chemicals of interest. In particular, in some embodiments, the reactive site can be selected to separate the one or more chemicals of interest in the rejection stream, permeate stream and/or retentate of the membrane. In particular, the dimension, chemical nature, and electrical charge of the reactive site as well as the location on the dendrimer component can be selected based on the dimensions, chemical nature and electrical charge of the chemical to be selectively filtered.

For example, in embodiments wherein selective filtration is desired to include anions in rejection stream and 2s metal ions cations such as $Ca^{2+}$ and $Mg^{2+}$ in the retentate of the membrane, reactive sites having negatively charged O donors [3] can be presented on the dendrimer component of the membrane. As another example, polymeric nanoparticles having neutral oxygen donors can be used to coordinate selective retention of 1s metal ions such as $Na^+$ [3]. As another example, polymeric nanoparticles, and in particular dendritic nanoparticles having positively charged nitrogen atoms (e.g. quaternary ammonium groups) can be used to selectively reject cations. As another example, polymeric nanoparticles, and in particular dendritic nanoparticles, comprising vicinal diol groups can be used to coordinate selective retention of boron.

In some embodiments, reactive sites retaining one or more chemical of interest can then be subjected to further reactions to selectively release some or all of the chemicals forming the retentate in a permeate stream, and/or to further modify the retentate as will be understood by a skilled person upon reading of the present disclosure.

In particular, membranes herein described including a suitable retentate can be treated to convert the retentate into a catalyst thus forming a catalytic membrane. For example, in some embodiments, a retentate form by metals can be treated with suitable active agents to change the oxidation state and/or ligation state to convert the metal to a catalytically active form. For example, in an embodiment dendritic components having groups capable of retention of palladium (e.g. amines and phosphines) can be subjected to reduction (e.g. $H_2$ or other reducing agents) to reduce the Pd atoms to produce catalytically active Pd(0) sites. Additional suitable metals or other materials suitable for preparation of catalytic membrane and related activating agents and/or suitable treatments will be identifiable by a skilled person.

In some embodiments, the retentate can be subjected to a selective release before or after an additional treatment. For example dendritic components having negatively charged O donors and tertiary amine groups can be used to selectively bind $Ca^{2+}$ and $Mg^{2+}$ ions at pH ~7.0, and the ions can later be released from the dendritic component by washing the dendritic component with an acidic solution containing a small ligand such as citric acid.

In some embodiments, the polymeric nanoparticles of the membranes herein described in any configuration, can be formed by polymeric nanomaterials according to the present disclosure that can range from approximately 1-3000 nm in size and can in some embodiments can selectively encapsulate and release a broad range of solutes in water including but not limited to cations (e.g., copper, silver, gold and uranium), anions (e.g., chloride, perchlorate and nitrate) and organic compounds (e.g., pharmaceuticals) [16, 17].

In particular in some embodiments, the branched dendritic molecule forming the dendrimer particles can comprise branched macromolecules, water-soluble branched molecules with functional N groups including for example, Gx-NH$_2$ PPI dendrimers and Gx-NH$_2$ PAMAM dendrimers, where x is less than 2. Similarly, polymers such as polysulfone (PS), polyethersulfone (PES), and/or poly(vinyl) alcohol can be used in making polymer matrix of the filtration membranes described herein.

In some embodiments, the dendrimer particles can be selected to retain chemicals and to be used as nanoscale reactors and catalysts [16, 17]. In some embodiments, dendritic nanomaterial can be selected to be selective for cells, or other biological material (e.g. to reject or retain such material). For example, in some embodiments, filtration membranes herein described can be configured to bind bacteria and viruses possibly followed by a deactivation of the same [17]. In other embodiments, the dendritic nanomaterials can be used as scaffolds and templates for the preparation of metal-bearing nanoparticles with controllable electronic, optical and catalytic properties [16, 17]. Dendritic nanomaterials can also be used as delivery vehicles or scaffolds, for example for bioactive compounds [18].

According to embodiments herein described, the dendrimer particles can be functionalized with surface groups can make the polymeric nanomaterial soluble in selected media or bind to surfaces. According to some embodiments, a first dendritic nanomaterial can be covalently linked to one or more further dendritic nanomaterials or associated with one or more macromolecules to form supramolecular assemblies.

According to some embodiments, a polymeric nanomaterial can be used as functional materials, for example, for water treatment [19-24]. According to some embodiments, the dendritic component comprises a carbon based structure functionalized with N or O. In particular, in some embodiments, the dendritic molecule comprise amines, carbonyls, and/or amides. In these embodiments, the N and O groups can sorb anions and/or cations. Exemplary dendritic components with N and O groups which can function as anion and cation sorbents include but is not limited to poly (amidoamine) [PAMAM], poly(propyleneimine) and bis (methylol) propionic acid (MPA) dendrimers (see, e.g. FIG. 25 of related application U.S. Ser. No. 13/754,883 published as US20130213881). Syntheses of dendritic nanomaterials according to the present disclosure can be carried out, for example, by cross linking of branched dendritic molecules to form dendrimer-like nano- and/or microparticles. Further syntheses of dendritic nanomaterials will be apparent to a skilled person upon reading of the present disclosure (see, for example, [19-28]).

According to some embodiments, the dendrimer particles can bind and release cations such as $Cu^{2+}$, $Co^{2+}$, $Fe^{3+}$, $Ni^{2+}$ and $U^{6+}$] and anions such as $Cl^-$. $ClO_4^-$ and $SO_4^{2-}$, for example, through a change of solution pH [19-24]. In particular PAMAM, PPI, and MPA particles can in some embodiments bind and release cations such as $Cu^{2+}$, $Co^{2+}$, $Fe^{3+}$, $Ni^{2+}$ and $U^{6+}$, and anions such as Cl $ClO_4^-$ and $SO_4^{2-}$. In some embodiments, low generation PAMAM dendrimers are used and the dendrimer can present for example, an amide, a primary amine, a secondary amine, and/or a tertiary amine group. In some embodiments PPI dendrimers are used. In embodiments where low generation PPI dendrimers are used, the PPI dendrimers have only primary and tertiary amine groups. In some embodiments, low generation MPA dendrimers are used. MPA dendrimers can have carbonyl and/or carboxyl groups which can allow for membranes to have a high capacity, selective, and/or recyclable ligands for $Ca^{2+}$, $Mg^{2+}$ and $Na^+$ [3].

According to further embodiments, the dendrimer particles according to the present disclosure can be functionalized with terminal groups which can allow them to be soluble in a particular solvent to type of solvent, bind onto one or more targeted surfaces, or cross-link with other dendrimers to form multifunctional supramolecular assemblies [16, 17] (See e.g. FIG. 24 of related application U.S. Ser. No. 13/754,883 published as US20130213881).

In some embodiments, the dendrimer-like polymeric nanomaterials can provide selective and recyclable high capacity macroligands for anions (for example $Cl^-$, $Br^-$; $SO_4^{2-}$; $NO_3^-$; and $ClO_4^-$) and cations (for example, $Na^+$, $Ca^{2+}$, and $Mg^{2+}$) in aqueous solutions [21-24]. Such dendritic macromolecules can be suitable, for example, in making filtration membranes for water purification as $Na^+$, $Ca^{2+}$, and $Mg^{2+}$ cations and anions $Cl^-$ and $SO_4^{2-}$ anions make-up more than 98% of the total dissolved solids (TDS) in brackish water and seawater [29].

In some embodiments, the dendrimer-like polymeric nanomaterial are capable of rejecting cations and anions. For example, dendritic components having negatively charged O donors can be used to coordinate 2s metal ions such as $Ca^{2+}$ and $Mg^{2+}$ [3]. As another example, dendritic components having neutral oxygen donors can be used to coordinate with is metal ions such as $Na^+$ [3].

In some embodiments, dendrimer-like polymeric nanomaterials containing negatively charged O donors and tertiary amine groups can be used to selectively bind $Ca^{2+}$ and $Mg^{2+}$ ions at pH ~7.0. The $Ca^{2+}$ and $Mg^{2+}$ ions can then be released from the dendritic component by washing the dendritic component with an acidic solution containing a small ligand such as citric acid. As another example, dendritic nanomaterials containing neutral O donors and tertiary amine groups can selectively bind $Na^+$ ions at pH ~7.0. The $Na^+$ ions can then be released from the dendritic nanomaterial by washing the dendritic component with an acidic solution containing a small complexing ligand such as citric acid. These examples are based on established trends in coordination chemistry [3] and accordingly other methods of making and using dendritic components based on such trends as will be understood by a skilled person, can be implemented without departing from the scope of the present disclosure.

In some embodiments, the dendritic nanomaterial can be made by cross-linking branched low-generation dendritic molecules by using a cross linking agent. For example, a dendritic nanomaterial comprising amine groups can be combined with a cross linking agent which is capable of cross linking proximate amine groups (amine-amine cross linking agents). The amine-amine cross linking agents can be bifunctional (e.g. two sites which can form covalent bonds with amines) or multifunctional (e.g. three or more sites which can form covalent bonds with amines). The cross linking agents can include but are not limited to primary bifunctionalized alkanes having the general formula (XXV) or (XXVI) below:

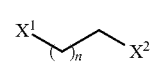

(XXV)

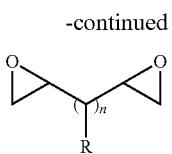

(XXVI)

wherein $X^1$ and $X^2$, by way of example, can be independently selected from (COCl, COBr, COI, Cl, Br, I, $OSO_3CH_3$, $OSO_3C_7H_7$, n can range from 1-15, and wherein R can be H, alkyl, or epoxy substituted alkyl. Crosslinking agents can also include imidoesters (e.g. dimethyl adipimidate 2HCl (DMA), dimethyl pimelimidate 2HCl (DMP), dimethyl suberimidate 2HCl (DMS), dimethyl 3,3'-dithio-bispropionimidate 2HCl (DTBP)), N-hydroxy succinimide (NHS)-esters (e.g. disuccinimidyl suberate (DSS), bis(sulfo-succinimidyl) suberate (BS3), disuccinimidyl glutarate (DSG)), and 1,5-difluoro-2,4-dinitrobenzene (DFDNB). Exemplary amine cross linking agents comprise in particular, trimesoyl chloride (TMC), 1,3-dibromopropane (DBP), and epichlorohydrin (EPC) to form dendritic nanoparticles.

In some embodiments, membranes can be fabricated by casting a mixture of the polymer component, the dendritic component, one or more solvents, and a cross-linking agent onto porous polymeric MF membrane supports [30].

Targeted atomistic molecular dynamics (MD) simulations of anion and/or cation binding to a dendritic component (e.g. PAMAM, PPI, and MPA) can be carried out using a Dreiding III force field (FIG. 26 of related application U.S. Ser. No. 13/754,883 published as US20130213881) [13] to develop and validate a computer-aided molecular design framework that can be used to guide the synthesis of high capacity and recycle low-cost ion-selective dendritic polymers.

In some embodiments, the membranes with embedded nanoparticles as described herein can comprise a polymeric matrix with dendrimer particles made from cross-linked linear polymers. In some embodiments, the membranes with embedded nanoparticles as described herein can comprise a polymeric matrix made from poly(vinylidene) fluoride (PVDF) with polymeric nanoparticles made from cross-linked linear polymers (e.g. polyamine). In some embodiments, the membranes with embedded nanoparticles as described herein can comprise a polymeric matrix made from poly(vinylidene) fluoride (PVDF) with polymeric nanoparticles made from cross-linked low generation dendrimers such as Poly(amidoamine) (PAMAM) dendrimers, poly(propyleneimine) [PPI] dendrimers, 2,2-bis(methylol) propionic acid (bis-MPA) dendrimers, 2 cyclotriphosphazene-phenoxymethyl(methylhydrazono) (PMMH) dendrimers and other low-generation dendrimers of various core chemistry and terminal groups.

In some embodiments, the mixed matrix membrane with embedded dendrimer particles and related compositions and methods described herein can be used to provide a fast and scalable route for the preparation of high capacity membrane absorbers for the selective extraction and recovery metals from aqueous solutions. In particular, these mixed matrix membranes can be used as membrane absorbers or sorbents for the selective recovery of dissolved metals such as Cu(II) or Pt(II) or metal particles (Cu(0) or Pt(0) from industrial liquid waste stream using low-pressure membrane filtration.

The term "membrane absorbers" used herein refer to a type of membranes capable of functionalizing as a sorbent to selectively absorb substances, materials or chemical compounds due to their high affinity of doing so. In particular, the membrane absorbers described herein have strong binding affinity for target substances and/or chemical compounds but allow others to pass through the membrane absorbers.

One of the challenges in metal recovery from industrial wastewater is to design and synthesize high capacity, recyclable and robust chelating ligands with tunable metal ion selectivity that can be efficiently processed into low-energy separation materials and systems (e.g. ultrafiltration membrane absorbers and modules).

For example, in aqueous solutions and industrial wastewater, dissolved Cu is predominantly found as cationic species.[14,24] Chelating agents are the most effective ligands for recovering cationic species from aqueous solutions. Metal ion complexation is an acid-base reaction that depends on several parameters including (i) ion size and acidity, (ii) ligand basicity and molecular architecture and (iii) solution physical-chemical conditions.[24]

Membrane absorbers made from high generation dendrimers (e.g. G4-G5 $NH_2$ PAMAM) have shown to possess high capacity, selective and recyclable macroligands for metal recovery from aqueous solutions using dendrimer enhanced filtration (DEF) process and dendronized PAMAM hollow fiber membranes (reference 26). However, these membrane absorbers are expensive to produce due to the large number of synthetic and purification steps required preparing such macromolecules.

In some embodiments, the membrane absorbers described herein comprising the embedded dendrimer particles formed from low generation dendrimers (e.g. G0-G3 PAMAM dendrimers) herein described possess high metal ion chelating capability and behave similarly as membrane absorbers formed from high generation dendrimers (e.g. G4-6 PAMAM). In particular, the membrane absorbers synthesized from G0-G3 dendrimers exhibit the container properties of G4-G6 dendrimers for containing metal ions.

In some embodiments, the membrane absorbers described herein can serve as supramolecular contains, also referred to as "supercontainers" for containing cations, anions, organic solutes, bioactive molecules and catalytic and redox active metallic/bimetallic nanoparticles and cluster.

The membrane absorbers can be utilized as templates for preparation of dendrimer-encapsulated nanoparticles (DENs) with tunable electronic, optical and catalytic properties. The membrane absorbers described herein with in-situ synthesized dendrimer particles can also serve as multifunctional membranes for a variety of SusChEM related applications including (i) water treatment, (ii) metal extraction and recovery, (iii) biochemical separations and purifications and (ii) catalysis and reaction engineering.

In some embodiments, the method of using the membrane absorbers as a supercontainer comprises preparing a mixed matrix membrane with embedded dendrimer particles, providing a sample solution to be filtrated, such as a sample solution containing metal ions; pumping the solution through the mixed matrix membrane to yield a permeated sample, and collecting the permeated sample. The pumping and collecting steps can be repeated until a desired filtered sample is obtained. The sample solution herein used refers to a solution to be filtered. Such solution can be industrial waste water or aqueous solution or any solution containing chemical compounds that aim to be removed from the solution (see Example 4.). In some embodiments, the membrane absorbers are mixed matrix membrane comprising a polymeric matrix made with poly(vinylidene) fluoride (PVDF) embedded with in situ synthesized dendrimer particles formed by G0 or G1 or G2 PAMAM dendrimers.

In some exemplary embodiments (see Examples 7-8), the membrane absorbers comprising embedded dendrimer particles formed by G1 PAMAM dendrimers (MDP-G1 membrane absorbers) are capable of binding copper at an amount greater than that of the membrane absorbers made from G0 PAMAM dendrimers (MDP-G0 membrane absorbers).

In some of these embodiments, the MDP-G0 membrane absorbers are capable of binding copper with a mean percentage of bound copper of about 25% or less with an averaged binding capacity of about 46-52 mg of Cu (II) per mL of dry membrane. The MDP-G1 membrane absorbers are capable of binding copper with a mean percentage of bound copper of larger than 50%, more particularly, larger than 70%, more particularly, larger than 80%, with an averaged binding capacity of about 51-57 mg of Cu(II) per mL of dry membrane, depending on the pH value of the aqueous solution (see Example 7 and Table 12).

The MDP-G0 membrane absorbers of some embodiments herein described can bind an amount of Cu(II) (for example, 19-21 $g/m^2$ of dry membrane) higher than those of a cross-linked PVA membrane with embedded PEI networks [31] (~11 $g/m^2$ of dry membrane) and HPAMAM surface-grafted PET membrane (1.42 $g/m^2$ of dry membrane) [32](see Examples 5-8). In some of these embodiments, the MDP-G0 membrane absorber has a high water flux (~427±13 LMH at 2 bar and pH 7) with a neutral surface layer and a matrix with a sponge-like microstructure characteristic of UF membranes with strong mechanical integrity (see Examples 7-8).

The membrane absorbers herein described can bind transition metals such as Cu(II), Cu(0) and Pt(0) through several mechanism including (i) coordination with their N and O donors and (ii) non-specific binding to water molecules and/or couterions trapped inside the dendrimer particles. In particular, Cu(II) can form complexes via different copper coordination sites within the embedded dendrimer-like particles through nitrogen donors, oxygen donors and water molecules (see Example 8 and FIG. 38).

Further investigation can be conducted to optimize the performance, such as sorption capacity and regeneration efficiency, of the membrane absorbers with in situ synthesized dendrimer particles made from low-generation dendrimers for the metal recovery from relevant industrial liquid waste streams.

According to a further embodiment of the disclosure, a method of making a polymeric membrane with embedded dendrimer particles is described. The method comprises contacting a polymeric component, a dendritic component, and a solvent to provide a blend, contacting the blend with a cross-linking component, for a time and under a condition to permit the in situ formation of dendrimer particles to provide a dope solution; and casting the dope solution to provide a filtration membrane with embedded dendritic nanoparticles (see for example, FIG. 18-19).

In particular, in some embodiments, contacting a polymeric component, a dendritic component, and a solvent to provide a blend is performed by mixing a solution of the base polymer of the polymeric component in a suitable solvent—the suitable solvent chosen based on parameters such as solubility parameters (see e.g. [7, 14]), compatibility of the dendritic component with the polymer component (e.g. hydrogen bonding between amine groups and fluoride groups or interaction of hydroxyl/carboxylic acid groups with oxygen atoms), or other chemical and thermodynamic parameters identifiable to a skilled person—for approximately 1-24 hours at 25-85° C.—or other times and temperatures capable of producing a homogeneous solution without decomposing the polymeric component as would be identifiable to a skilled person—and then adding a solution of the dendritic component and mixing to form a homogeneous blend (see, e.g., Examples 1 and 2 of related application U.S. Ser. No. 14/447,574). A functionalizing polymer presenting a functional group capable to react with a corresponding group in the dendrimer component can be added into the blend and is allowed to react for a time depending on the reactivity of the functional polymer end group (e.g. 1-10 hrs) and preferably between 1 hr or 2 hrs. In particular, in some embodiments, that the concentration of the dendritic component is between about 3.5 wt % and 7.5 wt % of the blend. In particular, in some embodiments, the contacting of the blend with a cross linking component can be performed by mixing a crosslinking catalyst and cross-linking component—the cross-linking catalyst and cross linking component chosen based on the functional groups on the dendritic component as would be identifiable to a skilled person (e.g., if the dendritic component has amine groups, the cross linking component can be an epoxide such as epichlorohydrin or dihaloalkane such as 1,3-dibromopropane and the catalysts can be HCl; if the dendritic component has carboxylic acid groups, the cross-linking component can be a diamine such as 1,3-diamino propane and the cross-linking catalyst can be 1-ethyl-3-(3-dimethylaminopropyl)carbodiimide) (EDC))—for 1-24 hours at approximately 25-85° C.—or other times and temperatures capable of producing a homogeneous dope without decomposing either the polymeric or dendritic components as would be identifiable to a skilled person—to provide a dope solution with dendrimer particles formed in situ (see, e.g., Examples 1 and 2 of related application U.S. Ser. No. 14/447,574).

In particular, in membranes cast with in situ generated nanoparticles, aggregates and clusters of nanoparticles that form for example through fractal growth are not detectable contrary to membranes cast with nanoparticles that are preformed (compare, e.g., FIG. 6 of the related application U.S. Ser. No. 14/447,574 and FIG. 6 of related application U.S. Ser. No. 13/754,883 published as US20130213881 with FIG. 53 and FIG. 58B of related application U.S. Ser. No. 13/754,883 published as US20130213881) resulting in discrete nanoparticles being distributed in membranes with nanoparticles formed in situ. In particular, in some embodiments, the nanoparticles can be present in the membrane at a concentration of greater than about 20 wt %, and more particularly at a concentration of greater than about 35% and from 50% to 60%.

In particular, in some embodiments, the dope solution with in situ formed dendrimer particles can be cast to provide a polymeric membrane with embedded with dendrimer particles. In particular, in some embodiments, the membrane can be cast by phase inversion casting (see, e.g. [12]). In particular, in some embodiments, the casting can be performed by pouring the hot dope solution onto a glass surface and allowing it to air dry at room temperature and then immersing it into water for a time to form a nascent membrane as would be identifiable to a skilled person. The nascent membrane can then be immersed in fresh water and then immersed in ethanol to remove impurities as would be identifiable to a skilled person. The membranes can then be removed from the glass and dried to provide a polymeric membrane with pores, the pores embedded with dendritic nanoparticles. In other embodiments, the dope solution with in situ formed dendrimer particles can be cast onto a polymer support (e.g. a poly(ethylene terephthalate) nonwoven fabric) in place of glass to provide a polymeric membrane with pores, the pores embedded with dendritic nanoparticles wherein the polymeric membrane is layered on top of the polymer support.

Figure 19:
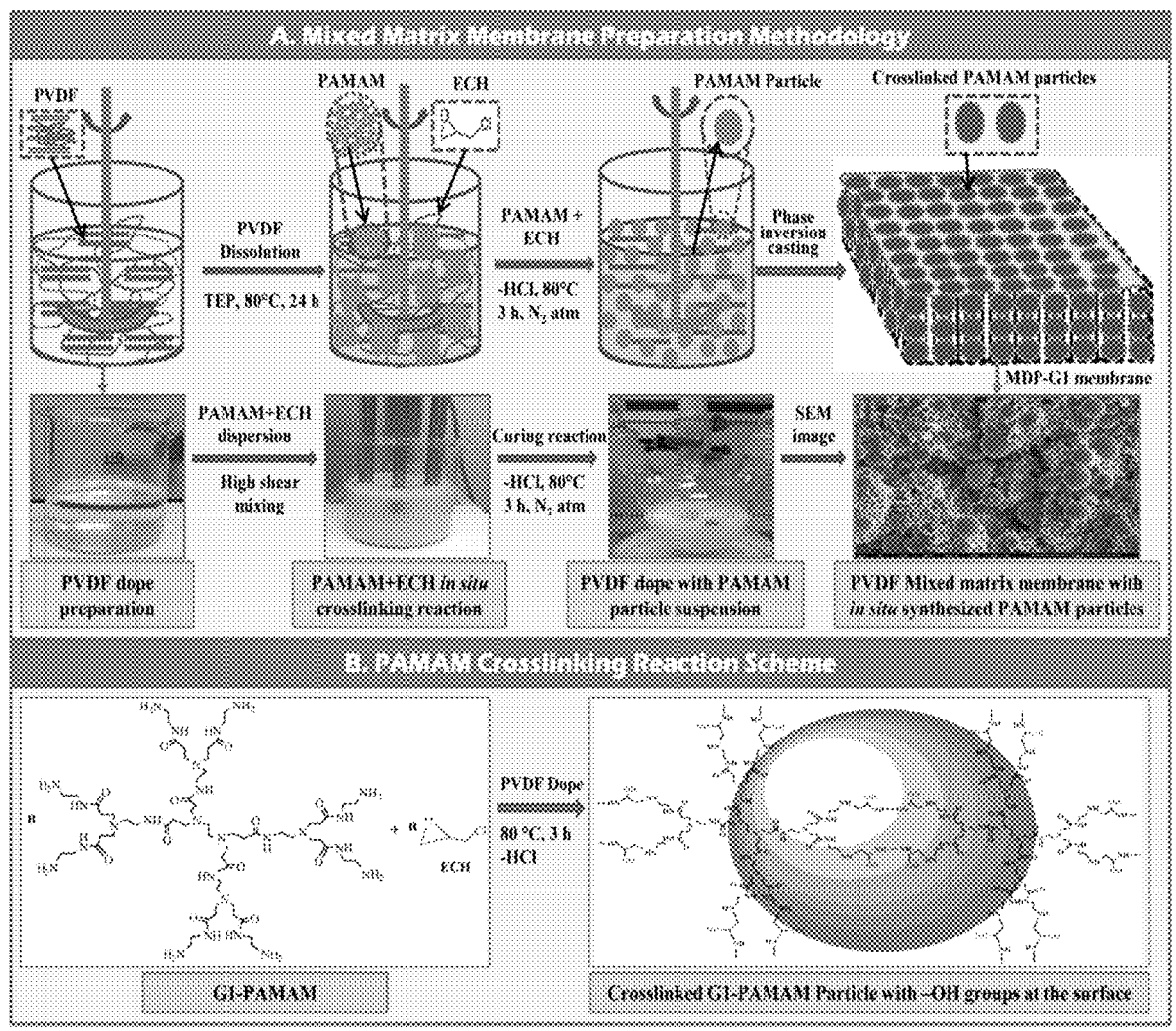
FIG. 19 shows an exemplary embodiment of procedures and reaction schemes used to prepare mixed matrix PVDF membranes with in situ synthesized PAMAM particles. Panel A (FIG. 19A) highlights and visualize the preparation procedures: (i) preparation of membrane casting solution by dissolution of PVDF in TEP, (ii) addition of PAMAM and ECH to the membrane casting solution to initiate the in situ crosslinking reactions between PAMAM and ECH, (iii) membrane preparation by phase inversion casting (FIG. 19A). Panel B (FIG. 19B) illustrates the reaction schemes: (i) reaction of ECH epoxy groups with the primary amino groups of the segregated PAMAM macromolecules in the dope solution (FIG. 19B) via ring opening nucleophilic substitution followed by the nucleophilic displacement of the ECH chloro groups via reaction with the remaining primary/secondary amino groups of the PAMAM macromolecules.

FIG. 19 shows an exemplary embodiment of procedures and reaction schemes used to prepare mixed matrix PVDF membranes with in situ synthesized PAMAM particles. The preparation procedures illustrated in FIG. 19A includes (i) preparation of membrane casting solution by dissolution of PVDF in TEP, (ii) addition of PAMAM and ECH to the membrane casting solution to initiate the in situ crosslinking reactions between PAMAM and ECH, (iii) membrane preparation by phase inversion casting. FIG. 19B illustrates the reaction schemes: (i) reaction of ECH epoxy groups with the primary amino groups of the segregated PAMAM macromolecules in the dope solution via ring opening nucleophilic substitution followed by the nucleophilic displacement of the ECH chloro groups via reaction with the remaining primary/secondary amino groups of the PAMAM macromolecules.

According to further embodiments, a method of making a polymeric membrane with embedded preformed dendrimer particles is described. The method comprises contacting a polymeric component, preformed dendrimer particles, and a solvent for a time and under a condition to provide a dope solution; and casting the dope solution to provide a polymeric membrane with pores, the pores embedded with the preformed polymeric nanoparticles.

In particular, in some embodiments, the preformed dendrimer particles can be performed by cross-linking a polymer (e.g. G0 or G1 PAMAM with terminal primary amine (—NH_2) groups) using a crosslinker such as ECH by adapting the inverse suspension process that Diallo and co-workers used to prepare PEI beads. [33] The methods described in this paper are incorporated by reference in its entirety.

In some embodiments, G0 to G3 low generation dendrimers are in contact with a crosslinker in a two phase suspension to form preformed dendrimer particles. In some embodiments, the preformed dendrimer particle can be subsequently reacted with a functionalizing agent such as an alkylating reagent to provide functionalized dendrimer particle. In some embodiments, the functionalized dendrimer particle contains a quaternary ammonium group.

In some embodiments, the alkylating reagent can be selected from a group consisting of bromoethane, iodomethane, 1-bromopropane, 1-bromo-2-methylpropane, 1-bromobutane or a combination thereof.

In particular, G0 to G3 low generation dendrimers are dissolved in water. The aqueous solution containing G0 to G3 low generation dendrimers is in contact with an organic solvent under a condition to form an inverse suspension having aqueous solution particle of dendrimer suspended in the organic solvent. A crosslinker is provided and in contact with the inverse suspension for a sufficient interval of time under a condition suitable for the reaction of the crosslinker and the dendrimer in the aqueous solution particle to occur, thus forming preformed dendrimer particles. In particular, in some embodiments, contacting a polymeric component, preformed polymeric nanoparticles, and a solvent for a time and under a condition to provide a dope solution is performed by mixing a solution of the polymeric component in the solvent for 1-24 hours at approximately 25-85° C.—or other times and temperatures capable of producing a homogeneous solution without decomposing the polymeric component as would be identifiable to a skilled person—and then adding a solution of the preformed dendrimer particles and mixing the solution for 1-24 hours at approximately 25-85° C.—or other times and temperatures capable of producing a homogeneous blend without decomposing either the polymeric or dendritic components as would be identifiable to a skilled person to provide a dope solution with preformed dendrimer particles.

In particular, in some embodiments, the dope solution with preformed dendrimer particles can be cast to provide a polymeric membrane with embedded with dendritic nanoparticles. In particular, in some embodiments, the membrane can be cast by phase inversion casting (see, e.g. [12]). In particular, in some embodiments, the casting can be performed by pouring the hot dope solution onto a glass surface and allowing it to air dry at room and then immersing it into water for a time to form a nascent membrane as would be identifiable to a skilled person. The nascent membrane is then immersed in fresh water and then immersed in ethanol to remove impurities as would be identifiable to a skilled person. The membranes can then be removed from the glass and dried to provide a polymeric membrane with pores, the pores embedded with dendritic nanoparticles. In other embodiments, the dope solution with preformed dendritic nanoparticles can be cast onto a polymer support (e.g. a poly(ethylene terephthalate) non-woven fabric) in place of glass to provide a polymeric membrane with pores, the pores embedded with dendritic nanoparticles wherein the polymeric membrane is layered on top of the polymer support.

Figure 53:
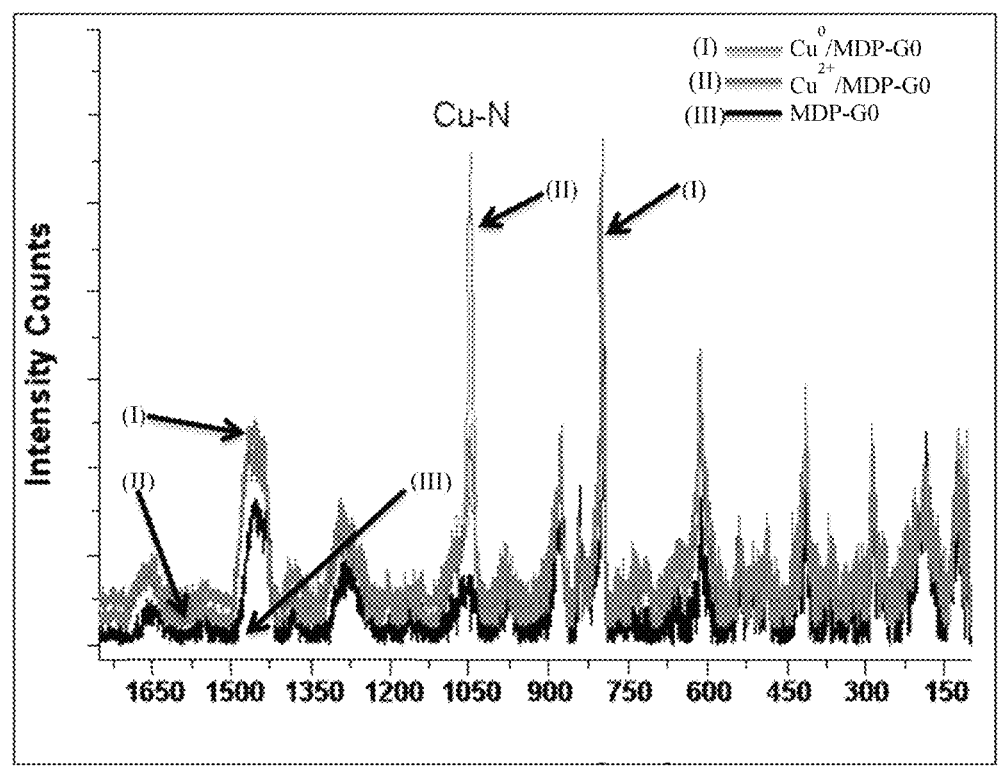
FIG. 53 shows Raman spectra of a MDP-G0 membrane loaded with $Cu^{2+}$ ions and Cu(0) nanoparticles in one embodiment.

In particular, membranes cast with preformed nanoparticles can possess aggregates and clusters of nanoparticles that form through fractal growth unlike the discrete particles embedded in membranes when the particles are formed in situ (compare, e.g., FIG. 53 and FIG. 58B of related application U.S. Ser. No. 13/754,883 published as US20130213881 with FIG. 6 of the related application U.S. Ser. No. 14/447,574 and FIG. 6 of related application U.S. Ser. No. 13/754,883 published as US20130213881).

In some embodiments, the membranes with embedded nanoparticles as described herein can comprise a polymeric matrix made from poly(vinylidene) fluoride (PVDF) as a base polymer, and epoxy polyethylene glycol as a functionalizing polymer with polymeric nanoparticles made from cross-linked poly(methacrylic acid) (PMAA). In particular, when the particles are premade, the PMMA can be cross-linked with either EGDMA or PEGDMA with an AIBN initiator (see, e.g., Example 14 related application U.S. Ser. No. 13/754,883 published as US20130213881).

In some embodiments, the membranes with embedded dendrimer particles as described herein can comprise a polymeric matrix made from poly(vinylidene) fluoride (PVDF) as a base polymer with dendrimer particles made from cross-linked PAMAM. In particular, when the particles are premade, the PAMAM can be cross-linked with ECH (see, e.g., Examples 2 and 5).

In some embodiments, a dope comprising a polymer forming the polymer matrix herein described in which dendrimer particles is embedded can be used to provide nanofibers and/or microfibers.

The term "fiber" as used herein indicates a material that is a continuous filament or is in a discrete elongated piece, similar to a length of thread. In particular, "nanofiber" as used herein refer to fibers with a diameter less than approximately 1000 nm and the term "microfiber" as used herein refer to fibers with a diameter between approximately 1 μm to approximately 10 μm in size.

In particular, in some embodiments the dope solution comprising a polymer embedding dendrimer particles dendrimer particles and/or nanoparticles herein described can be used in a method of making a nano and/or micro fibers with embedded dendrimer-like polymer nanoparticles herein described.

In some embodiments, the method comprises contacting a polymeric component, a dendritic component, a cross-linking component, and a solvent for a time and under a condition to permit the in situ formation of dendritic nanoparticles to provide a dope solution; and spinning the dope solution to provide a nanofiber or microfiber herein described. In particular, in some embodiments, the polymeric component and dendritic component are contacted to form a blend and the cross-linking agent is added to the blend to allow in situ formation of dendritic nanoparticles and obtain the dope before the spinning. In some embodiments, the nanoparticle are preformed and then added to the polymer for an ex situ formation according to methods and systems herein described to provide a dope solution that is then spun to provide a nano-fiber and/or microfiber herein described.

In some embodiments, the nanofibers with embedded polymeric nanoparticles can be electrospun onto a support layer (e.g. a PET non-woven fabric; see e.g. Example 2 of U.S. Ser. No. 14/447,574). Then a nanofibrous composite membrane can be fabricated as described in U.S. patent application Ser. No. 13/570,221 entitled "Filtration Membranes, and Related Nano and/or Micro fibers, Composites, Methods and Systems" filed on Aug. 8, 2012 incorporated by reference in its entirety.

A "support layer" in the sense of the present disclosure is an aggregate material comprising a polymer component configured to strengthen the membrane structure. Suitable polymers to be included in support layers comprise, for example, poly(vinylidene) fluoride (PVDF), poly(tetrafluoroethylene) (PTFE), poly(acrylonitrile) (PAN), poly(methyl methacrylate) (PMMA), poly(methacrylic acid) (PMAA), poly(acrylic acid) (PAA), poly(vinyl methyl ketone), and poly(ethylene terephthalate) (PET) which can be aggregated by inverse casting the polymer or by electrospinning. In some embodiments the support layer includes pores. In some embodiments, the support layer can be functionalized with a dendrimer component. In other embodiments, after a nanofibers and/or microfibers with embedded dendritic nanoparticles are electrospun onto a support layer, a further support layer can be electrospun to provide a top support layer for providing additional strength or for creating a bipolar membrane. In some embodiments, the support layer can comprise or be formed by a polymer matrix with embedded dendrimer-like polymer nanoparticles, and in particular dendritic nanoparticles, in accordance with the present disclosure.

Accordingly, in some embodiments a filtration membrane can comprise a plurality of nano and/or micro fibers, wherein at least one of the nano and/or micro fibers comprises polymeric nanoparticles embedded in a polymeric component. The plurality of nano and/or micro fibers can be attached to a support layer and/or a polymer matrix comprising embedded polymer nanoparticles and in particular dendritic nanoparticles herein described. Additional layers such as a separation layer or a further support layer can also be comprised as will be understood by a skilled person.

In some embodiments a filtration membrane can comprise a polymer matrix comprising embedded dendrimer particles and/or nanoparticles herein described attaching a nano- and/or microfiber. Additional layers such as a separation layer or a further support layer can also be comprised as will be understood by a skilled person.

In some embodiments, the nanofiber and/or microfiber can comprise a polymeric nanoparticle embedded in a polymeric component as described herein. In some embodiments other kind of nanofibers and/or microfibers can be comprised in filtration membranes herein described in the alternative or in addition to a nano fiber and/or microfiber with embedded nanoparticles. In particular in some of those embodiments, another kind of nano-fiber and/or microfiber that can be comprised in a filtration membrane herein described can comprise a scaffold component providing a supporting framework for one or more additional components attached to the scaffold providing functionalities to the scaffold and in particular to a dendrimer component as described in U.S. patent application Ser. No. 13/570,221, published as US20130112618 incorporated by reference in its entirety. The scaffold component and the additional components define features of the nanofiber and microfiber such as a diameter (or radius), a mechanical strength, chemical stability, functionalization and chemical properties which are detectable using techniques and process identifiable by a skilled person. Additional details concerning the nano-fiber and/or microfiber comprising a scaffold component and a dendrimer component are described in U.S. patent application Ser. No. 13/570,221 published as US 21013 0112618 incorporated by reference in its entirety.

In some embodiments the dendrimer particles embedded in the polymeric component of the nanofiber or microfiber and/or presented on the scaffold component of the nano-micro-fiber can comprise reactive sites, and the reactive sites can be positively and/or negatively charged.

In some embodiments, in the filtration membrane, the plurality of nanofibers and/or microfibers can be arranged in a mesh structure forming a layer comprised in the membrane, alone or in combination with additional layers. In some embodiments, the plurality of nanofibers and/or microfibers are arranged in a substantially parallel configuration, in particular in some of these embodiments, one or more nanofibers and/or microfibers of the plurality of the nanofibers and/or microfibers are hollow.

In particular, in some embodiments microfiber and/or nanofiber herein described can be comprised as a composite material layer having a mesh structure comprised in the filtration membrane alone or in combination with one or more additional layers.

The term "composite material" as used herein refers to a heterogeneous material made from two or more different materials, the materials having different chemical and/or physical properties and remaining as separate and distinct materials within the composite material. For example, according to embodiments herein described, a composite material can comprise a polymer component and a dendritic nanoparticle which is structurally different from the polymer component and is embedded in the polymer component. The composite material according to some embodiments can comprise a semi-permeable barrier made of overlapping strands of nanofibers.

In particular, the composite material comprising a plurality of nanofibers and/or microfibers can comprise a plurality of a same type of fiber or of two or more different types of fibers. In some embodiments, fibers can be covalently crosslinked to one another. In some embodiments, nanofibers and/or microfibers comprised in the composite material can comprise hollow fibers herein described.

In embodiments herein described, wherein a membrane comprise a mesh, the features of the mesh such as dimension of the pores of the mesh structure, the strength and resistance of the mesh and chemical compatibility of the mesh can be controlled by selection of the diameter of the nanofiber or microfiber, number and configuration of the nanofiber and/or microfiber forming the mesh and the specific polymer component and dendrimer component of each fiber as will be understood by a skilled person upon reading of the present disclosure.

Also described herein is a bicomposite membrane, which comprises a plurality of nanofibers and/or microfibers herein described attached to a polymer matrix formed by a porous polymeric aggregate comprising dendrimer particles. In particular, in some embodiments, the polymeric nanoparticles are embedded in the porous polymer aggregate (e.g., by in situ particle formation as herein described).

In particular, in some embodiments, the nanofibers and/or microfibers in the bicomposite membrane can comprise dendritic nanoparticles embedded (e.g. through in situ particle formation as herein described) in a polymer matrix as described herein. In some embodiments, the nanofibers and microfibers comprising embedded nanoparticles can be hollow. In some embodiments the polymeric nanoparticles embedded in the polymeric component of the nanofiber or microfiber comprises reactive sites, and the reactive sites can be positively and/or negatively charged.

In particular, in some embodiments, the nanofibers and/or microfibers in the bicomposite membrane comprise a scaffold component providing a supporting framework for one or more additional components attached to the scaffold providing functionalities to the scaffold. The scaffold component and the additional components define features of the nanofiber and microfiber such as a diameter (or radius), a mechanical strength, chemical stability, functionalization and chemical properties which are detectable using techniques and process identifiable by a skilled person. The features of nanofibers and microfibers in the sense of the present disclosure which can also be controlled by modifying the chemical composition and structure of the fiber during manufacturing of the fiber according to techniques identifiable by a skilled person upon reading of the present disclosure. In particular, in some embodiments, the scaffold component comprises a polymeric component providing a fiber scaffold and the additional component comprises a dendritic component attached to the polymeric component to present reactive sites on the fiber scaffold (see, e.g., FIG. 63 of related application U.S. Ser. No. 13/754,883 published as US20130213881).

In some embodiments, in the bicomposite membrane, the plurality of nanofiber and/or microfiber are arranged in a mesh structure forming a layer comprised in the membrane, alone or in combination with additional layers. In some embodiments, the plurality of nanofiber and/or microfibers are arranged in a substantially parallel configuration, in particular in some of these embodiments, one or more nanofibers and/or microfibers of the plurality of the nanofibers and/or microfibers are hollow.

In particular, in some embodiments, the plurality of nanofibers and/or microfibers is directly attached to polymer matrix formed by a porous polymeric aggregate comprising polymeric nanoparticles (e.g. by forming a polymer aggregate comprising polymeric nanoparticles by in situ particle formation as herein described and electrospinning the nanofibers and/or microfibers directly only the polymer aggregate comprising polymeric nanoparticles). In other embodiments, the plurality of nanofibers and/or microfibers is attached to a support layer (e.g. a PET non-woven fabric) and the support layer is further attached to porous polymeric aggregate comprising polymeric nanoparticles (e.g. by casting a membrane comprising porous polymeric aggregate with embedded polymeric nanoparticles on a support layer and then electrospinning the nanofibers and/or microfibers onto the side of support layer opposite to the membrane comprising porous polymeric aggregate with embedded polymeric nanoparticles; see e.g. Examples 1 and 2 and for the casting procedure in in situ methods Examples 2, 20 and FIGS. 59 and 60 of related application U.S. Ser. No. 13/754,883 published as US20130213881)

In some embodiments a filtration membrane comprises a layer of the composite material according to the disclosure in combination with one or more additional layers. The additional layers can include, for example, a support layer and/or a separation layer (see e.g. Examples 22-24 and FIGS. 62 and 63 of related application U.S. Ser. No. 13/754,883 published as US20130213881). In embodiments wherein filtration membrane herein described comprise one or more composite material layers and one or more additional layers, the one or more composite material layers and the additional layers can be comprised in the filtration membrane in various configurations as will be understood by a skilled person upon reading of the present disclosure. For example in some embodiments one or more composite layers can be comprised between two functionalized or unfunctionalized supporting layers. In some embodiments, one or more composite layers can be comprised between a supporting layer and a coating layer. In some of these embodiments a functionalized supporting layer can be further attached to the coating layer. In some embodiments a coating layer can be comprised between one or more composite layers a functionalized supporting layer. Additional configurations can be identified by a skilled person. In particular, selection of a configuration of the membrane can be performed by a skilled person in view of the polymer component and dendrimer component forming the composite material and/or the support layer and/or coating layer and in view of a desired selection of one or more chemicals to be filtered. (see e.g. U.S. patent application Ser. No. 13/570,221 published as US 2013 0112318)

In some embodiments, where the filtration membrane comprises a composites material layer with one or more additional layers, the polymer component and the dendritic component of the one or more composite material layers and/or of the one or more additional layer can be either the same or different. In some of these embodiments, the polymer component can be polysulfone (PS), polyether sulfone (PES), poly(vinylidene) fluoride (PVDF), poly(tetrafluoroethylene) (PTFE), poly(acrylonitrile) (PAN), poly(methyl methacrylate) (PMMA), poly(methacrylic acid) (PMAA), poly(acrylic acid) (PAA), and/or poly(vinyl methyl ketone). In some of these embodiments the dendrimer component can be a dendritic macromolecule selected from the group consisting of generation-3 poly(amidoamine) (PAMAM)

dendrimer, generation-4 poly(amidoamine) (PAMAM) dendrimer, generation-5 poly(amidoamine) (PAMAM) dendrimer, generation-3 poly(propyleneimine) (PPI) dendrimer, generation-4 poly(propyleneimine) (PPI) dendrimer, generation-5 poly(propyleneimine) (PPI) dendrimer, generation-3 poly(bis(methylol)propionic acid) (MPA) dendrimer, generation-4 poly(bis(methylol)propionic acid) (MPA) dendrimer, generation-5 poly(bis(methylol)propionic acid) (MPA) dendrimer, generation-3 poly(ethyleneimine) dendrimer, generation-4 poly(ethyleneimine) dendrimer, generation-5 poly(ethyleneimine) dendrimer, and hyperbranched poly(ethyleneimine), or aggregate nanostructures and/or microstructure thereof.

According to a further embodiment of the disclosure, a filtration system is described. The filtration system comprises a plurality of modules, each module comprising one or more of the filtration membranes for pretreatment of water according to embodiments herein described, charged particle rejection of water, and charged particle absorption of water is described.

The term "module" as used herein refers to a compartment comprising a filtration membrane according to the disclosure, adapted to be used in connection with other modules to perform parallel and/or sequential filtrations.

In particular, in some embodiments, a module herein described can comprise one of the filtration membranes herein described through which water can pass. For example, if the membrane in a module is charged particle rejecting, it can remove charged particles from the water passing through the membrane in the module such that the charged particles are reduced and/or substantially eliminated from water exiting the membrane. As another example, if the membrane in a module is charged particle absorbing, it can absorb charged particles from the water passing through the membrane in the module such that the charged particles are reduced or eliminated from water exiting the membrane.

In some embodiments, the filtration system can be configured to have three units: a first unit comprising a module, the module comprising a nanofiltration membrane to remove, for example, particles and dissolved organic matter; a second unit comprising a series of alternating positive and negative charged particle rejecting modules, for example, to remove a majority of the charged particles; and a third unit comprising a parallel series of modules capable of absorbing charged particles of interest.

Also provided herein, a filtration method comprising, passing water to be filtered through one or more modules comprising conventional nanofiltration membranes to remove particles and dissolved organic matter, passing the water through a series of alternating positive and negative charged particle rejecting modules comprising the membranes herein described to remove a majority of the charged particles, and passing the water through a parallel series of modules capable of absorbing charged particles of interest is described.

In some embodiments, the membrane filtration system for the desalination of brackish water and seawater comprises: an ion-rejection filtration stage, wherein saline water passes through a series of alternating cation/anion selective tight UF membranes designed to reject 70-90% of dissolved ions; and an ion-absorption filtration stage, wherein the product water from the ion-rejection filtration system is split into two streams that pass through a series of ion-absorbing MF membranes designed to selectively bind target anions/cations of interest.

In some embodiments, filtration membranes can be used for microalgae filtration and recovery, and in particular, in microalgae recovery by ultrafiltration.

In some embodiments, in particular when one or more functionalizing polymer are hydrophilic membranes according to the disclosure can be fouling resistant and high flux membranes with respect to known conventional membrane. Mixed matrix membranes (MMMs) with embedded functional nanomaterials/particles can carry out multiple functions (e.g. retention, sorption, catalysis and charge transport) with improved properties and performance including higher permselectivity and flux, greater mechanical strength and lower fouling propensity in water filtration applications and in particular in application where harvesting of microalgae and possibly subsequent downstream processing into a useful product (e.g. biofuel) is desired.

Further advantages and characteristics of the present disclosure will become more apparent hereinafter from the following detailed disclosure by way or illustration only with reference to an experimental section.

EXAMPLES

The polymeric membranes with embedded polymeric micro/nanoparticles and related methods and systems herein described are further illustrated in the following examples, which are provided by way of illustration and are not intended to be limiting.

In particular, the following examples illustrate exemplary polymeric membranes with embedded dendrimer-like polymeric micro/nanoparticles and related methods and systems. A person skilled in the art will appreciate the applicability and the necessary modifications to adapt the features described in detail in the present section, to additional polymeric membranes with embedded dendrimer-like polymeric micro/nanoparticles and related methods and systems according to embodiments of the present disclosure.

Example 1: Chemicals and Materials

Polyvinylidene fluoride (PVDF) [Kynar 761] was provided by Arkema (King of Prussia, PA, USA). G0-$NH_2$ and G1-$NH_2$ PAMAM dendrimers were purchased as methanol solutions (~34 wt %) from Dendritech Inc, USA. Table 6 lists selected physical-chemical properties of the PAMAM dendrimers. Epichlorohydrin (ECH) was purchased from Sigma-Aldrich. Triethyl phosphate (TEP), ethanol and nitric acid (60 wt % $HNO_3$) were purchased from Daejung Chemicals (South Korea). Hydrochloric acid (12 M HCl) was purchased from Junsei (South Korea). Sodium hydroxide (NaOH pellets) and copper(II) nitrate trihydrate (ACS purus grade) were purchased from Sigma-Aldrich. A standard solution of copper (Cu) [10 mg/L in 5 wt % $HNO_3$] (Multi-element calibration standard-2A) was purchased from Agilent Technologies. All chemicals were used as received. All aqueous solutions were prepared using Milli-Q deionized water (DIW) with a resistivity of 18.2 MΩcm and total organic content <5 ppb.

TABLE 6

Selected physicochemical properties of the PAMAM dendrimers that were utilized as particle precursors for the mixed matrix PVDF membranes with in situ synthesized PAMAM particles. The data were taken from Dendritech.

| Dendrimer | $^a$M$_{wth}$ (Dalton) | $^b$N$_{Pamine}$ | $^c$N$_{Tamine}$ | $^d$N$_{Amide}$ | $^e$C$_{Pamine}$ (meq/g) | $^f$C$_{Tamine}$ (meq/g) | $^g$C$_{Amide}$ (meq/g) | $^h$C$_{Ligand}$ (meq/g) | $^i$D$_H$ (nm) |
|---|---|---|---|---|---|---|---|---|---|
| G0-NH$_2$ | 517 | 4 | 2 | 4 | 5.56 | 2.78 | 5.56 | 19.47 | 1.5 |
| G1-NH$_2$ | 1430 | 8 | 6 | 12 | 4.00 | 3.00 | 6.00 | 18.99 | 2.2 |

$^a$M$_{wth}$: theoretical molecular weight.
$^b$N$_{Pamine}$: number of primary groups.
$^c$N$_{Tamine}$: number of tertiary amine groups.
$^d$N$_{Amide}$: number of amide groups. Each amide group has 2 potential electron donors: 1 N donor and 1 O donor.
$^e$C$_{Pamine}$ and $^f$C$_{Tamine}$ are, respectively, the concentrations of primary and tertiary amino groups per gram of PAMAM respectively.
$^g$C$_{Amide}$ and $^h$C$_{Ligand}$ are the concentration of amide and ligand functionalities per gram of PAMAM respectively.
$^i$D$_H$: theoretical hydrodynamic diameter of dendrimer molecule.

Example 2: Membrane Preparation

The membrane preparation procedures were adapted from Kotte et al [34]. The membranes were prepared using a combined thermally-induced phase separation (TIPS) and non-solvent induced phase separation (NIPS) process. Table 7 lists the compositions of the membrane casting solutions. A control PVDF membrane and two mixed matrix PVDF membranes with in situ synthesized PAMAM particles (MDP-G0 and MDP-G1) were prepared using the three-step process given below. The recipe used to prepare the mixed matrix membranes (MMMs) was selected to achieve a high particle loading (~50 wt %) based on the results of our previous work on mixed matrix PVDF membranes with in situ synthesized PEI particles [34]. The MDP-G0 and MDP-G1 membranes were prepared using G0-NH$_2$ and G1-NH$_2$ PAMAM dendrimers as particle precursors, respectively.

1) Preparation of Membrane Casting Solutions. A typical membrane casting solution was prepared by mixing the required amounts of PVDF and TEP in a three neck round-bottom flask equipped with a condenser and an overhead stirrer. A homogeneous PVDF dope solution was obtained after mixing for 24 hours at 80° C. Following this, the prepared PVDF dope solution was transferred into a glass container and covered with aluminum foil.

2) In Situ Synthesis of Crosslinked PAMAM Dendrimer Particles. Prior to membrane casting, the PVDF dope solution was homogenized at 4000 rpm for 7 minutes using a Silverson L5M high shear mixer (HSM). During the homogenization, the temperature of the dope solution was raised to 80° C. and kept constant. A solution of PAMAM in TEP was then added drop wise to the PVDF dope solution for 5 minutes followed by high shear mixing for 15 minutes to obtain a homogeneous PVD+PAMAM dispersion in TEP. A

TABLE 7

Compositions of the casting solutions, neat PVDF membrane and mixed matrix PVDF membranes with in situ synthesized crosslinked PAMAM particles that were prepared in this study.

| Membrane | MDP-G0 M (g) | MDP-G0 wt (%) | MDP-G1 M (g) | MDP-G1 wt (%) | PVDF (Neat) M (g) | PVDF (Neat) wt (%) |
|---|---|---|---|---|---|---|
| A. Compositions of Membrane Casting Solutions ||||||| 
| $^a$)PVDF | 18.0 | 11.00 | 18.0 | 10.99 | 18.0 | 15.0 |
| $^b$)PAMAM + $^c$)ECH | 19.46 | 11.90 | 19.46 | 11.88 | — | — |
| $^d$)TEP | 120.1 | 73.46 | 120.1 | 73.31 | 102.0 | 85.0 |
| $^e$)PAMAM Solution (Methanol) | 5.95 | 3.64 | 6.27 | 3.83 | — | — |
| B. Estimated Membrane Compositions (Dry mass wt %) |||||||
| PVDF | 18.0 | 52.29 | 18.0 | 52.29 | 18.0 | 100 |
| $^1$Crosslinked PAMAM particles | 16.43 | 47.71 | 16.43 | 47.71 | — | — |
| C. Estimated degree of crosslinking of PAMAM particles based on ECH concentration (Dry mass wt %) |||||||
| $^2$ECH | 7.71 | 39.62 | 7.71 | 39.62 | — | — |
| PAMAM | 11.75 | 60.38 | 11.75 | 60.38 | — | — |

$^a$)PVDF: Polyvinylidene fluoride; $^b$)PAMAM: Polyamidoamine; $^c$)ECH: Epichlorohydrin; $^d$)TEP: Triethyl phosphate; $^e$)Methanol solutions of G0-NH$_2$ PAMAM (33.6 wt %) and G1-PAMAM (34.79 wt % ).
$^1$The mass fraction of crosslinked PAMAM particles in each membrane was estimated based on the following assumptions:
i) All ECH crosslinker molecules were reacted with the segregated PAMAM molecules by the reaction between epoxy & chloro groups of ECH and primary/secondary amino groups of PAMAM molecules in the dope solutions (FIG. 19B).
ii) Each ECH molecule produces one molecule of hydrogen chloride (HCl) following the crosslinking reaction (FIG. 19B).
iii) All unreacted PAMAM molecules were washed away in the coagulation bath and subsequent membrane washes with methanol and DIW.
$^2$The weight fraction (dry mass wt %) of ECH was taken as a surrogate for the degree of crosslinking of the PEI based on our previous work on the synthesis of perchlorate-selective resin beads [35].

solution of ECH in TEP was then added drop wise to the dispersion and homogenized for 5 minutes under similar HSM conditions to obtain a stable dispersion of PAMAM particles in the PVDF+TEP dope. Finally, the curing reaction was continued in a round bottom flask equipped with an overhead stirrer at 80° C. for 3 hours.

3) Membrane Casting. Following the completion of the curing reactions, the dispersion of PVDF+TEP+ECH crosslinked PAMAM particles dope was allowed to cool to ambient temperature to initiate the TIPS step of the membrane casting process. The membranes were prepared with and without a polyethylene terephthalate (PET) microporous support. To prepare a membrane without support, the cooled dispersion of PVDF+PAMAM particle in TEP was poured onto a clean glass plate. A casting knife (BYK Chemie) [with 300 □m air gap] was used to uniformly coat the casting solution onto the glass plate. The nascent membrane was kept for 30 seconds at ambient temperature (25±1° C., RH: 55%) followed by immersion into a DIW bath with a temperature of 23±1° C. After 1 hr, the nascent membrane was transferred to a fresh DIW bath and immersed for 24 h. Following this, the membrane was soaked in ethanol for 10 h. Finally, the membranes were air dried and stored in a desiccator. A similar procedure was used to prepare a membrane with microporous support by pouring the casting solution on a PET non-woven fabric. The supported membranes were stored in DIW with the water periodically replaced with fresh DIW until the metal binding experiments were initiated.

Example 3: Membrane Characterization

1) Membrane Morphology. The cross-sectional and top surface of each membrane was imaged with a field emission scanning electron microscope (FESEM, Magellan Series 400, FEI Corporation) at an acceleration voltage of 2.0 kV. Before imaging, all samples were first coated with platinum for 30 seconds followed by osmium for 30 seconds to minimize the charging effect. To obtain the membrane cross section morphology, the membranes were frozen and fractured following immersion in liquid nitrogen. The SEM images were subsequently analyzed to estimate membrane thickness and PAMAM particle size using the Image J Version 1.45m image processing/analysis software [36].

2) $N_2$ Adsorption Permporometry. The average pore diameter of each membrane top/skin layer was determined by $N_2$ adsorption permporometry [12] at 77 K using a Micromeritics ASAP 2020 accelerated surface area and porosimetry analyzer. The Barrett-Joyner-Halenda (BJH) methodology was utilized to extract membrane pore diameters from the $N_2$ adsorption/desorption data [37].

3) Membrane Surface Composition. The surface chemical composition was characterized by Fourier transform infrared (FT-IR) spectroscopy. The mid IR spectra (500 $cm^{-1}$ to 4000 $cm^{-1}$) of the membranes were scanned in attenuated total reflectance (ATR) mode. The spectra were acquired by averaging 32 scans at a resolution of 2 $cm^{-1}$ using a JASCO 4100 FT-IR spectrometer (Japan) and a zinc selenide ATR crystal plate with an aperture angle of 45°. In contrast, the near IR (NIR) spectrum of each membrane (4000 $cm^{-1}$ to 10000 $cm^{-1}$) was recorded by reflection using a Bruker MPA FT-NIR spectrometer equipped with a quartz beam splitter and an external RT-PbS detector. The NIR spectra were acquired by averaging 32 scans at a resolution of 8 $cm^{-1}$. The elemental composition of each membrane surface was analyzed by X-ray photoelectron spectroscopy (XPS) using an SSX-100 UHV spectrometer from Surface Science Instruments. The sample was irradiated with a beam of monochromatic Al Kα X-rays with energy of 1.486 keV.

4) Contact Angle Measurements. The hydrophobicity of each membrane was determined from contact angle measurements using a Phoenix 300 contact angle analyzer. A micro syringe was utilized to place a water droplet on the surface of each membrane. After 30 and 120 seconds, the image was captured and analyzed using the instrument's image processing software. Each reported contact angle is the average of five different measurements.

5) Particle Size Measurements by DLS. A 0.2 g of dry membrane was added to 20 g of TEP solvent in sample vial. It was allowed for dissolution for 15 hours at ambient temperature as a result fine dispersion was obtained. Then the dispersion was sonicated for 15 minutes. A 1.0 mL aliquot was sampled from the dispersion and diluted with 10 mL of TEP solution for the DLS measurements. These were conducted in duplicate at 25° C. using TEP solvent.

6) Zeta Potential Measurements. The zeta potentials of the membranes were determined using the electrophoresis method [38]. An ELSZ-2 electrophoretic light scattering spectrophotometer from Otsuka Electronics, Japan [with a plate quartz cell as membrane holder] was employed to measure the electrophoretic mobility of the monitoring particles. The monitoring particles consisted of polystyrene (PS) latex particles (Otsuka Electronics, Japan) with an amide surface coating and diameter of 520 nm. The PS particles were dispersed in 0.01 M NaCl solutions at pH 7.0. The measured electrophoretic mobilities (U) of the monitoring PS particles [$cm^2/(V·s)$] were utilized to calculate membrane zeta potentials ([mV] using the Smoluchowski equation as given below [38]:

$$\varsigma = \frac{4\pi\eta U}{\varepsilon_r \varepsilon_0} \qquad \text{Eq 1}$$

where $\eta$ is the liquid viscosity (0.89×10$^{-3}$ Pa·s), $e_r$ is the relative permittivity of liquid (78.38) and $e_0$ is the vacuum permittivity (8.854×10$^{-12}$ s·m$^{-1}$).

Example 4: Copper Filtration and Binding Studies

Figure 20:
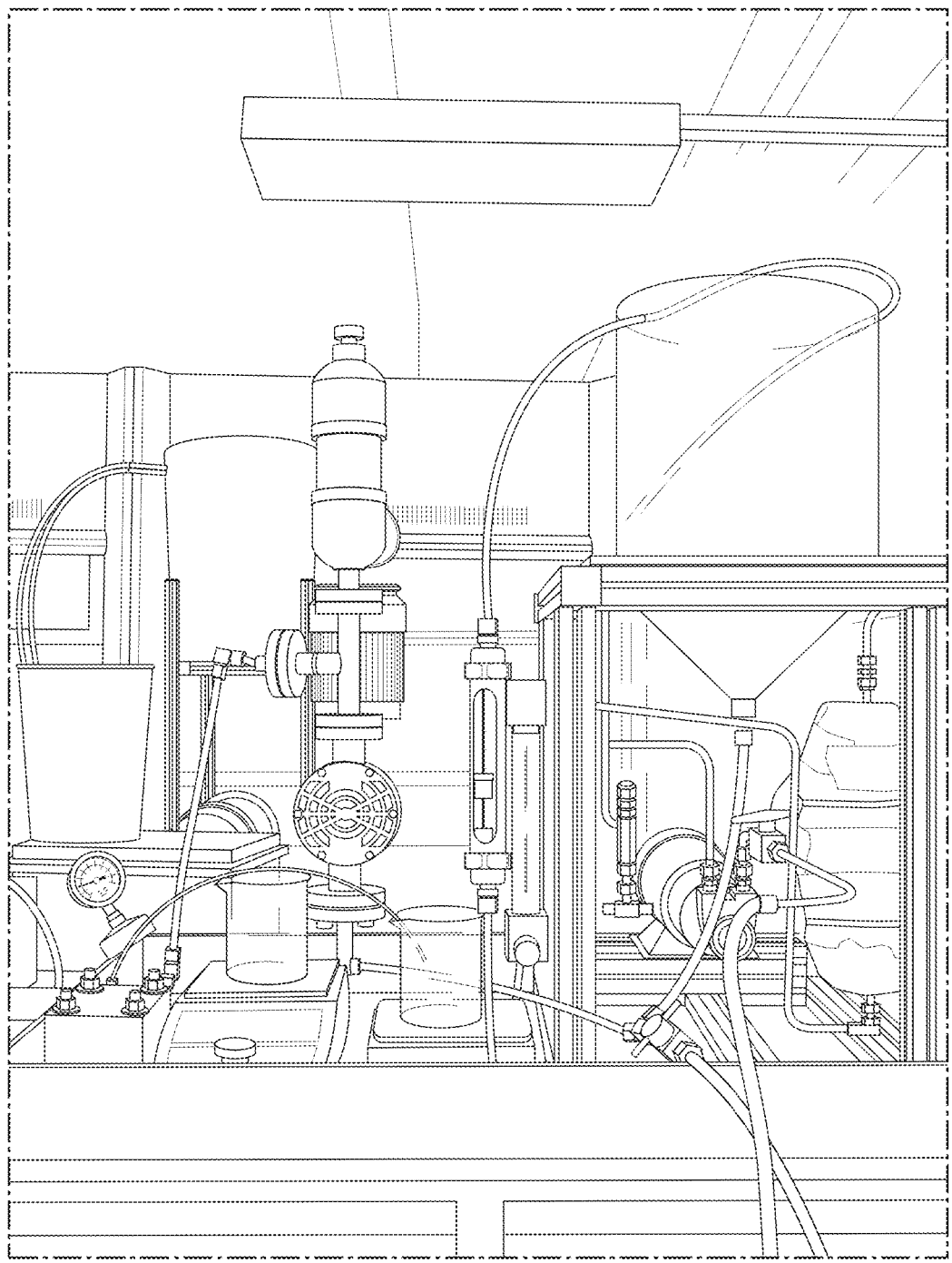
FIG. 20 shows a picture of the crossflow ultrafiltration (UF) system used in the water filtration and Cu(II) binding measurements. The filtration cell (17.62 cm in length; 2.54 cm in width and 0.3 cm in depth), pump head, reservoir and tubing were built using Teflon and polyvinyl chloride to eliminate metal ion sorption onto the system components.

The Cu(II) filtration and binding experiments were conducted on a custom-made cross-flow UF system with an active filtration area of 24 $cm^2$. The filtration cell (17.62 cm in length; 2.54 cm in width and 0.3 cm in depth), pump head, reservoir and tubing were built using Teflon and polyvinyl chloride (FIG. 20) to eliminate metal ion sorption onto the system components. The flow rate was maintained at ~1.7 L/min with a crossflow velocity of ~37.2 cm/s.

Each filtration experiment consisted of four steps. The pH of the feed water was adjusted with a solution of 0.1 N HCl or 0.1 N NaOH as needed. Each membrane was first compacted by running DIW for 1 hour at a pressure of 3 bar. The pressure was then reduced to 2 bar and aliquots of permeate were collected every 5 minutes for 1 hour to estimate membrane water flux. Following this, a constant-pH solution was pumped through each membrane and aliquots of permeate were collected every 5 minutes for 30 minutes. After the completion of the constant-pH water flux measurements, a 2 L of a solution of Cu(II) [10 mg/L] at constant pH (3, 7 and 9) was pumped through each membrane at 2 bar. In this case, permeate samples were collected every 5 minutes for 3 hours. Following the flux measurements, the permeate samples were poured back into the UF system feed tank (FIG. 20) to keep the volume of the feed (2 L) constant; i.e. within 2%.

The permeate flux ($J_n$) [L m$^{-2}$ hr$^{-1}$] at time $t_n$ through each membrane was expressed as:

$$J_n = \frac{V_p}{A t_n} \quad \text{Eq. 2}$$

where $V_p$ is the volume of permeate (L) collected at time $t_n$ (hr) and A is the effective membrane area (m$^2$). For the Cu(II) binding assays, aliquots (1 mL) of feed and permeate solutions were sampled every 5 minutes for a period of 1 hour and then every 30 minutes for the remainder of the run time. The collected samples were diluted with a 3 wt % HNO$_3$ solution and analyzed by inductively coupled plasma mass spectrometry (ICP-MS) using an Agilent ICP-MS 7700x instrument.

The mass of Cu(II) bound $M_{t_n}^m$ (mg per mL of dry membrane) at time $t_n$ was expressed as:

$$M_{t_n}^m = \frac{(V_{t_n}^F C_{t_n}^F - V_{t_n}^P C_{t_n}^P)}{A_m d_m} \quad \text{Eq. 3}$$

where $V_{t_n}^F$ and $V_{t_n}^P$ are, respectively, the volumes of feed and permeate at time $t_n$; $C_{t_n}^F$ and $C_{t_n}^P$ are, respectively, the copper concentrations in the feed and permeate at time $t_n$; and $A_m$ and $d_m$ are, respectively, the membrane area and thickness. To account for the addition of a permeate sample in the feed following the completion of a flux measurement, a corrected copper correction in the feed at time $t_n$ (n>0) was estimated by mass balance using the equation given below:

$$C_{t_n}^F = \frac{C_{t_{n-1}}^F V_{t_{n-1}}^F + C_{t_{n-1}}^P V_{t_{n-1}}^{PSF}}{V_{t_{n-1}}^F + V_{t_{n-1}}^{PSF}} \quad \text{Eq. 4}$$

where $C_{t_n}^F$ and $C_{t_{n-1}}^F$ are, respectively, the copper concentration in the feed at times $t_n$ and $t_{n-1}$; $C_{t_{n-1}}^P$ is copper concentration in the permeate at time $t_{n-1}$; $V_{t_{n-1}}^F$ is the volume of feed at time $t_{n-1}$ and $V_{t_{n-1}}^{PSF}$ is the volume of permeate sample that was poured back to the feed at time $t_{n-1}$.

Example 5: Membrane Preparation, Morphology and Bulk Properties

PAMAM dendrimers were the first class of dendrimers to be commercialized[17]. They possess functional nitrogen and amide groups arranged in regular "branched upon branched" patterns, which are displayed in geometrically progressive numbers as a function of generation level. This high density of N and O donors make PAMAM dendrimers particularly attractive as high capacity and selective chelating agents for transition metal ions such as Cu(II) [39], [40], [41], [24]. Diallo et al. [23] have developed a dendrimer enhanced filtration (DEF) process that can recover Cu(II) from aqueous solutions using UF. Although higher generation PAMAM dendrimers (e.g. G3-G5 NH$_2$) have shown excellent potential as high capacity, selective and recyclable macroligands for Cu(II) recovery from aqueous solutions using DEF[23] and dendronized PAMAM hollow fiber membranes [39], they are expensive to produce due to the large number of synthetic and purification steps required to prepare such macromolecules. To further exploit the high metal ion chelating capability of PAMAM dendrimers for Cu(II) recovery from aqueous solutions, it is described herein the preparation of a new family of mixed matrix PVDF membrane absorbers with in situ synthesized particles using low-generation PAMAM dendrimers (G0-NH$_2$ and G1-NH$_2$) as precursors.

A standard procedure for the preparation of mixed matrix membranes involves the dispersion of preformed micro/nanoparticles in a suitable polymer solution followed by membrane casting. However, the synthesis of preformed PAMAM micro/nanoparticles will require the use of surfactant-stabilized inverse suspensions systems [35]-[42] followed by tedious and lengthy purifications to produce the clean particles required for the preparation of high quality dope solutions for the synthesis of PVDF-PAMAM membrane absorbers.

FIG. 19A illustrates the one-pot method that was employed to prepare our new mixed matrix PVDF membranes including (i) dope preparation, (ii) in situ PAMAM particle synthesis and (iii) phase inversion casting. It is worth mentioning that this membrane preparation is simple, versatile and potentially scalable. All the components of the mixed matrix PVDF membranes with in situ synthesized are prepared in a one-pot dispersion (FIG. 19A) prior to membrane casting. FIG. 19B depicts the crosslinking reaction between a G1-NH$_2$, PAMAM macromolecule and an ECH molecule in the membrane casting solution. Kotte et al. [43] provide a detailed discussion of the reactions of ECH with the primary/amino groups of functional polymers with amine groups such branched polyethyleneimine (PEI).

The selection of PVDF, ECH and G0/G1-NH$_2$ PAMAM dendrimers as building blocks for the generated mixed matrix PVDF membrane absorbers was motivated by several considerations. Firstly, PVDF is widely used as base polymer in the fabrication of commercial UF/MF membrane due to its high tensile strength, and thermal and chemical resistance [42]. PVDF membranes can be prepared by phase inversion casting using TIPS and/or NIPS [35]. This provides many degrees of freedom for optimizing the microstructures of the mixed matrix PVDF membrane absorbers by selecting the appropriate synthesis conditions. Secondly, the high reactivity of ECH toward functional macromolecules and oligomers containing primary and secondary amino groups was exploited to prepare a broad range of separation membranes and media [34], [43], [44], [23], [35]. Thirdly, the low-generation PAMAM dendrimers (G0 and G1-NH$_2$) have (i) well defined compositions, (ii) low molecular weights ($M_n$ of 517 and 1430 Da) and (iii) high density of functional N and O donors (~19 meq/g) for metal ion complexation (Table 1). Moreover, the G0 and G1-NH$_2$ PAMAM are much less expensive to produce and have the required primary amine groups (NH$_2$) for in situ crosslinking with ECH [34], [43], [44] in the dope solutions prior to membrane casting (FIG. 19B).

Two mixed matrix PVDF membranes with in situ synthesized PAMAM particles (MDP-G0 and MDP-G1) and a control (neat) PVDF membrane were prepared in this study. Table 7 lists the composition of the casting solution for each membrane. Table 8 lists the estimated compositions (on a dry basis) of the neat PVDF membrane and mixed matrix PVDF membranes that were prepared in this study. The recipes used to prepare the currently disclosed mixed matrix membranes (MMMs) were adapted from the previous studies [34], [43], [44] to achieve a high loading (~48 wt %) of in situ synthesized PAMAM particles with a degree of crosslinking (i.e. particle ECH wt %) of 40%.

TABLE 8

Estimated compositions of the mixed matrix PVDF membranes with in situ synthesized PAMAM particles and neat PVDF membranes that were prepared in this study.

| Mixed Matrix Membrane | $^a W_{PVDF}$ (Wt %) | $^b W_{XLP}$ (Wt %) | $^c W_{ECH}$ (Wt %) | $^d C_{Pamine}$ (meq/g) | $^e C_{Samine}$ (meq/g) | $^f C_{Tamine}$ (meq/g) | $^g C_{Amide}$ (meq/g) | $^h C_{Ligand}$ (meq/g) |
|---|---|---|---|---|---|---|---|---|
| MDP-G0 | 52.29 | 47.71 | 39.62 | 0 | 2.65 | 1.33 | 2.65 | 9.29 |
| MDP-G1 | 52.29 | 47.71 | 39.62 | 0 | 1.91 | 1.43 | 2.86 | 9.06 |
| PVDF (Neat) | 100 | 0 | 0 | 0 | 0 | 0 | 0 | 0 |

$^a W_{PVDF}$: estimated mass fraction of PVDF in the dry membrane
$^b W_{XLP}$: the mass fraction of crosslinked PAMAM particles in the dry membrane was estimated based on the following assumptions:
i) All ECH crosslinker molecules were reacted with the segregated PAMAM molecules by the reaction between the epoxy &chloro groups of ECH and the primary amino groups of PAMAM molecules in the dope solution (FIG. 19B).
ii) Each ECH molecule produces one molecule of hydrogen chloride (HCl) following the crosslinking reaction (FIG. 19B).
iii) All unreacted PAMAM molecules were washed away in the coagulation bath and subsequent membrane washes with methanol and DIW.
$^c W_{ECH}$: the mass fraction of ECH was taken as a surrogate for the degree of crosslinking of the in situ synthesized PAMAM particles based on our previous work on the synthesis of perchlorate-selective PEI resin beads [42].
$^d C_{Pamine}$, $^e C_{Samine}$ and $^f C_{Tamine}$ are the estimated concentrations of primary, secondary and tertiary amine groups in milli equivalents (meq) per gram of dry membrane respectively.
$^g C_{Amide}$ and $^h C_{Ligand}$ are the estimated concentration of amide and ligands (i.e. N and O donors) meq per gram of dry membrane, respectively.

A combined TIPS and NIPS casting process was employed to prepare the disclosed MMMs. For the characterization experiments, the membranes were prepared without a polyethylene terephthalate (PET) microporous support.

FIG. 21 shows FESEM cross-section micrographs of the neat PVDF membrane (Panels A and B), MDP-G0 membrane (Panels C and D) and MDP-G1 membrane (Panels E and F). Table 9 lists selected physicochemical properties of these membranes. FIG. 21 and Table 9 indicate that the neat PVDF membrane exhibits an asymmetric structure with a dense skin (~15.0 μm) and a matrix with a sponge like microstructure consisting of PVDF spherulites. Similarly, the MDP-G0 and MDP-G1 membranes are asymmetric with dense skins (~8-12 μm) and matrices with sponge-like microstructures containing mixtures of PAMAM particles and PVDF spherulites (FIG. 21). The sponge-like microstructures of the MMMs is primarily attributed to the crystallization-induced gelation process that occurred during the TIPS process[32] when the hot membrane casting solutions (80° C.) were cooled down to ambient temperature prior to immersion into the DIW bath.

TABLE 9

Selected physicochemical properties of the mixed matrix PVDF membranes with in situ synthesized PAM AM particles and neat PVDF membrane that were prepared in this study.

| Property | MDP-G0 | MDP-G1 | PVDF (Neat) |
|---|---|---|---|
| $^a$Thickness of membrane surface layers (μm) | 11.78 | 7.58 | 15.0 |
| Thickness of dry membrane (μm) | 150.0 | 151.5 | 103.5 |
| $^b$Contact angle (Degree) | 56.0 | 59.0 | 87.0 |
| $^c$Zeta potential at pH 7.0 (mV) | 0.93 | 0.46 | −5.9 |
| $^d$Average pore diameter (nm) | | | |
| Adsorption | 44.6 | 28.03 | 16.87 |
| Desorption | 26.7 | 22.48 | 12.79 |
| $^e$Crosslinked PAMAM particle diameter by FESEM (nm) | | | |
| Minimum | 335 | 816 | NA |
| Maximum | 2890 | 3341 | NA |
| Average | 1501 | 2284 | NA |
| $^f$Crosslinked PAMAM particle diameter by DLS (nm) | | | |
| Minimum | 816 | 1801 | NA |
| Maximum | 1309 | 3179 | NA |
| Average | 1373 | 2442 | NA |

$^a$Estimated average thickness of each membrane surface layer from the FESEM micrographs using the Image J software (35).
$^b$Measured contact angle after 120 seconds.
$^c$Measured zeta potential at pH 7.0.
$^d$Average pore diameter of the top layer (i.e. skin) of each membrane. The pore diameters were estimated from the N₂ adsorption permporometry experiments using the Barrett-Joyner-Halenda (BJH). methodology (FIGS. 24-26).
$^e$Estimated size range of crosslinked PAMAM embedded particles using FESEM micrographs analyzed by Image J software (Table 8).
$^f$Estimated size range of crosslinked PAMAM embedded particles from DLS particle size analysis.
$^g$NA: Not Applicable FIG. 22 shows magnified FESEM micrographs (1000×) of the top cross-sections of the MDP-G0 and MDP-G1 membranes. These micrographs confirm that the PAMAM particles are present in both the matrices and top surfaces of the MMMs.

Figure 23:
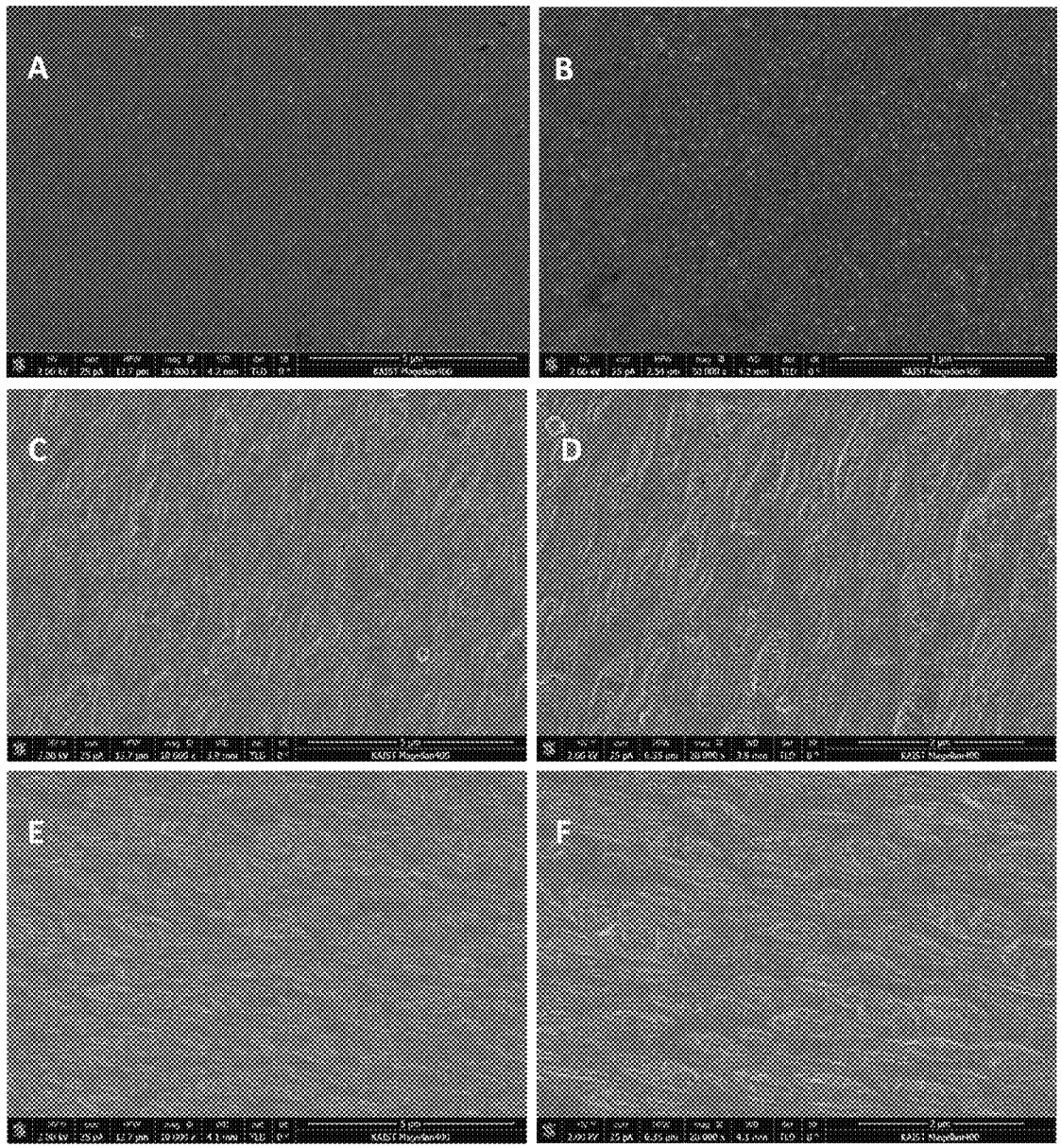
FIG. 23 shows representative FESEM surface micrographs showing the top surfaces of mixed matrix PVDF membranes with in situ synthesized PAMAM particles. Panels A and B: pristine PVDF control membrane; Panels C and D: mixed matrix PVDF MDP-G0 membrane; Panels E and F: mixed matrix PVDF MDP-G1 membrane. The estimated composition of each membrane is listed in Table 7.

FIG. 23 indicates that the top surfaces of the mixed matrix PVDF membranes appear to be more porous than that of the neat PVDF membrane as illustrated by the corresponding SEM micrographs. The $N_2$ permporometry measurements (see FIGS. 24-26 and Table 9) indicate that the skin layer of the MDP-G0 membrane has larger pore diameters (~27-45 nm) than those of the MDP-G1 membrane (~23-28 nm) and neat PVDF membrane (~13-17 nm). FIG. 21 and FIG. 22 also show that the PAMAM particles are uniformly distributed throughout the cross-section of MMMs.

Figure 27:
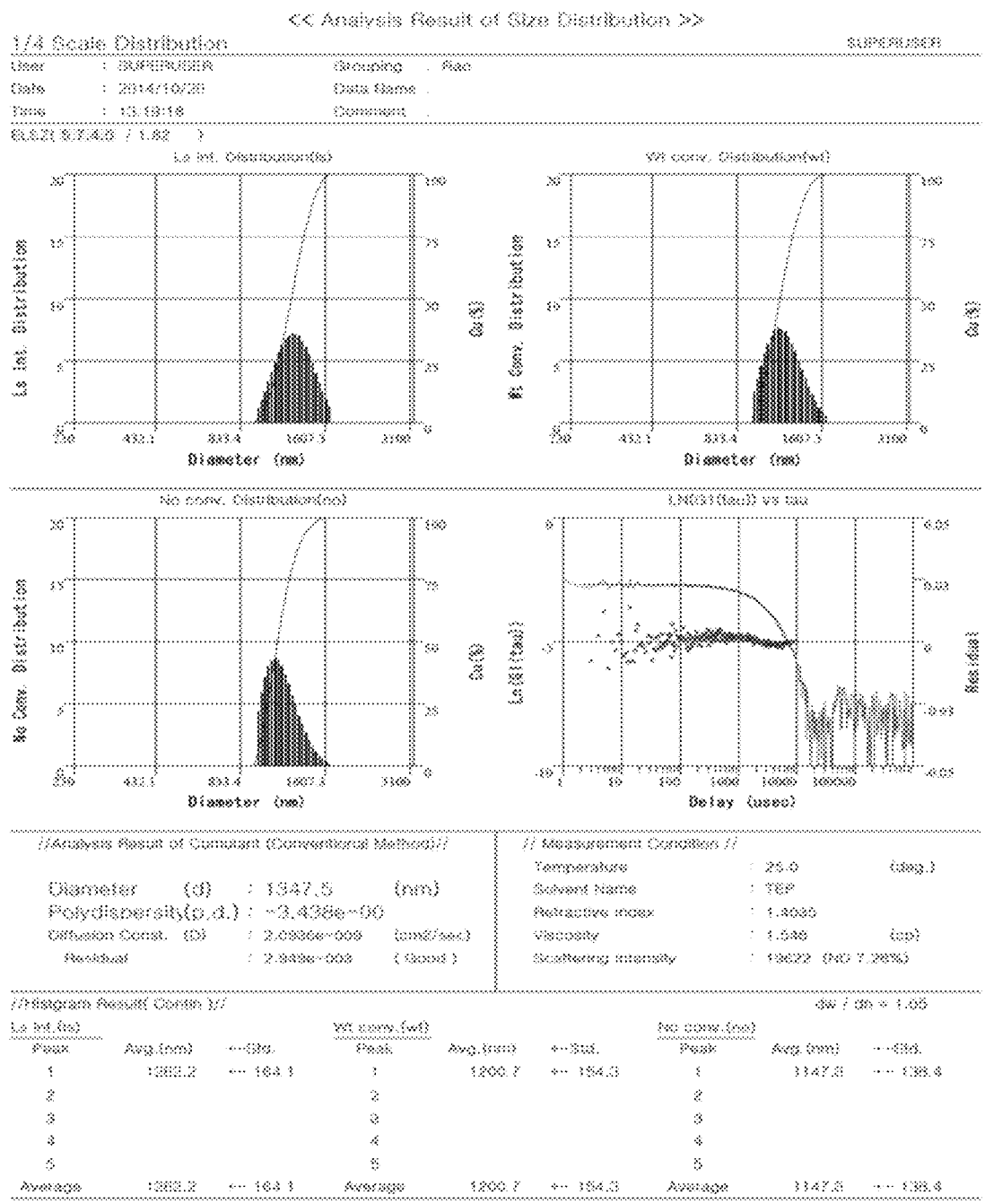
FIG. 27 shows DLS measurements of particle size distribution for the mixed matrix MDP-G0 membrane with in situ synthesized crosslinked PAMAM particles. The membrane was dissolved in TEP.
Figure 28:
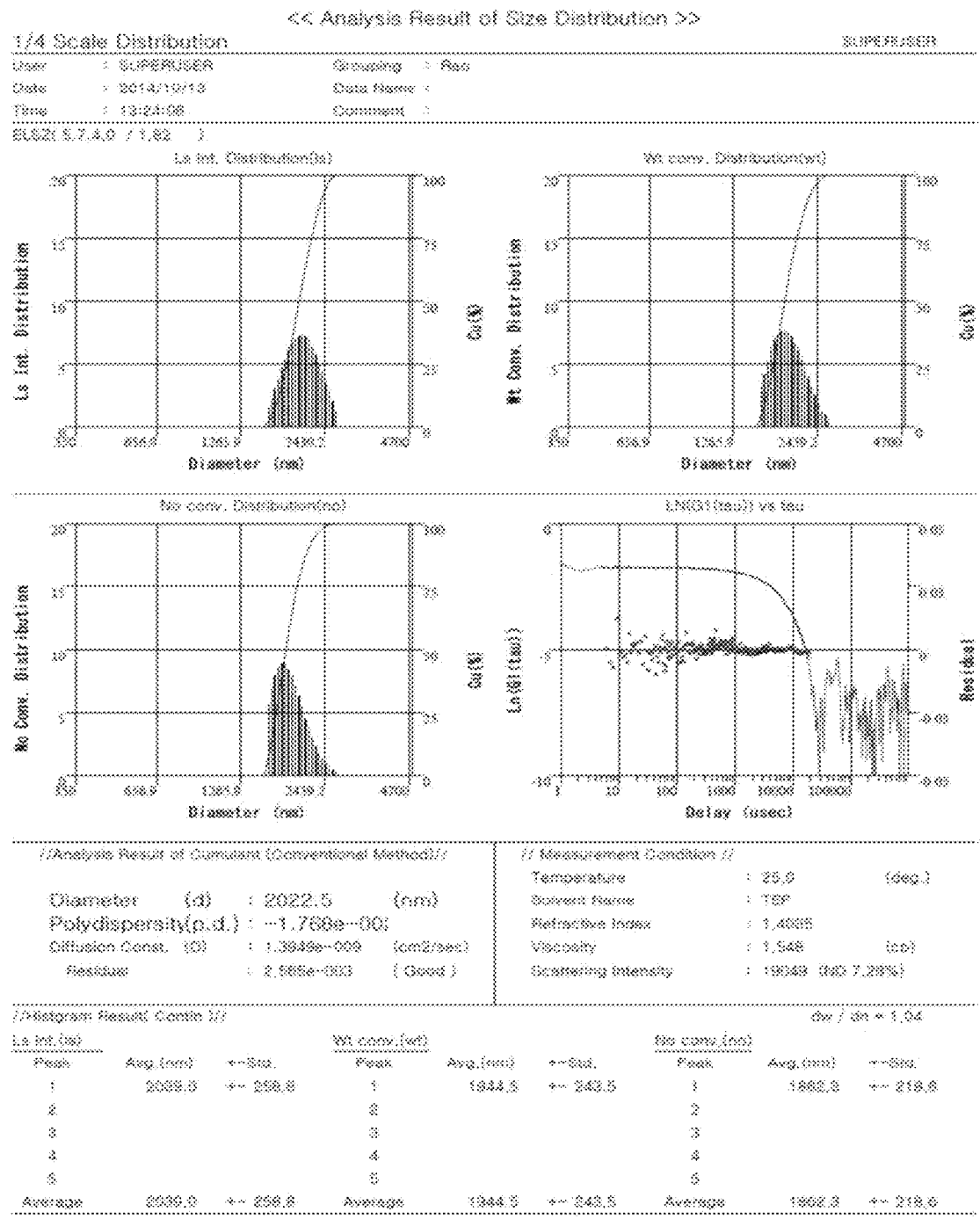
FIG. 28 shows DLS measurements of particle size distribution for the mixed matrix MDP-G1 membrane with in situ synthesized PAMAM particles. The membrane was dissolved in TEP.

The SEM analysis Image J software [36] is subsequently utilized to extract estimates of the size ranges of the embedded PAMAM particles for each mixed matrix PVDF membrane (see Table 5). Table 10 indicates that the average diameters of PAMAM particles of the MDP-G0 and MDP-G1 membranes are, respectively, equal to ~1.5 and 2.3 μm. To validate the FESEM particle size estimates, DLS measurements of dispersions of PAMAM particles obtained by dissolving the MMMs in TEP were carried out. These measurements confirm that the sizes of the PAMAM particles in the TEP dispersions (~1.4 to 2.3 μm) are comparable to the FESM particle size estimates (Table 10 and FIGS. 27 and 28).

TABLE 10

Estimated diameters of the embedded PAMAM particle of the mixed matrix MDP-GO and MDP-G1 membranes using FESEM with the image processing/analysis software ImageJ.[45]

| | Particle Diameter (nm) | |
|---|---|---|
| Image No | MDP-G0 | MDP-G1 |
| 1 | 1867 | 2572 |
| 2 | 2370 | 3127 |
| 3 | 383 | 2459 |
| 4 | 1293 | 3342 |
| 5 | 1029 | 2411 |
| 6 | 814 | 3055 |
| 7 | 335 | 1361 |
| 8 | 359 | 740 |
| 9 | 2968 | 2817 |
| 10 | 1269 | 2530 |
| Average Diameter (nm) | 1269 | 2441 |
| Minimum (nm) | 335 | 740 |
| Maximum (nm) | 2968 | 3342 |

Example 6: Membrane Surface Composition and Physicochemical Properties

Zhang et al. [46] have shown that dendronized PAMAM HFMs can act as nucleation sites and supports for the formation and precipitation of copper hydroxide mineral scales as they become saturated with Cu(II) ions. Therefore, the knowledge gained during the previous investigations of mixed matrix membranes with in situ synthesized and PEGYlated PEI particles[43, 44] was utilized to prepare new PVDF-PAMAM membrane absorbers with hydrophilic and neutral surface layers. Based on the results of these previous studies [43, 44], it is expected that the surface layers of such membranes to exhibit good fouling resistance and lower scaling tendency. The FT-IR spectra corroborate the presence of PAMAM particles at the surfaces of the MDP-G0 and MDP-G1 membranes.

Figure 29:
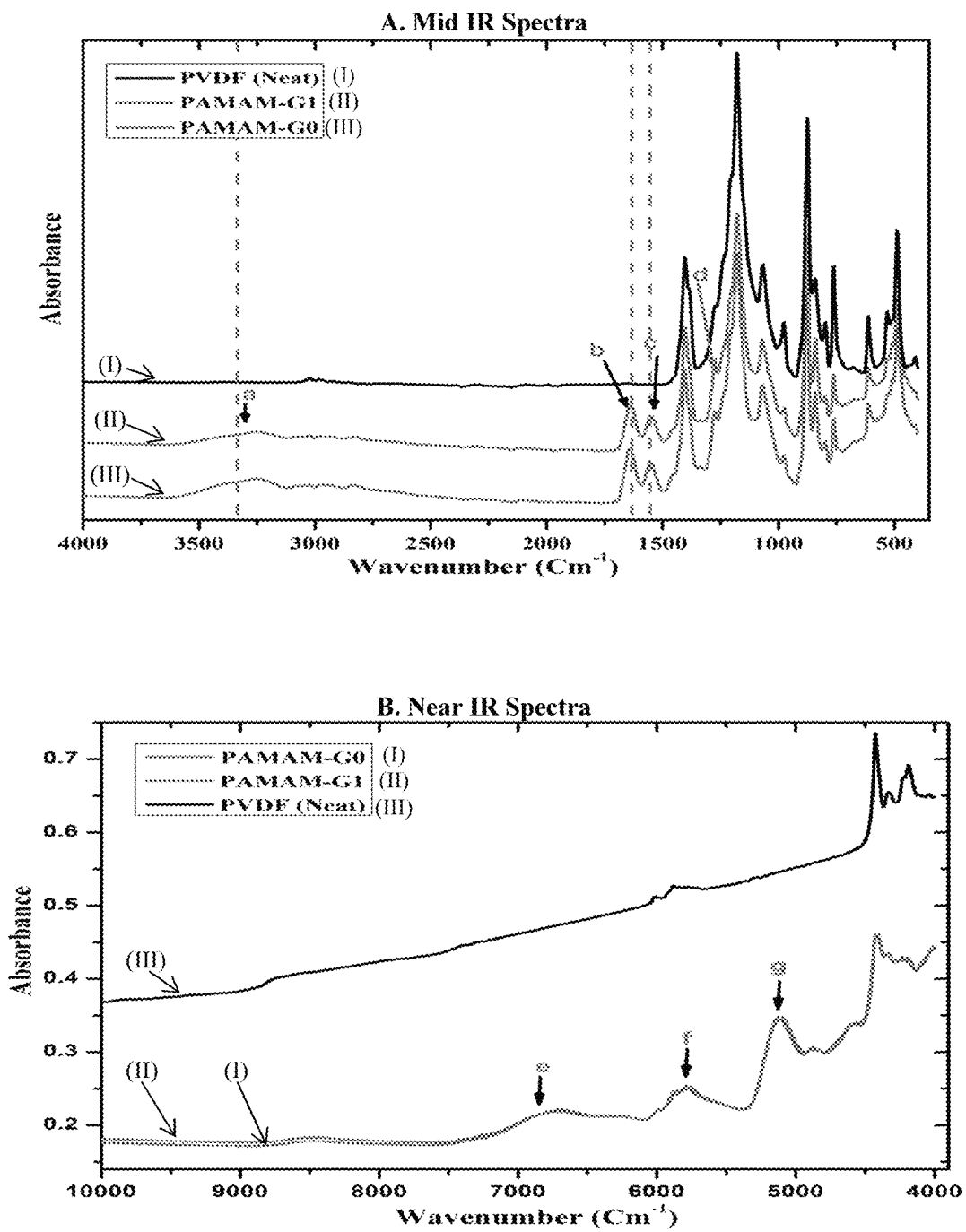
FIG. 29 shows mid and near FTIR spectra of the neat PVDF membrane and mixed matrix PVDF membranes with in situ synthesized PAMAM particles. Panel A highlights the main absorption bands of the mid IR region: (a) 3313 $cm^{-1}$: —OH and —NH stretch from amide, secondary amino or hydroxyl groups of PAMAM particles; (b) 1640 $cm^{-1}$: —C=O stretch from amide groups of PAMAM particles; (c) 1540 $cm^{-1}$: —NH bending from the amide/amine groups of PAMAM particles and (d) 1270 $cm^{-1}$: —C—N stretch from the amine groups of PAMAM particles. Panel B highlights the main absorption bands of the near IR region: (e) 6850 $cm^{-1}$: —OH overtone from the ECH crosslinked PAMAM particles. (f) 5788 $cm^{-1}$: overtones of —CH/—$CH_2$ stretching from the ECH crosslinked PAMAM particles and (g) 5116 $cm^{-1}$: combination of asymmetric OH stretching/bending from the ECH crosslinked PAMAM particles. The estimated composition of each membrane is listed in Table 8.

FIG. 29A shows that the mid IR spectra of both membranes exhibit four new peaks including (i) —OH and —NH stretching (3313 $cm^{-1}$) from the amide, secondary amino or hydroxyl groups of the ECH crosslinked PAMAM particles; (ii) —C═O stretching (1640 $cm^{-1}$) from the amide groups of the PAMAM particles; (iii) —NH bending (1540 $cm^{-1}$) from the amide/amine groups of PAMAM particles and (iv) —C—N stretching (1270 $cm^{-1}$) from the amine groups of PAMAM particles [43], [34], [44], [47]. The near IR spectra (FIG. 29B) provide additional supporting evidence for the presence of PAMAM particles with —OH groups at the surfaces of these membranes including: (i) first overtone of —OH stretching vibrations (6914 $cm^{-1}$), (ii) first overtones of —CH and —$CH_2$ stretching vibrations (5783 $cm^{-1}$) and (iii) combination of —$NH_2$ stretching and bending vibrations (5115 $cm^{-1}$) [43], [34], [44]. The XPS experiments also corroborate the presence of PAMAM particles with high density of OH groups at the surfaces of the mixed matrix PVDF membranes.

Figure 30:
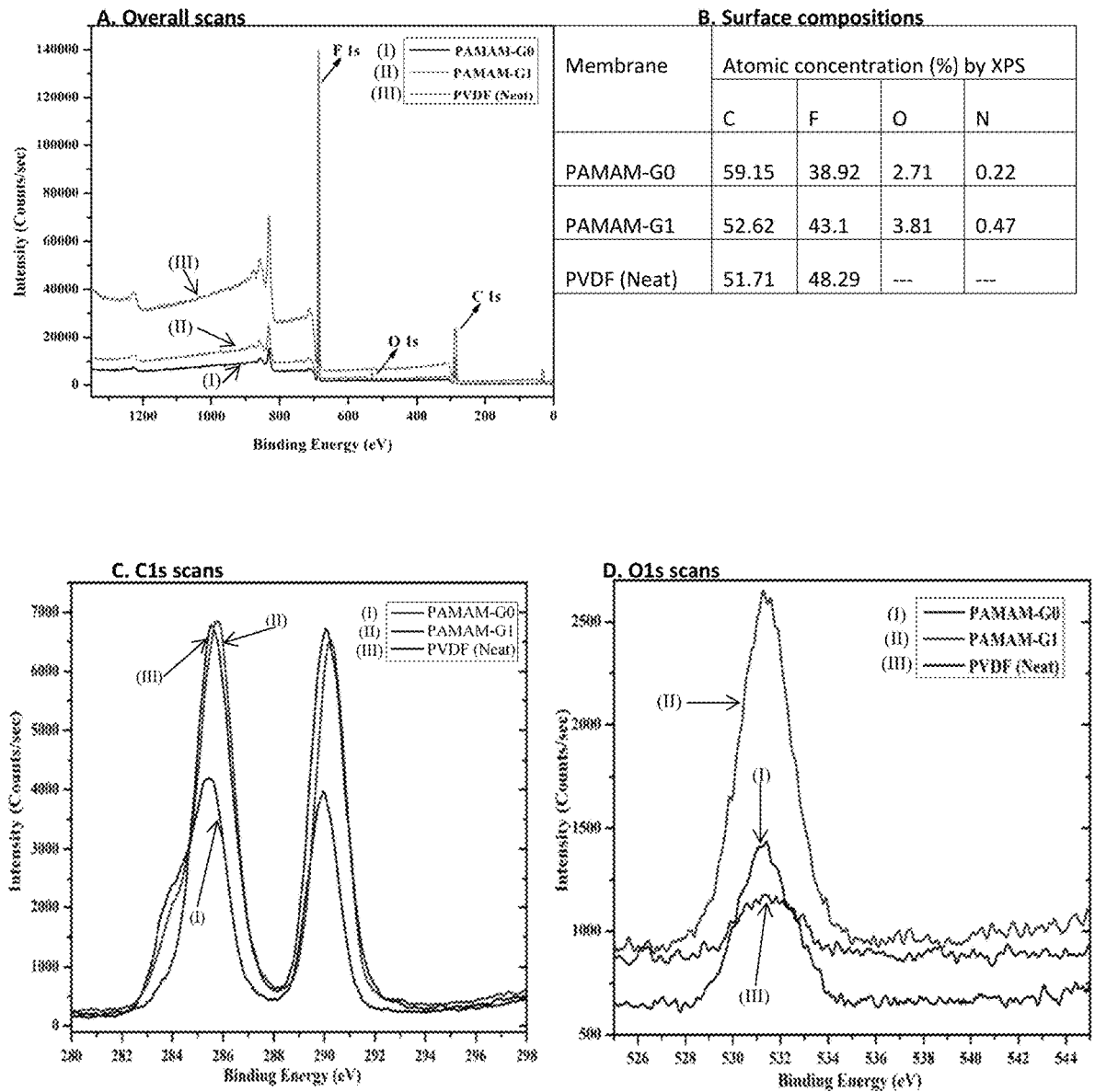
FIG. 30 shows XPS spectra of the control PVDF membrane and mixed matrix PVDF membranes with in situ synthesized PAMAM particles. The estimated composition of each membrane is listed in Table 7.

FIG. 30 shows that the atomic concentrations of oxygen (O1s) of the MDP-G0 and MDP-G1 membranes are, respectively, equal to 2.71 and 3.81 wt %. It is worth mentioning that the concentrations of nitrogen (N1s) are significantly lower for both MMMs; i.e. 0.22 wt % for MDP-G0 and 0.47 wt % for MDP-G1. The zeta potential (ZP) measurements (Table 4) indicate that the PVDF-PAMAM membrane absorbers have neutral surface charges with ZP values respectively equal to 0.93 mV and 0.46 mV for the MDP-G0 and MDP-G1 membranes compared to −5.9 mV for the neat PVDF. These results suggest that the ECH crosslinked PAMAM particles expose their OH groups at the surface of the mixed matrix PVDF membranes. This observation is primarily attributed to more favorable interactions between the PAMAM particles and the non-solvent (DIW) during the coagulation phase of the membrane casting process (FIG. 19A). This causes the ECH crosslinked PAMAM particles to migrate at the surface of the MMMs and expose their OH groups as they become incorporated in the membrane surface layers (FIG. 22).

Example 7: Copper Filtration and Binding Studies

The overall results of the characterization experiments indicate that the MDP-G0 and MDP-G1 membranes are asymmetric with (i) neutral and hydrophilic surface layers of average pore diameters of 23-45 nm and (ii) high loadings of in situ synthesized PAMAM particles (~48 wt %) containing ~9.0 meq of N and O donors per g of dry membrane (Table 3). These membranes also exhibit the sponge-like microstructures (FIG. 21) that are typically found in UF membranes with strong mechanical integrity.[37]

Filtration experiments were carried out to evaluate the utilization of MDP-G0 and MDP-G1 as membrane absorbers for Cu(II) recovery from aqueous solutions by low-pressure UF at 2 bar. Three objectives of these experiments were to: 1) assess the effects of solution pH on Cu(II) uptake by the PVDF-PAMAM membrane absorbers, 2) evaluate the scaling potential of these membranes and 3) gain insight into the mechanisms of Cu(II) coordination with the N and O donors of their embedded PAMAM particles.

Figure 31:
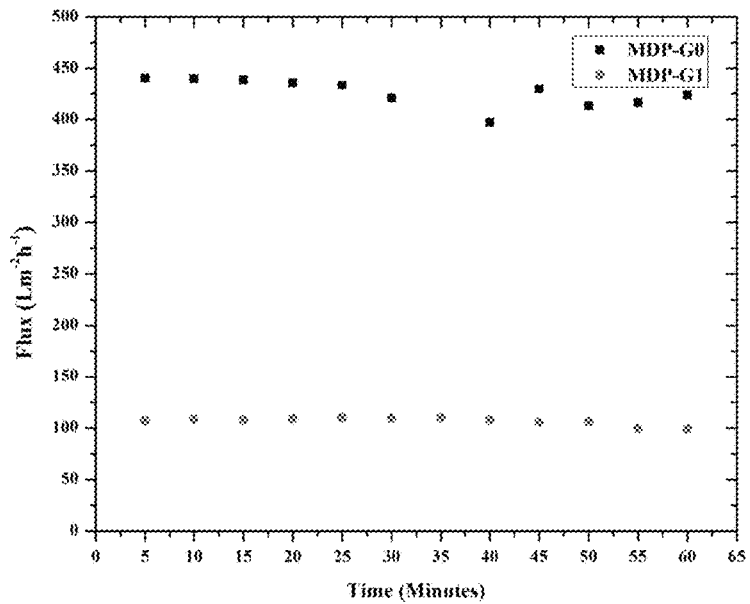
FIG. 31 shows DIW flux of the mixed matrix MDP-G0 and MDP-G1 membranes as a function of filtration time at 2 bar. The estimated composition of each membrane is listed in Table 7.

FIG. 31 shows the flux of DIW through the MMMs as a function of time at 2 bar. The average water flux of the MDP-G0 and MDP-G1 membranes are, respectively, equal to ~427±13 and 107±4 LMH (Figure S10). In contrast, the neat PVDF membrane has a very low water flux; i.e. less than 3.0 LMH (data not shown). The higher flux of the MDP-G0 membrane is attributed to its lower contact angle (i.e. higher hydrophilicity) and the larger pore diameters of its surface layer; i.e. ~27-45 nm compared to ~22-28 nm for those of the MDP-G1 membrane.

Figure 33:
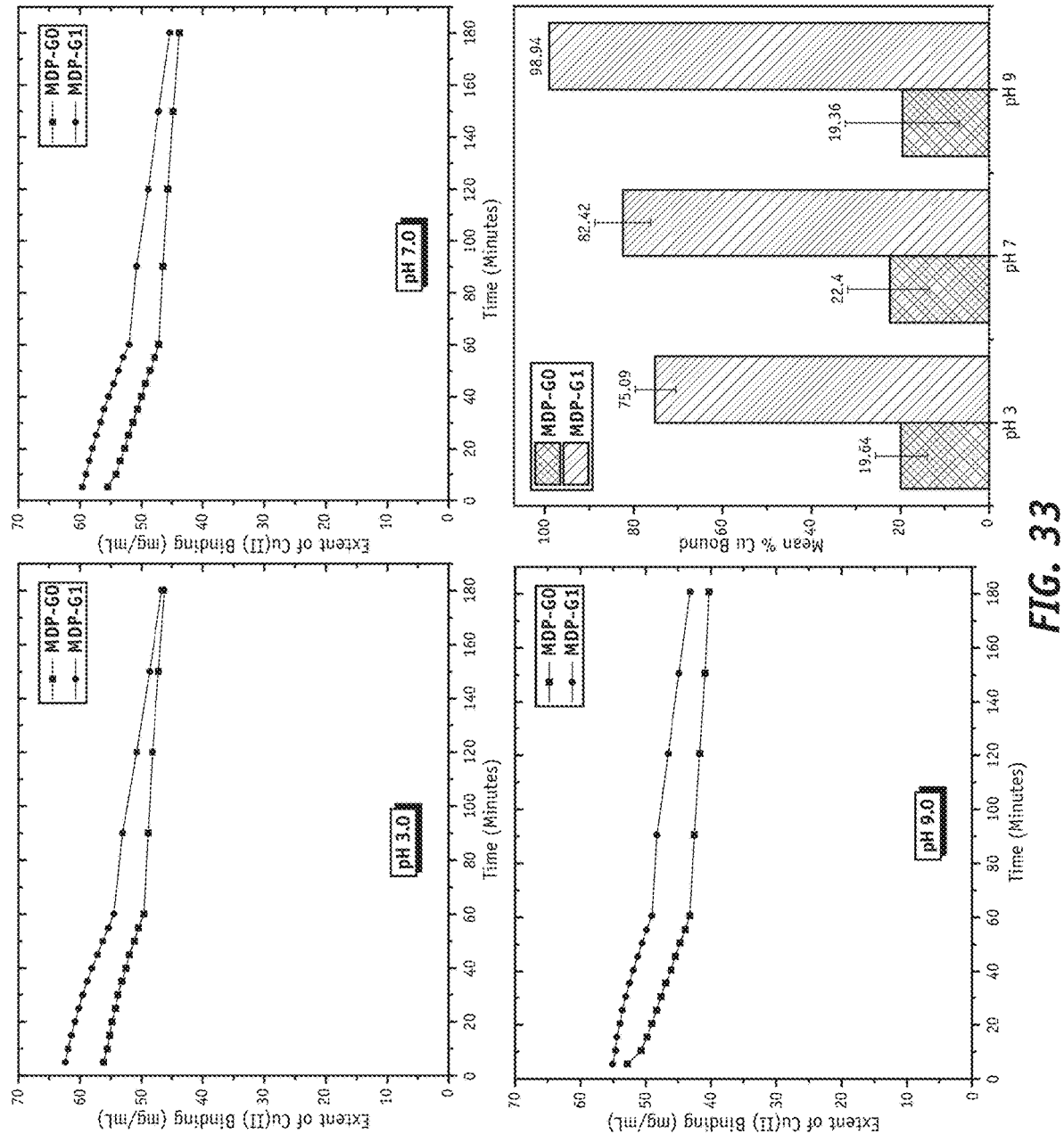
FIG. 33 shows extent of binding [mg of Cu(II) per mL of membrane] and mean % Cu(II) bound in DIW by the mixed matrix PVDF membranes with in situ synthesized PAMAM particles as a function of filtration time and solution pH. The composition of each membrane is listed in Table 8. A 2 L solution of Cu(II) [10 mg/L] at constant pH (3, 7 and 9) was pumped through each membrane at 2 bar.

FIGS. 31-33 and Tables 11-12 summarize the results of the Cu(II) filtration and binding experiments at 2 bar and pH 3.0, 7.0 and 9.0. It is worth mentioning that the absence of $Cu(OH)_2$ precipitates in the feed solution is consistent with the differences between the measured fluxes of the Cu(II) solutions for the MDP-G0 and MDD-G1 membranes. If there were Cu(II) precipitation in the feed solutions, the measured permeate fluxes at 2 bar would drop significantly (close to zero) due to the formation and buildup of micron-size $Cu(OH)_2$ scales at the surface of the membranes. However, FIG. 32 indicates that the permeate flux of aqueous solutions of Cu(II) through the MDP-G1 membrane initially decreases and then stabilize around a value of 60, 60 and 42 LMH at pH 3.0, 7.0 and 9.0 respectively. A similar trend (with a less pronounced initial flux decline at pH 9) is also observed for the MDP-G0 membrane. In this case, the steady state permeate fluxes of the Cu(II) solutions are, respectively, equal to 395, 275 and 213 LMH at pH 9.0, 7.0 and 3.0 (FIG. 32 and Table 11). These results are consistent with a flux decline mechanism caused by pore blockage due to Cu(II) binding to the embedded PAMAM particles of the MDP-G0 and MDP-G1 membranes.

FIG. 33 and Table 12 show that Cu(II) sorption onto the MDP-G0 membrane reaches saturation during the course of the filtration run (3 hours) at pH 3.0, 7.0 and 9.0. In all cases, the MDP-G0 membrane binds less than 25% of the amount of Cu(II) in the feed solution with a binding capacity of ~46-52 mg of Cu(II) per mL of dry membrane (Table S5). In contrast, the MDP-G1 membrane can bind ~51±3.6 mg of Cu(II) per mL of dry membrane at pH 9 without reaching saturation (i.e. with a mean percentage of bound copper of ~99%) (Table S5). At pH 3.0 and 7.0, the MDP-G1 membrane can bind 54-57 mg of Cu(II) per mL of dry membrane with mean percentages of bound copper of 75 and 82%, respectively.

FIG. 33 and Table 12 indicate that the mean percentage of bound copper for the MDP-G1 membrane (~99%) at pH 9.0 is larger than that of the MDP-G0 membrane (~20%) even though both sorbents have equal concentrations of N and O donors (~9.0 meq/g) (Table 8). It is speculated that the in situ synthesized PAMAM particles of the MDP-G1 membrane behave as high generation dendrimer-like particles (DLPs) that can bind Cu(II) through several mechanisms including (i) coordination with their N and O donors and (ii) non specific binding to water molecules and/or counterions trapped inside the DPLs [39], [40], [41], [24], [48-50].

TABLE 11

Permeate fluxes of aqueous solutions Cu(II) [10 mg/L] trough the mixed matrix MDP-G0 and MDP-G1 membranes as a function of filtration time at 2 bar pressure

| Time | Flux (LMH) | | | | | |
|---|---|---|---|---|---|---|
| | MDP-G0 | | | MDP-G1 | | |
| (Minutes) | pH 3.0 | pH 7.0 | pH 9.0 | pH 3.0 | pH 7.0 | pH 9.0 |
| 0 | — | — | — | — | — | — |
| 5 | 342.31 | 345.6 | 529.12 | 96.15 | 78.57 | 36.81 |
| 10 | 336.81 | 348.35 | 499.45 | 90.11 | 70.33 | 36.81 |
| 15 | 329.67 | 324.18 | 485.16 | 86.26 | 67.58 | 37.91 |
| 20 | 321.43 | 324.73 | 471.43 | 84.62 | 64.84 | 38.46 |
| 25 | 312.64 | 307.69 | 466.48 | 82.42 | 65.38 | 37.36 |
| 30 | 304.95 | 319.23 | 445.6 | 80.77 | 63.19 | 40.66 |
| 35 | 298.9 | 336.26 | 440.66 | 79.12 | 61.54 | 36.26 |
| 40 | 295.05 | 320.88 | 428.57 | 76.92 | 59.89 | 36.26 |
| 45 | 287.91 | 339.01 | 425.82 | 76.92 | 61.54 | 35.16 |
| 50 | 281.32 | 327.47 | 418.13 | 77.47 | 61.54 | 38.46 |
| 55 | 278.57 | 307.69 | 415.38 | 76.37 | 59.89 | 35.71 |
| 60 | 274.73 | 293.41 | 415.38 | 75.27 | 59.34 | 36.26 |
| 90 | 250.55 | 258.24 | 386.26 | 72.25 | 58.97 | 38.55 |
| 120 | 233.52 | 270.88 | 392.86 | 68.13 | 57.42 | 41.48 |
| 150 | 221.98 | 278.02 | 373.63 | 63.19 | 58.15 | 42.95 |
| 180 | 213.19 | 275.82 | 395.05 | 58.97 | 58.42 | 42.58 |
| Average | 286.47 | 311.09 | 436.81 | 77.81 | 62.91 | 38.23 |
| SD | 39.87 | 28.12 | 43.69 | 9.45 | 5.52 | 2.45 |

TABLE 12

Extent of binding [mg of Cu(II) per mL of membrane] and mean % Cu bound in aqueous solutions by the mixed matrix MDP-G0 and MDP-G1 membranes as a function of filtration time and solution pH

| | pH 3.0 | | | | pH 7.0 | | | | pH 9.0 | | | |
|---|---|---|---|---|---|---|---|---|---|---|---|---|
| | MDP-G0 | | MDP-G1 | | MDP-G0 | | MDP-G1 | | MDP-G0 | | MDP-G1 | |
| Time (Mins) | Cu(II) binding (mg/mL) | Cu bound (%) | Cu(II) binding (mg/mL) | Cu bound (%) | Cu(II) binding (mg/mL) | Cu bound (%) | Cu(II) binding (mg/mL) | Cu bound (%) | Cu(II) binding (mg/mL) | Cu bound (%) | Cu(II) binding (mg/mL) | Cu bound (%) |
| 0 | 0 | 0 | 0 | 0 | 0 | 0 | 0 | 0 | 0 | 0 | 0 | 0 |
| 5 | 56.19 | 24.4 | 62.41 | 69.77 | 55.44 | 52.86 | 59.51 | 95.18 | 52.81 | 58.31 | 55.03 | 99 |
| 10 | 55.53 | 15.27 | 61.89 | 64.38 | 54.05 | 31.17 | 58.98 | 91.09 | 50.71 | 31.44 | 54.74 | 98.87 |
| 15 | 55.13 | 14.53 | 61.41 | 68.81 | 53.41 | 28.24 | 58.46 | 88.61 | 49.81 | 26.93 | 54.39 | 98.91 |
| 20 | 54.76 | 16.98 | 60.85 | 71.22 | 52.7 | 24.36 | 57.9 | 86.88 | 49.03 | 23.71 | 53.99 | 98.92 |
| 25 | 54.21 | 13.45 | 60.23 | 72.78 | 52.11 | 22.39 | 57.31 | 85.05 | 48.3 | 22.44 | 53.54 | 98.96 |
| 30 | 53.77 | 17.07 | 59.55 | 74.32 | 51.45 | 22.89 | 56.68 | 84.86 | 47.62 | 20.89 | 53.04 | 99.01 |
| 35 | 53.16 | 15.49 | 58.82 | 75.39 | 50.67 | 20.66 | 56.01 | 83.93 | 46.9 | 19.56 | 52.47 | 99.07 |
| 40 | 52.56 | 16.92 | 58.05 | 76.76 | 49.99 | 18.43 | 55.3 | 82.72 | 46.2 | 18.11 | 51.88 | 99.04 |

TABLE 12-continued

Extent of binding [mg of Cu(II) per mL of membrane] and mean % Cu bound in aqueous solutions by the mixed matrix MDP-G0 and MDP-G1 membranes as a function of filtration time and solution pH

| | pH 3.0 | | | | pH 7.0 | | | | pH 9.0 | | | |
|---|---|---|---|---|---|---|---|---|---|---|---|---|
| | MDP-G0 | | MDP-G1 | | MDP-G0 | | MDP-G1 | | MDP-G0 | | MDP-G1 | |
| Time (Mins) | Cu(II) binding (mg/mL) | Cu bound (%) | Cu(II) binding (mg/mL) | Cu bound (%) | Cu(II) binding (mg/mL) | Cu bound (%) | Cu(II) binding (mg/mL) | Cu bound (%) | Cu(II) binding (mg/mL) | Cu bound (%) | Cu(II) binding (mg/mL) | Cu bound (%) |
| 45 | 51.91 | 18.36 | 57.22 | 77.06 | 49.21 | 18.01 | 54.56 | 82.06 | 45.45 | 16.6 | 51.25 | 99.01 |
| 50 | 51.13 | 14.38 | 56.35 | 77.71 | 48.5 | 17.61 | 53.76 | 80.84 | 44.73 | 16.17 | 50.58 | 98.97 |
| 55 | 50.5 | 21.14 | 55.43 | 77.95 | 47.78 | 15.81 | 52.93 | 79.67 | 43.98 | 14.16 | 49.85 | 98.95 |
| 60 | 49.59 | 15.45 | 54.47 | 78.27 | 47.05 | 14.3 | 52.07 | 79.72 | 43.23 | 13.35 | 49.09 | 98.94 |
| 90 | 48.94 | 22.24 | 53.1 | 78.46 | 46.46 | 18.4 | 50.84 | 76.8 | 42.57 | 12.7 | 48.29 | 98.94 |
| 120 | 48.14 | 27.34 | 50.84 | 79.47 | 45.59 | 19.59 | 48.92 | 75.4 | 41.74 | 9.58 | 46.64 | 98.91 |
| 150 | 47.21 | 29.38 | 48.69 | 79.46 | 44.65 | 17 | 47.05 | 73.52 | 40.93 | 0.72 | 44.93 | 98.89 |
| 180 | 46.25 | 31.88 | 46.67 | 79.63 | 43.77 | 16.75 | 45.24 | 72.32 | 40.27 | 5.12 | 43.21 | 98.68 |
| Average | 51.81 | 19.64 | 56.62 | 75.09 | 49.55 | 22.40 | 54.10 | 82.42 | 45.89 | 19.36 | 50.81 | 98.94 |
| SD | 3.12 | 5.80 | 4.79 | 4.51 | 3.51 | 9.30 | 4.32 | 6.28 | 3.68 | 12.97 | 3.58 | 0.09 |

Example 8: Characterization of a Cu(II) Saturated PVDF-PAMAM Membrane Absorber by SEM, XPS and FT-Raman Spectroscopy To gain insight into the mechanisms of Cu(II) binding to the mixed matrix membrane absorbers, a sample of Cu(II) loaded MDP-G0 membrane was characterized by FESEM, FT Raman spectroscopy and XPS. The FESEM micrographs (FIG. 34) show that no solid copper precipitates were formed at the surface and inside the matrix of the Cu(II) laden MDP-G0 membrane. In contrast, Zhang et al. [46] reported the formation of $Cu_2(OH)_3Cl$ crystals (FIG. 37) following the incubation of a G3-$NH_2$ dendronized PAMAM HFM with an aqueous solution of Cu(II) [~12 mg/L] at room temperature for 72 h.

Figure 35:
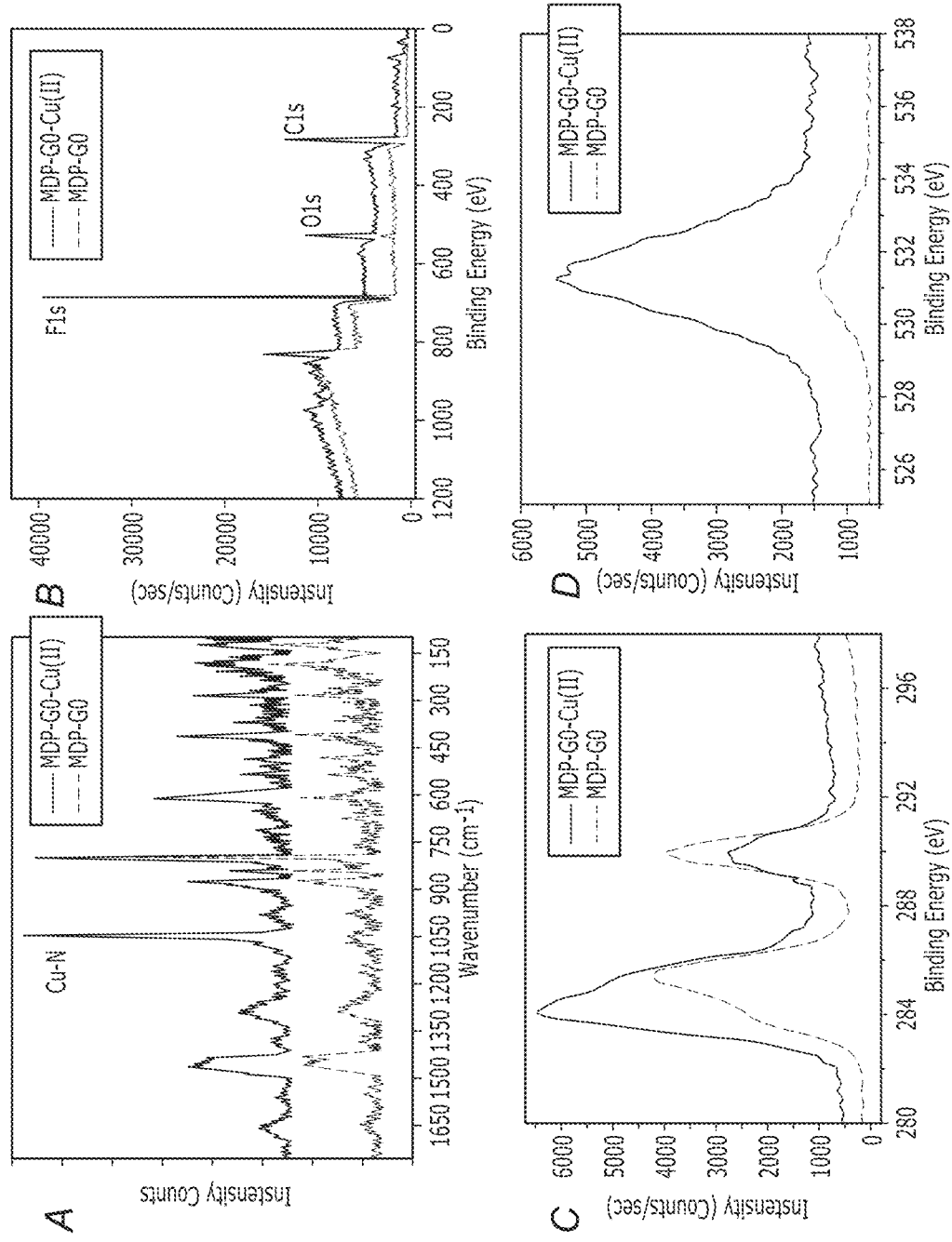
FIG. 35 shows characterization of a Cu(II) laden MDP-G0 membrane by FT-Raman spectroscopy and XPS. The membrane composition is listed in Table 8. A 2 L solution of Cu(II) [10 mg/L] at pH 9 was pumped through the membrane at 2 bar. Panel A shows the FT-Raman spectra; Panel B shows the overall XPS scans while Panels C and D highlight the C1s and O1s scans, respectively.
Figure 36:
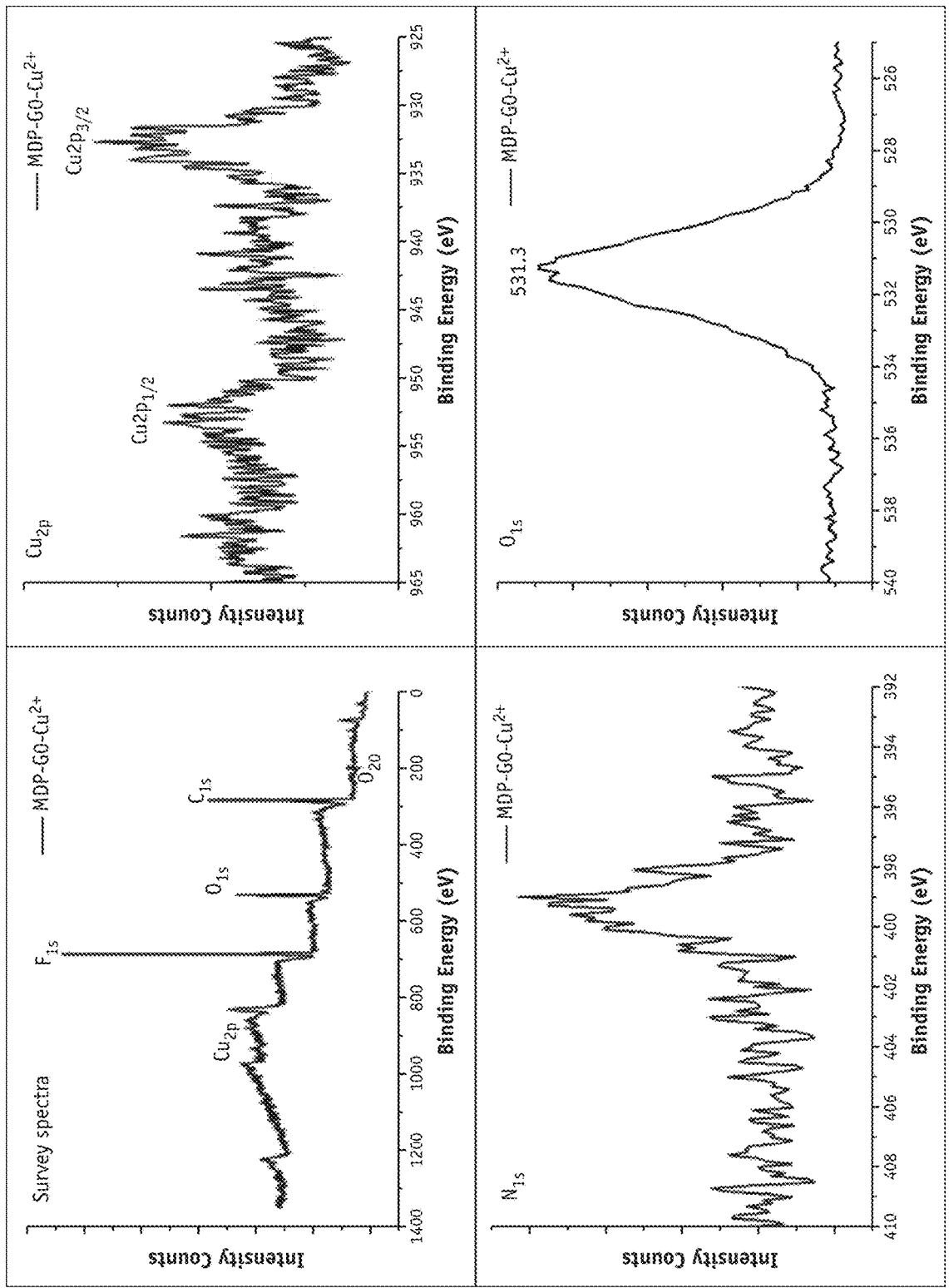
FIG. 36 shows XPS spectra of the Cu(II) loaded mixed matrix PVDF MDP-G0-$Cu^{2+}$ membrane with in situ synthesized PAMAM particles. The estimated composition of each membrane is listed in Table 7.

The FT Raman spectra (FIG. 35A) exhibit the typical PVDF bands including (i) $CH_2$ bending (1421 $cm^{-1}$) and (ii) CF stretching (796 $cm^{-1}$) [51]. The intense Raman peak (1050 $cm^{-1}$) of FIG. 35A is attributed to C—N stretching resulting from the coordination of Cu(II) with the amino groups of the embedded PAMAM particles of the MDP-G0 membrane. The XPS spectra (FIGS. 35B-D) provide further supporting evidence for the coordination of Cu(II) with the N and O donors of the membrane embedded PAMAM particles. The shift of the C1 s peak toward higher binding energy (283.8 eV) (FIG. 35C) [51], the splitting and increase in the intensity of the $O1s_{1/2}$ peak [51] (FIG. 35D) and the appearance of a N1 s peak around 400 eV (FIG. 36) are all consistent with Cu(II) coordination with the membrane N and O donors.

Figure 38:
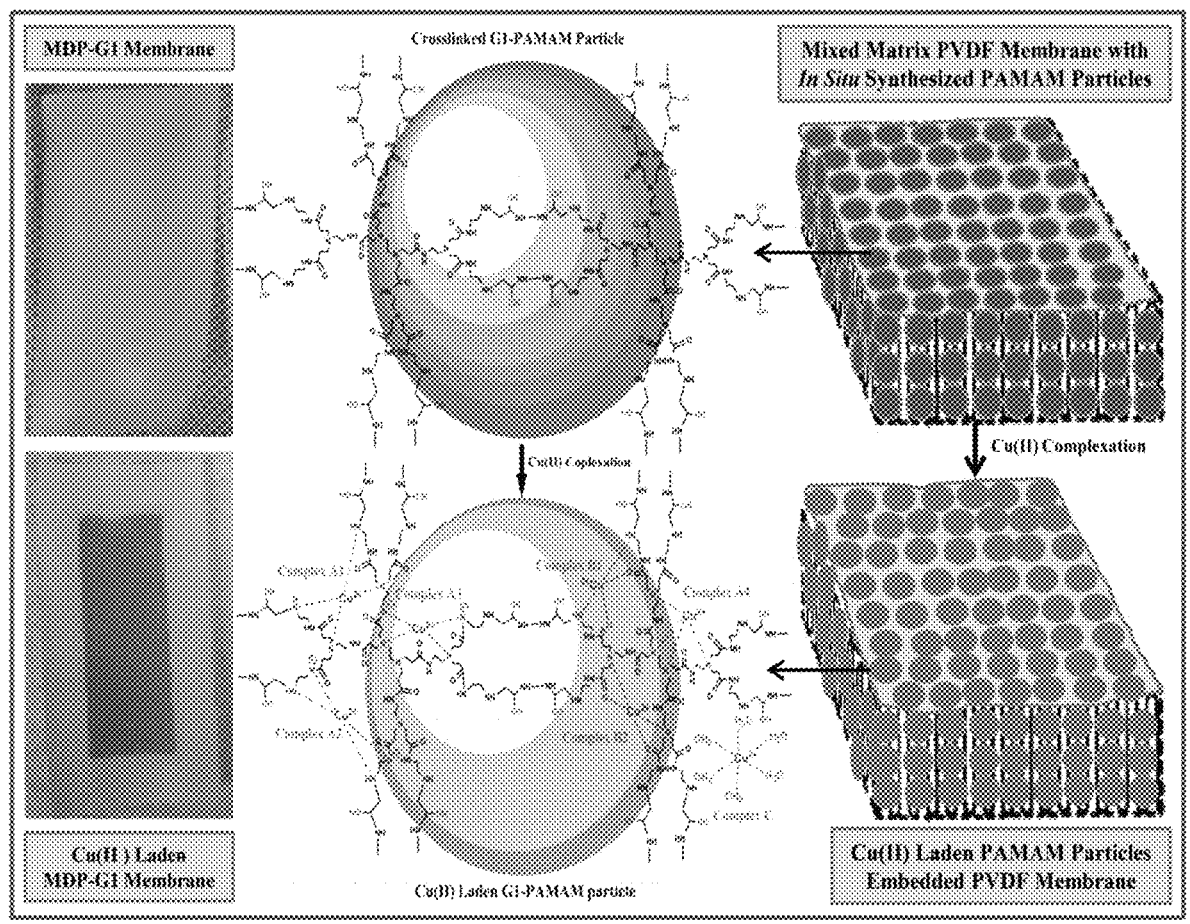
FIG. 38 shows a schematic illustration of the postulated mechanisms of Cu(II) complexation with the N and O donors of a mixed matrix PVDF membrane with in situ synthesized crosslinked PAMAM particles. Table 8 lists the estimated composition of each membrane. The postulated mechanisms of Cu(II) complexation with the N and O ligands of the membrane PAMAM particles were derived based on the results of FT-Raman and XPS characterization a Cu(II) saturated PVDF-PAMAM membrane absorber (FIG. 35) and published literature on the mechanisms of Cu(II) binding to PAMAM dendrimers in aqueous solutions[27-30,38-40]. Further independent experiments and/or atomistic simulations need to be performed to validate these hypothetical mechanisms.
Figure 39:
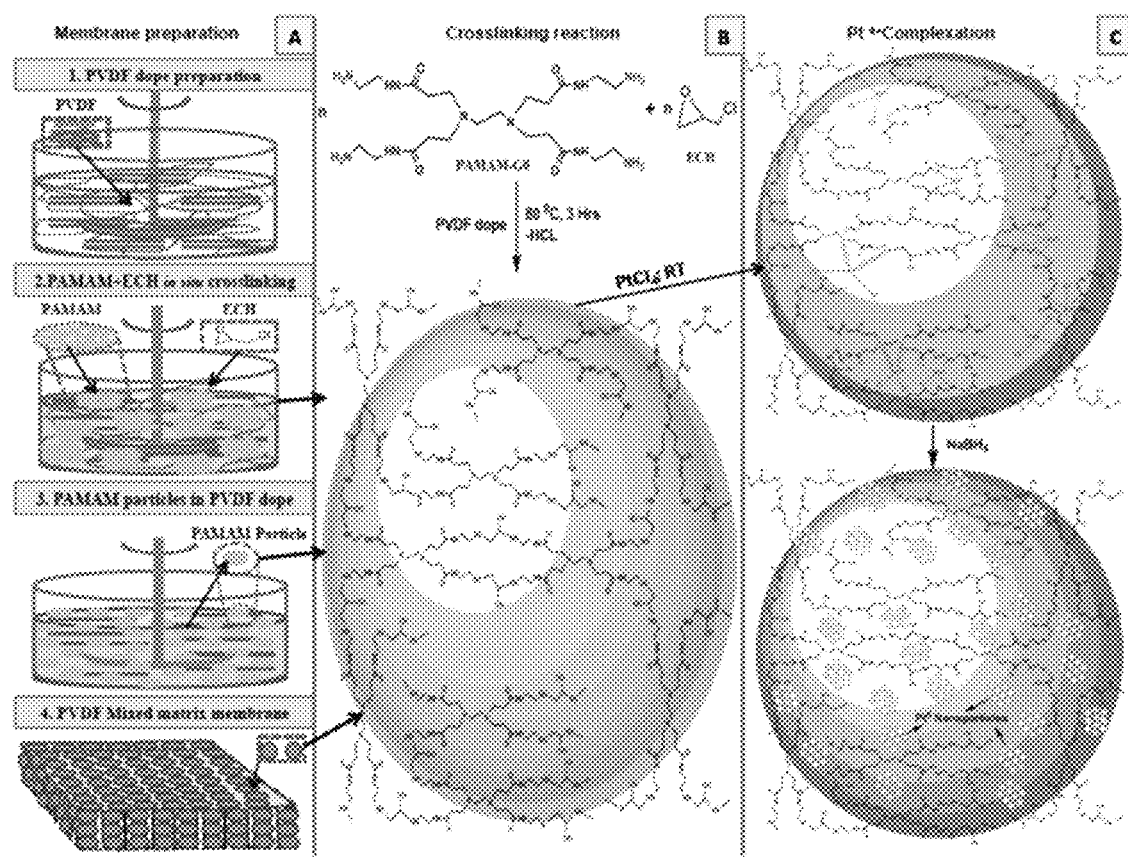
FIG. 39 shows a schematic illustration of PVD membranes with in-situ synthesized PAMAM dendrimer particles as containers for Pt(0) nanoparticles using low-generation dendrimers (e.g. G0-NH2) as particle precursors.

FIG. 38 provides a schematic illustration of the postulated copper coordination sites within the embedded PAMAM particles of our new mixed matrix PVDF membrane absorbers. Based on the results of the previous work and published literature on the mechanisms of Cu(II) binding to PAMAM dendrimers in aqueous solutions [24, 39-41], [48-50], it is hypothesized that three classes of complexes (FIG. 38) could be formed depending on metal ion loading and solution pH including (i) complexes of Cu(II) with four nitrogen donors (Complexes A1, A2, A3 and A4), (ii) complexes of Cu(II) with two nitrogen donors and two oxygen donors (Complexes B1 and B2) and (iii) complex of Cu(II) with six water molecules. More in-depth investigations will be required to validate the postulated mechanisms of Cu(II) binding to the embedded PAMAM particles of the mixed matrix PVDF membrane absorbers (FIG. 38).

Example 9: Mixed Matrix Membranes with In Situ Synthesized Dendrimer Particles as Supercontainers for Pt(0)

Crooks and co-workers [2, 52] have reported the successful use of PAMAM and poly(propyleneimine) (PPI) dendrimers to prepare a variety of DEN (~3 nm in size) including Pd(0) DENs, Pt(0) DEN and bimetallic Pd(0)/Pt (0) DEN. It was found that these DENs can serve as homogeneous and heterogeneous catalysts for (i) hydrogenation and Suzuki carbon-carbon coupling reactions. [2] [52] By immobilizing DENs onto electrode surfaces, Crooks and co-workers were able to prepare Pt(0) and Pt(0)Pd(0) electrocatalysts for oxygen reduction reactions (ORR). Although higher generation PAMAM dendrimers (e.g. G4-G6 $NH_2$) are potential templates for the preparation of redox and catalytic DENs [Cu(0), Pt(0) and Pd(0)], they are expensive due to the multiple steps required for their synthesis and purification.

The same methods described in Examples 1-6 were used herein for the preparation of the mixed matrix PVDF UF membranes with in situ synthesized PAMAM dendrimer particles as supercontainers for Pt(0) nanoparticles.

Figure 40:
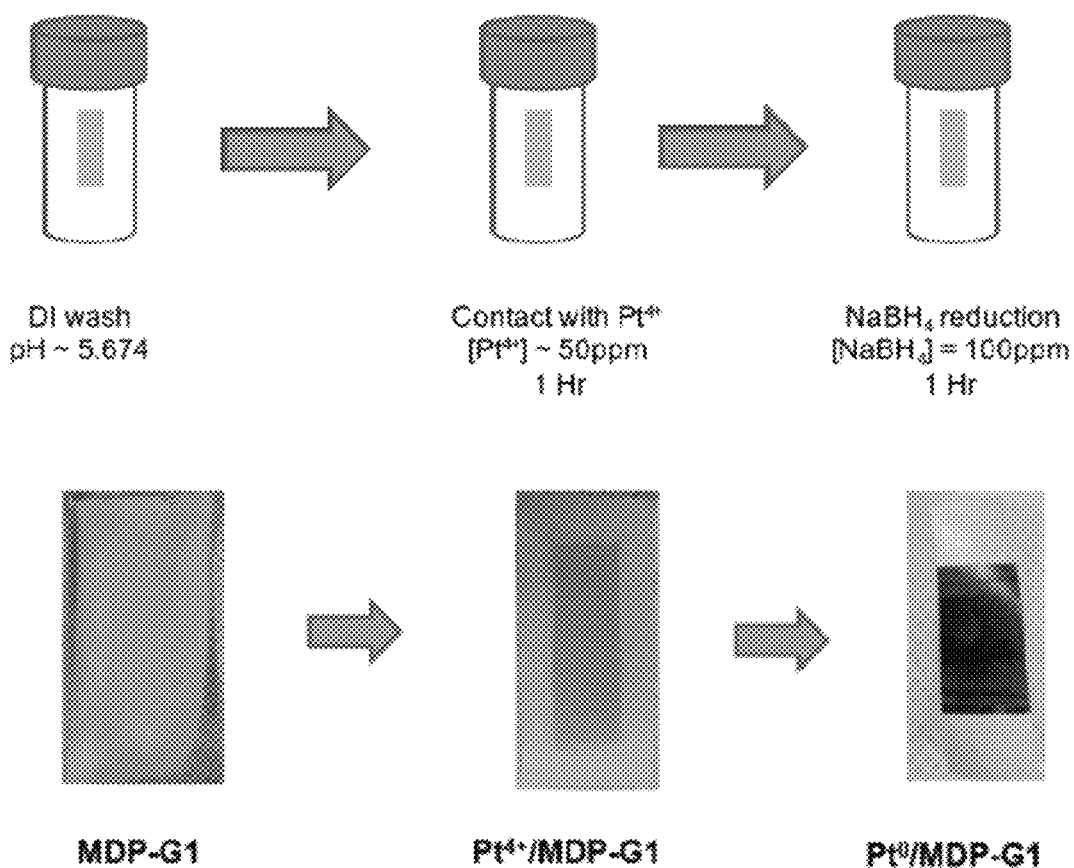
FIG. 40 shows an exemplary embodiment of the preparation of a PVDF UF membrane (MDP-G1) with in-situ synthesized G1-NH$_2$ PAMAM dendrimer particles for Pt(0) nanoparticles by reduction of bound $Pt^{4+}$ ions using sodium borohydride [NaBH$_4$].
Figure 41:
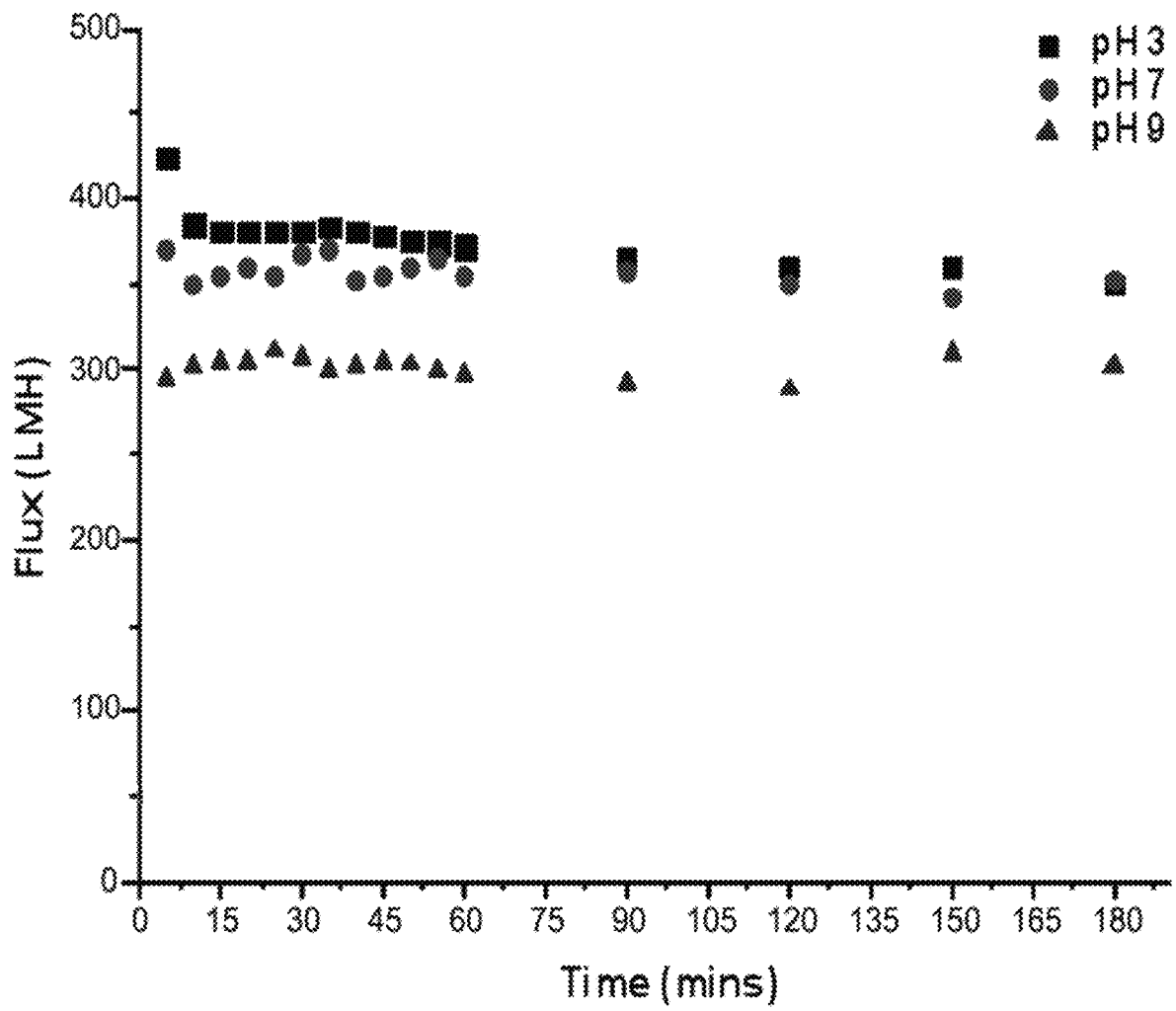
FIG. 41 shows $Pt^{4+}$ loading onto a MDP-G1 membrane from Flux measurements in one embodiment.
Figure 42:
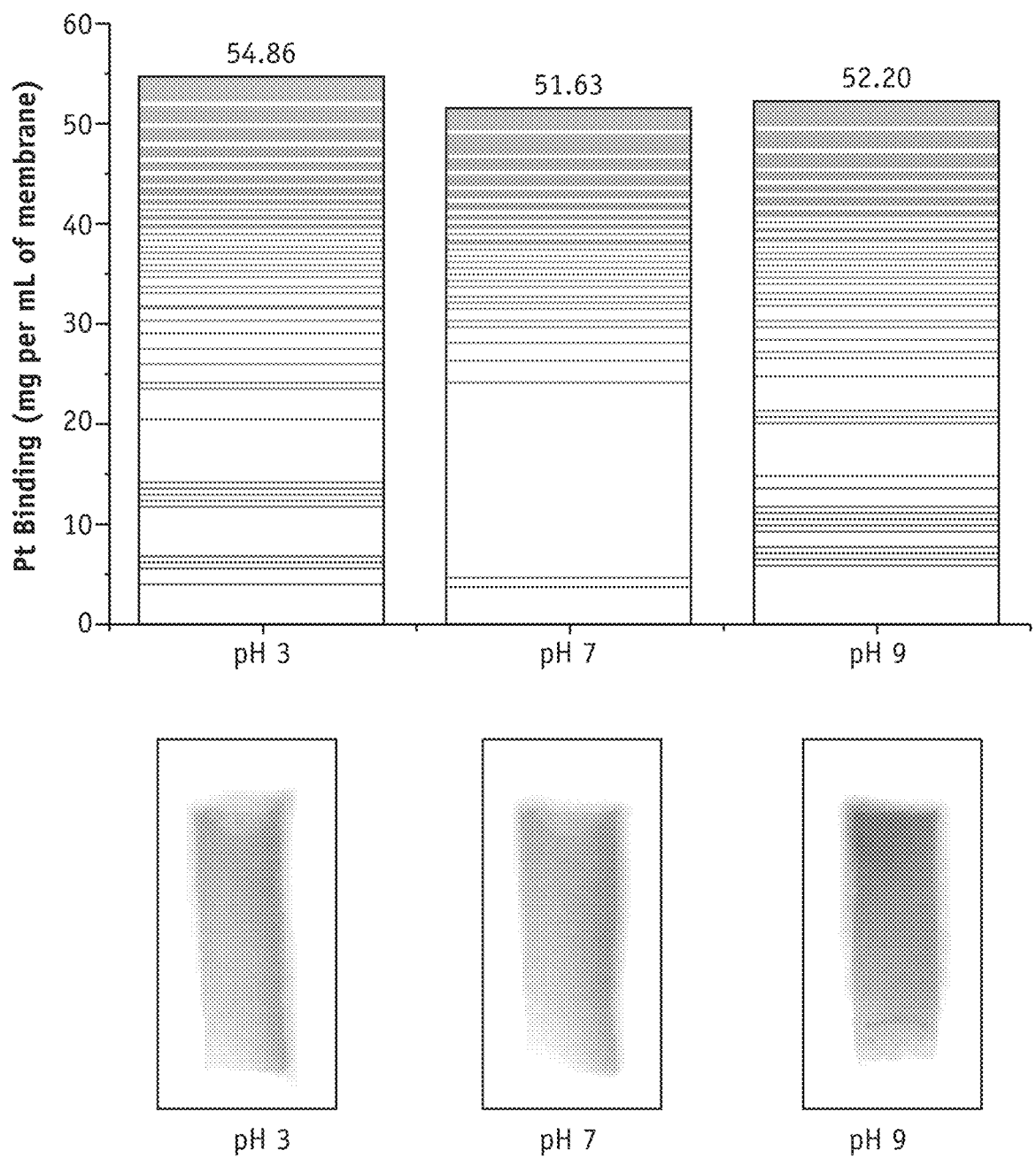
FIG. 42 shows $Pt^{4+}$ loading onto a MDP-G1 membrane from metal binding measurements in one embodiment.

A reactive encapsulation process (see FIG. 40) is utilized to prepare the new families of PVDF UF membranes with in situ synthesized PAMAM dendrimer particles for Pt(0). PVDF UF membrane with in-situ generated PAMAM particles (MDP-G1) was synthesized using a G1-$NH_2$ PAMAM dendrimer as particle precursor. A cross flow system with an active filtration area of 24 $cm^2$ was used to load the membranes (MDP-G1) with $Pt^{4+}$ ions (FIG. 41). The membrane was first compacted by running DI water for 1 hour at a pressure of 3 bar followed by water flux measurement for a period of 30 minutes. Pressure was reduced to 2 bar and the DI water flux was measured every 5 minutes for an hour. Thereafter, the DI water was drained and pH adjusted solution (pH 3, 7 and 9) introduced into the feed tank. Flux measurements were made every 5 minutes for 30 minutes. After the membrane conditioning, the $Pt^{4+}$ solution (10 ppm, 2 L) was introduced into the feed tank. The $Pt^{4+}$ binding experiment was performed at 2 bar, with flux measurements every 5 minutes for a period of 1 hour and then every 30 minutes for 2 hrs. Permeate and feed aliqouts (1 mL) were sampled every 5 minutes for a period of 1 hour and every 30 minutes thereafter for the remainder of the run time. The initial and final volumes of the feed and permeate solutions were recorded. The concentration of $Pt^{4+}$ in the feed and permeate solutions were measured by inductively coupled plasma mass spectrometry (ICP-MS). FIGS. 41-42 summarize the results of the $Pt^{4+}$ loading experiments.

Figure 44:
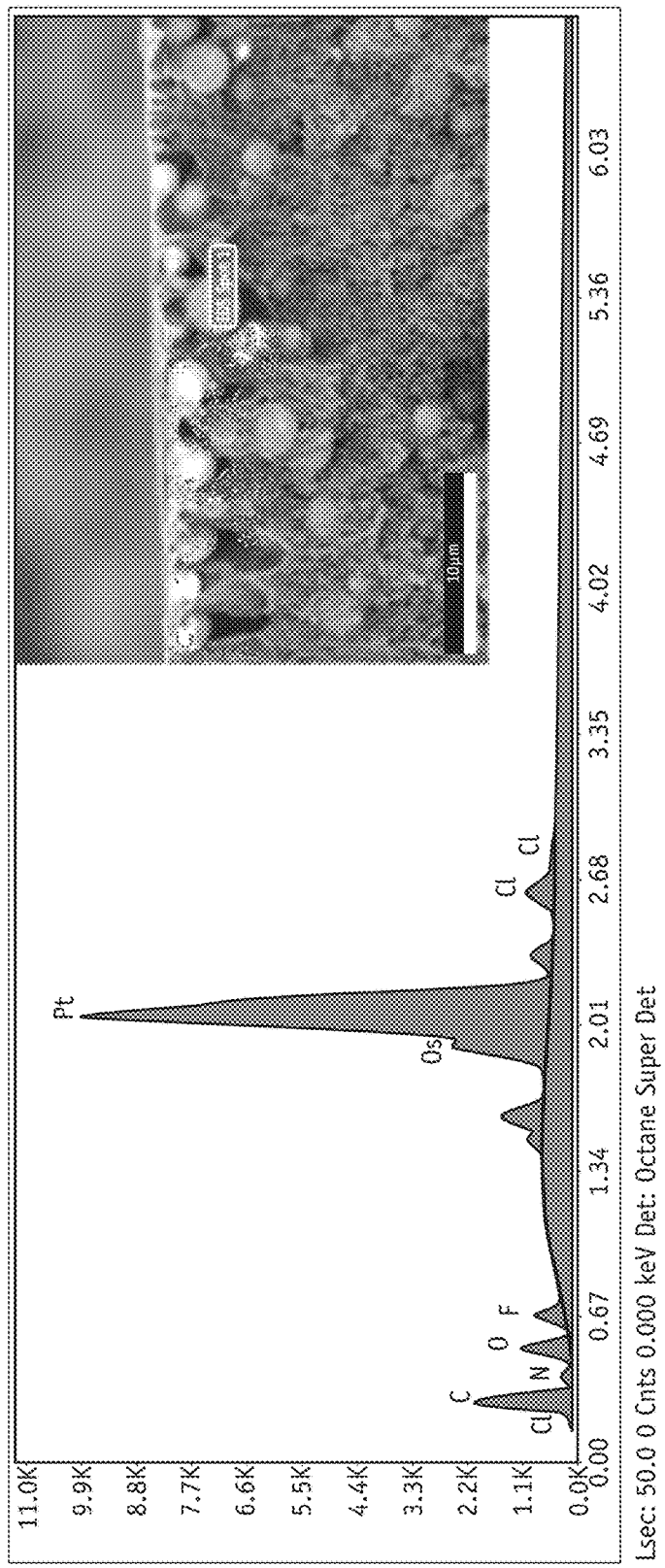
FIG. 44 shows SEM micrographs with spot EDX of a Pt(0) loaded MDP-G1 membrane in one embodiment.
Figure 45:
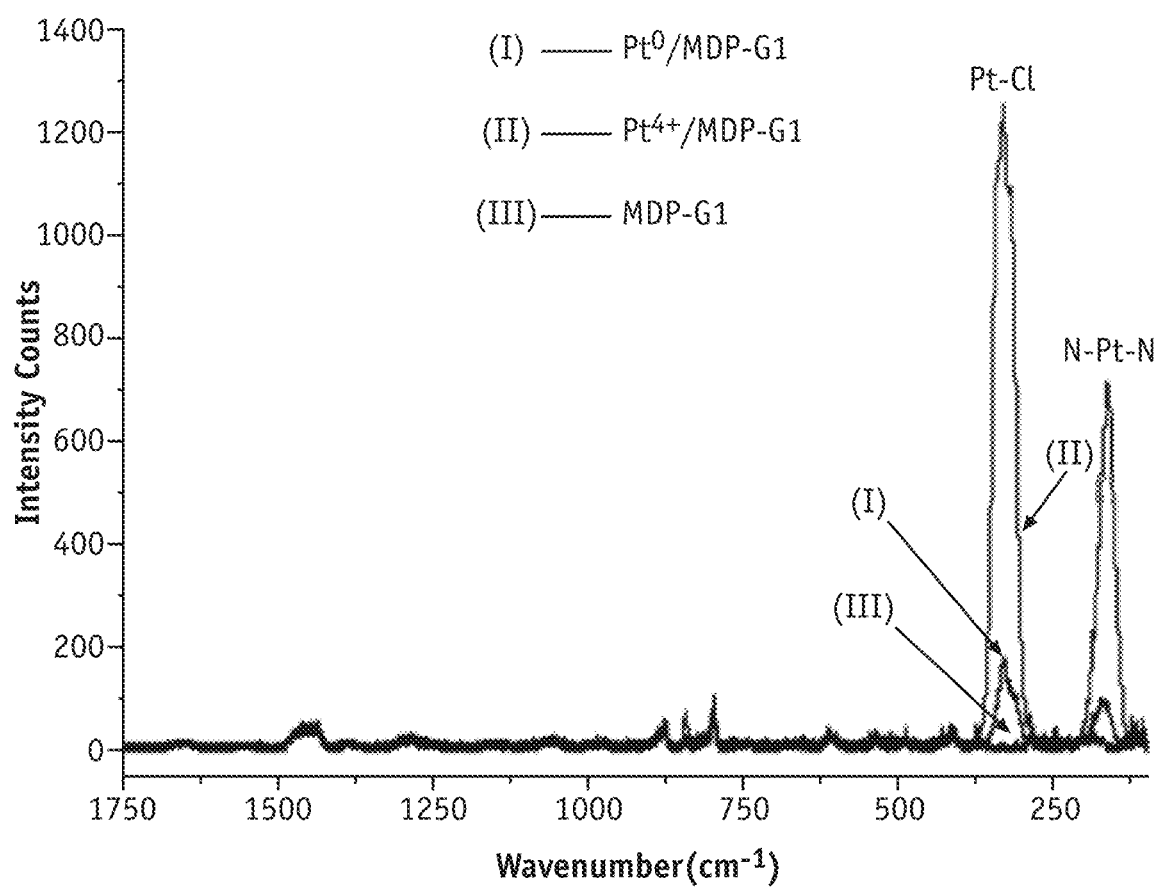
FIG. 45 shows Raman spectra of a MDP-G1 membrane loaded with $Pt^{4+}$ ions and Pt(0) nanoparticles in one embodiment.
Figure 46:
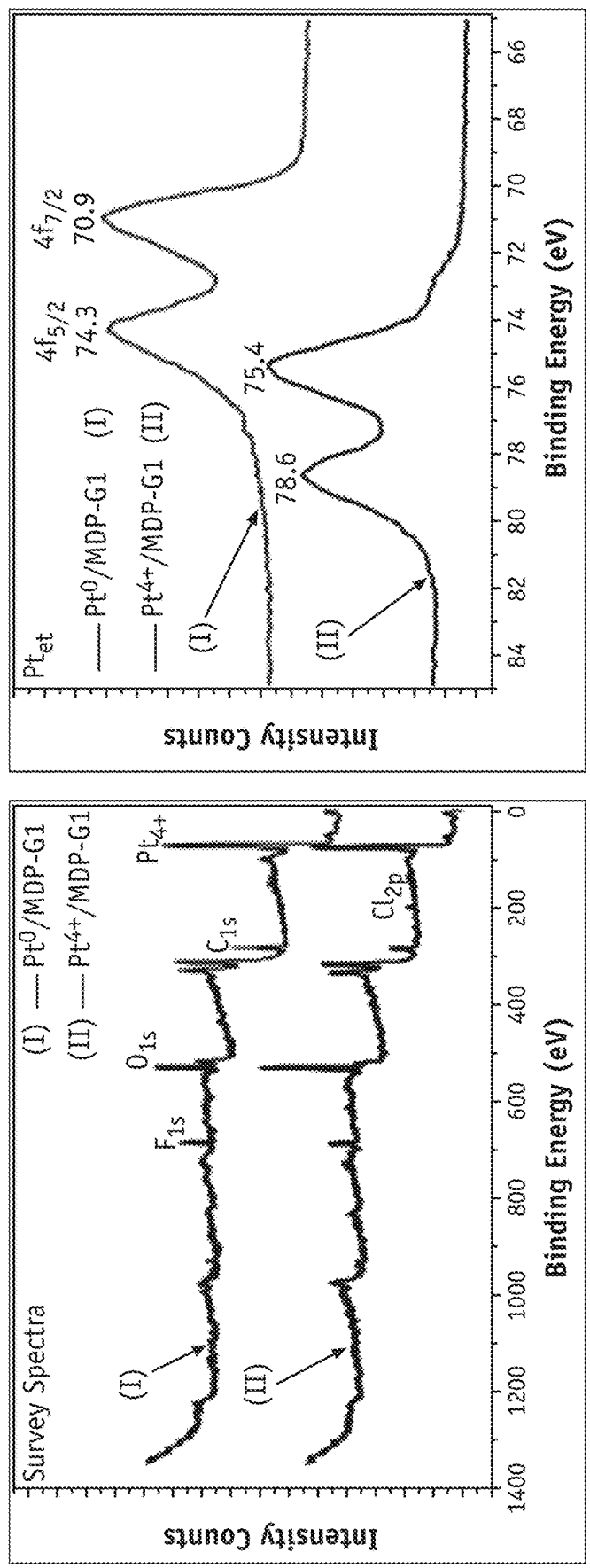
FIG. 46 shows XPS spectra of a MDP-G1 membrane loaded Pt(0) nanoparticles in one embodiment.
Figure 48:
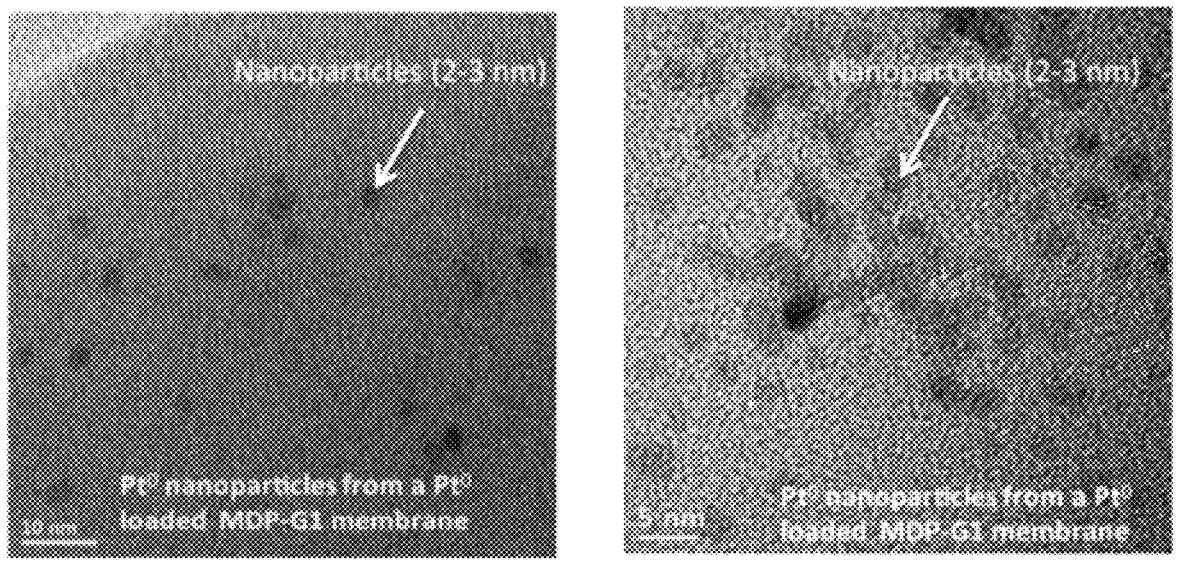
FIG. 48 shows TEM micrographs of Pt(0) nanoparticles from a Pt(0) loaded MDP-G1 membrane in one embodiment.

Following completion of the metal loading experiments, a small piece of the platinum loaded MDP-G1 membrane (pH 9) was immersed in a centrifuge tube containing 50 mL of an aqueous solution of $NaBH_4$ (100 ppm) and mixed on a rotary shaker for about an hour to allow the reduction of the PAMAM complexed $Pt^{4+}$ to Pt(0). The resulting dark colored membrane was then washed with DI water (FIG. 40). The Pt(0) loaded MDP-G1 membrane was characterized by scanning electron microscopy (SEM) (FIGS. 43-44), Raman spectroscopy (FIG. 45), x-ray photoelectron spectroscopy (XPS) (FIG. 46) and transmission electron microscopy (TEM) (FIGS. 47-48). The overall results of the characterization experiments show that the embedded PAMAM particles of the MDP-G1 membrane can serve as supramolecular containers for Pt(0) nanoparticles (2-3 nm).

Figure 49:
FIG. 49 shows regioselective hydrogenation of selected alkene and alkynes at room temperature using a Pt(0) loaded MDP-G1 membrane.
Figure 50:
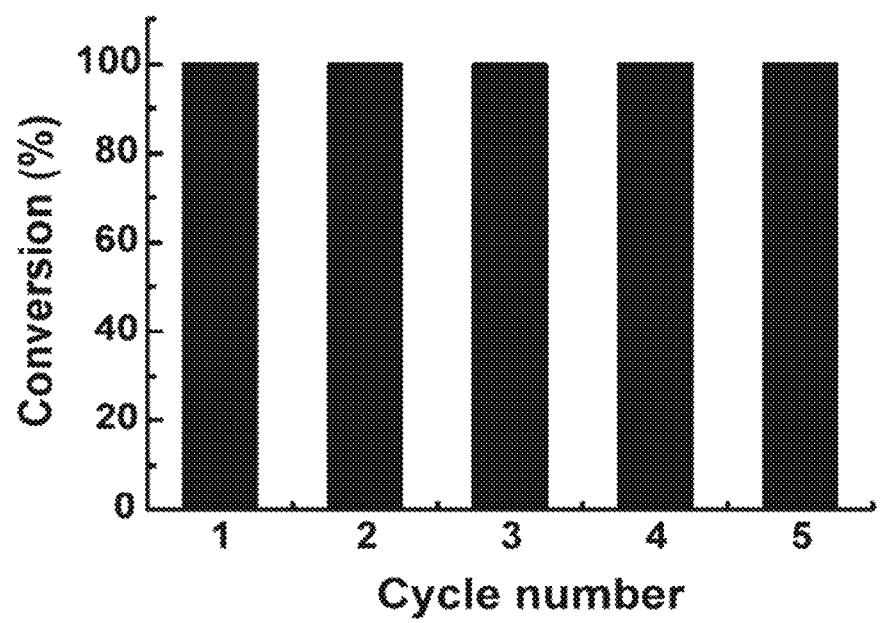
FIG. 50 shows recyclability of a Pt(0) loaded MDP-G1 membrane for the hydrogenation of cyclohexanone at room using H$_2$ (2 bar) in one embodiment.

To study the catalytic activity of Pt(0) loaded MDP-G1 membrane, experiments were carried out to measure the regioselective hydrogenation of alkenes and alkynes [53]. Regioselective hydrogenation is an important reaction of the synthesis of special chemicals and pharmaceuticals [53]. For the catalytic experiments, a Pt(0) loaded MDP-G1 membrane (FIG. 40) was cut into small pieces and loaded into a customer-built stainless reactor. The reactor was then loaded with a methanol solution containing the dissolved unsaturated compounds. Hydrogen gas (2 bar) was then continuously fed to the reactor at room. $^1H$ NMR and gas chromatography (GC) were utilized to measure the conversion and extent of reaction. To evaluate the recyclability of the Pt(0) loaded MDP-G1 membrane, hydrogen gas to regenerate the membrane by reducing the oxidized and bound $Pt^{4+}$ ions to Pt(0). FIGS. 49-50 summarize the results of the catalytic experiments. The overall results of these experiments show the the Pt(0) loaded MDP-G1 membrane can serve as a recyclable catalytic membrane for the regioselective hydrogenation of hydrogenation of alkenes and alkynes.

Example 10: Mixed Matrix Membranes with In Situ Synthesized Dendrimer Particles as Supercontainers for Cu(0)

Cu(0) is a leading metal for the preparation of catalysts for the electrochemical reduction of $CO_2$ to liquid fuels and valuable products [54, 55]. Although higher generation PAMAM dendrimers (e.g. G4-G6 $NH_2$) have shown excellent potential as templates for the preparation of Cu(0) DENs, they are expensive due to the multiple steps required for their synthesis and purification. Because of this, Cu(0) DENs have remained for the most par "laboratory" model systems with no prospects for utilization as catalysts and electrocatalysts for SuChEM related applications.

Figure 51:
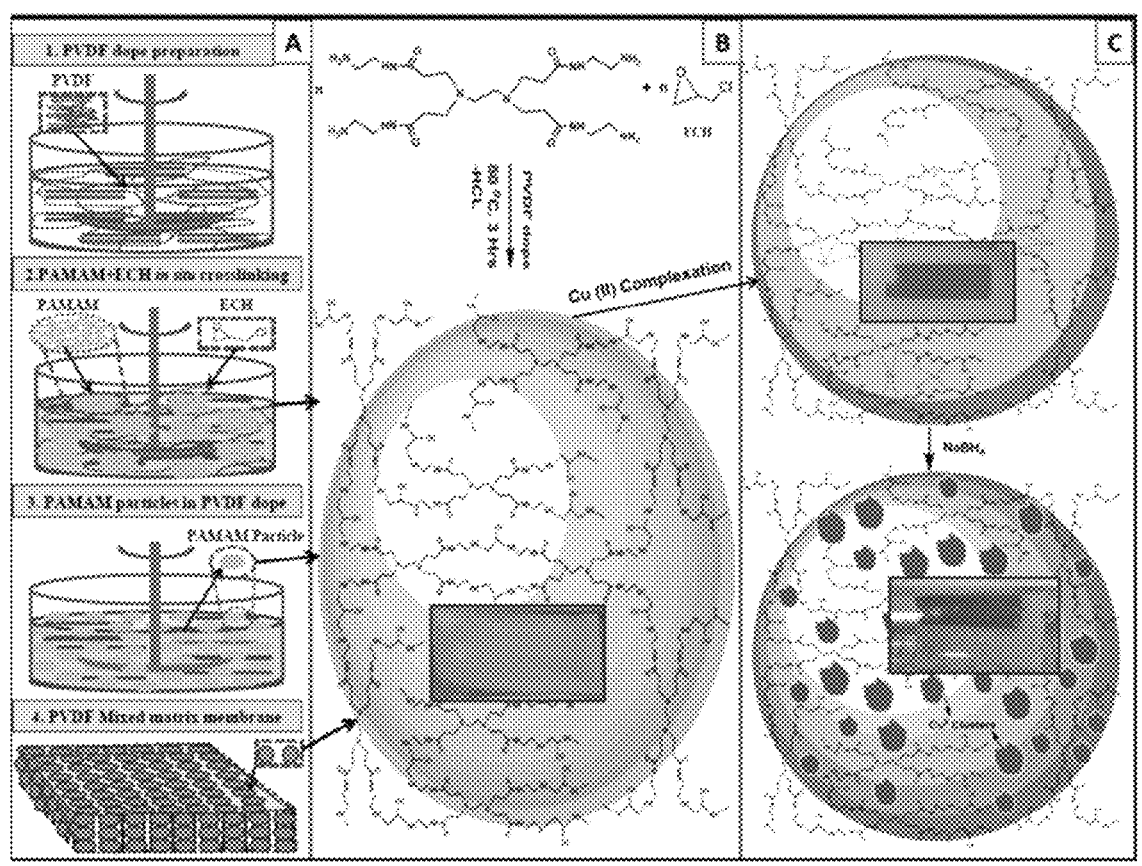
FIG. 51 shows an exemplary embodiment of PVDF UF membrane with in-situ synthesized PAMAM dendrimer particles as supercontainers for Cu(0) nanoparticles using low-generation dendrimers (e.g. G0-NH2) as particle precursors.
Figure 52:
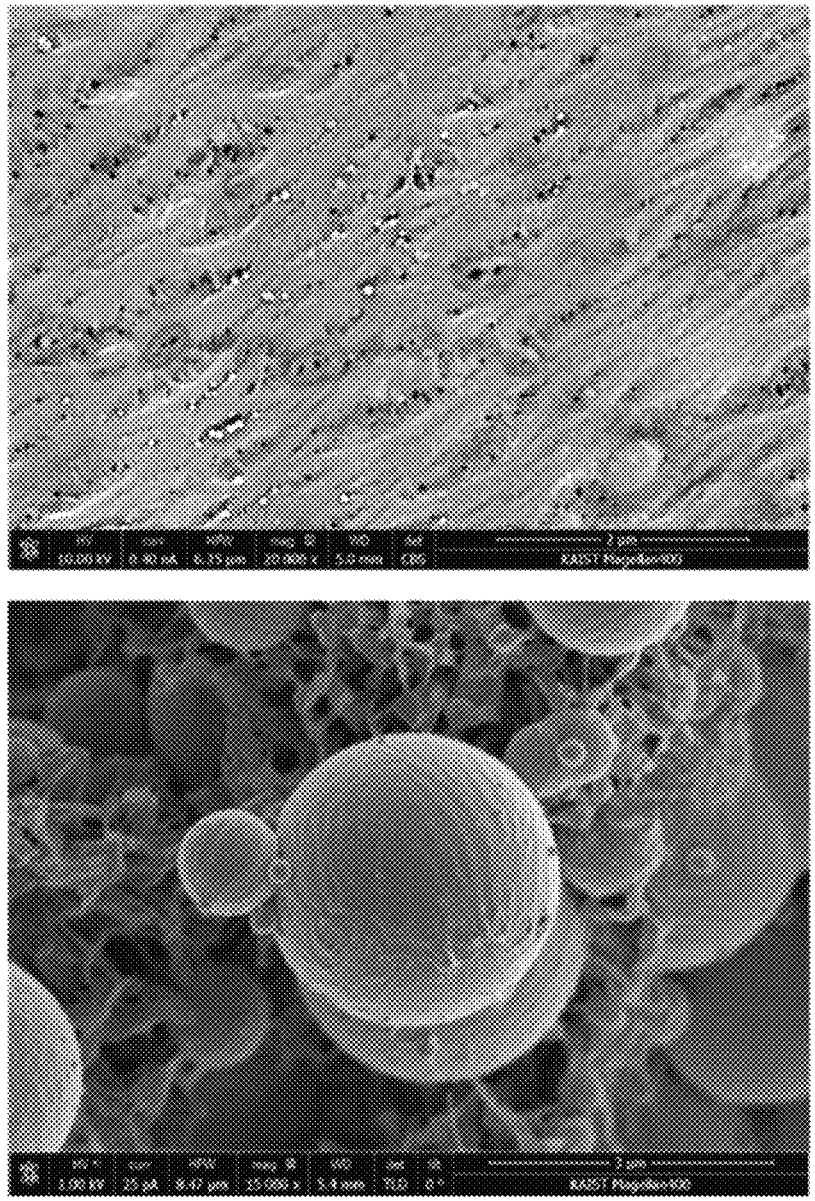
FIG. 52 shows SEM micrographs of a CU(0) loaded MDP-G0 membrane using a backscattered electron (BSE) detector in one embodiment.
Figure 54:
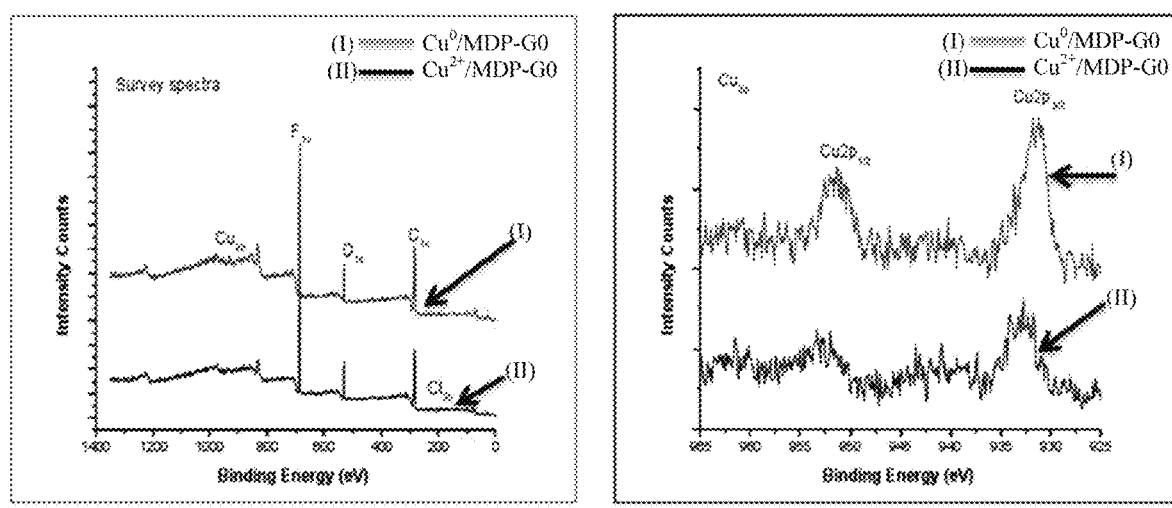
FIG. 54 shows XPS spectra of a MDP-G0 membrane loaded with Cu(0) nanoparticles in one embodiment.
Figure 55:
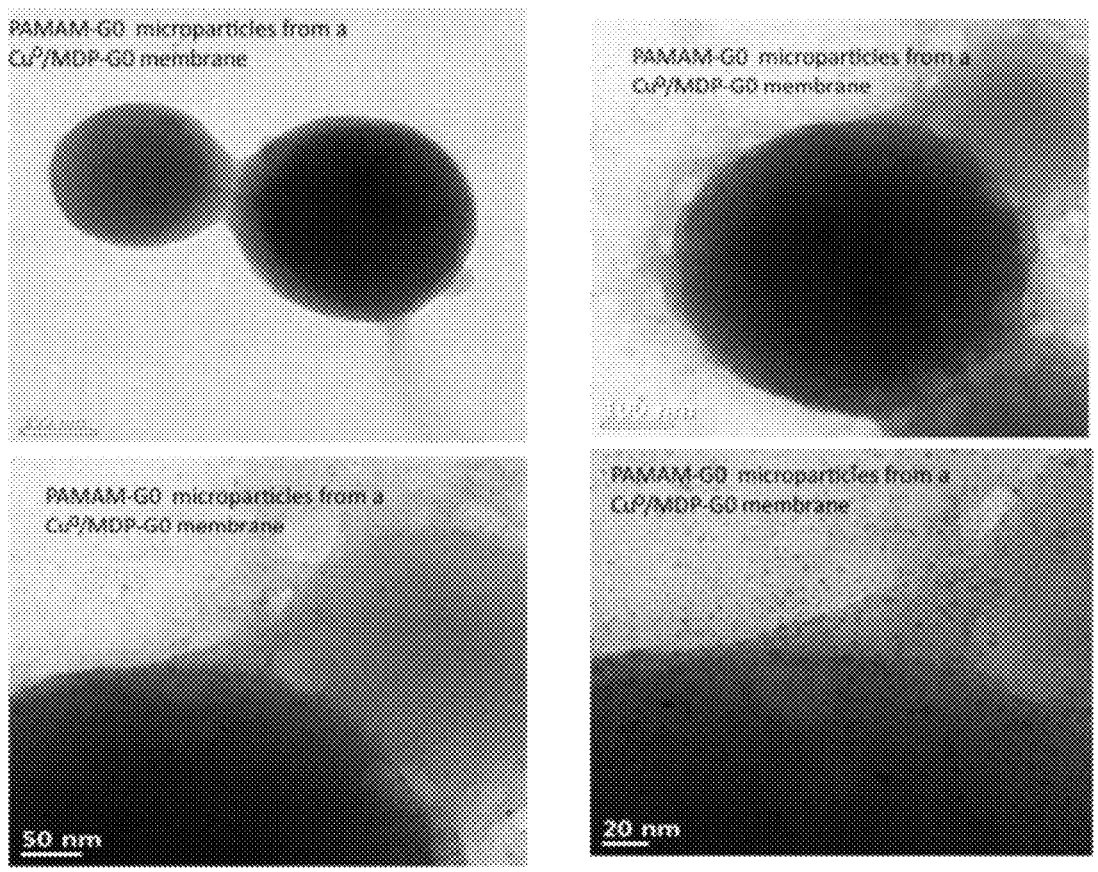
FIG. 55 shows TEM micrographs of PAMAM-G0 microparticles from a Cu(0) loaded MDP-G0 membrane in one embodiment. For the TEM experiments, a small piece of the copper loaded membrane (Cu$^0$/MDP-G1) was dissolved in 2 mL of triethyl phosphate (TEP) by sonication for about 30 mins.
Figure 56:
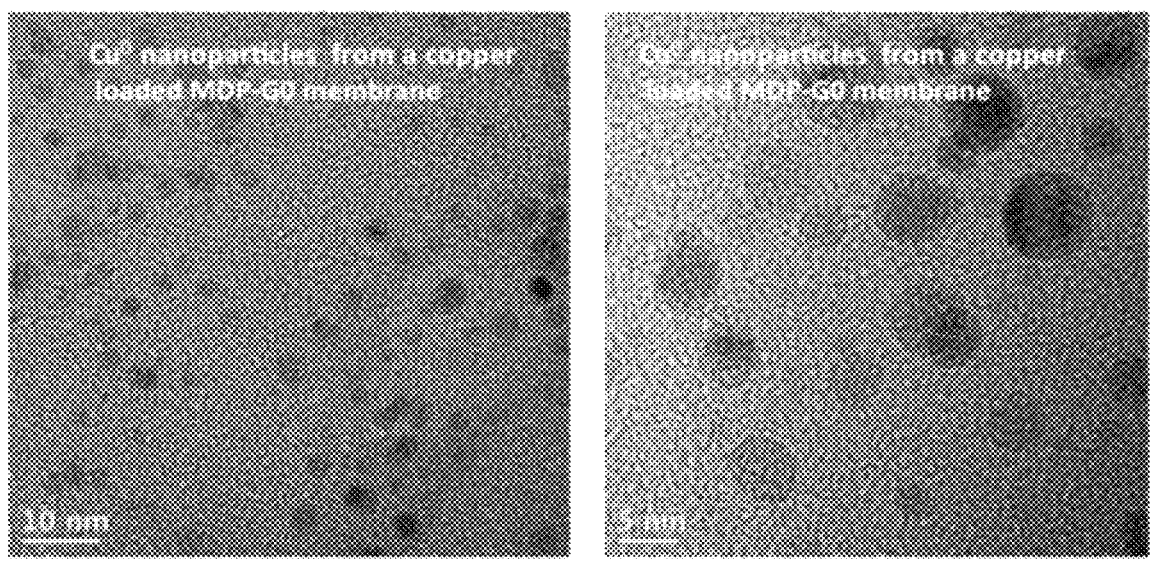
FIG. 56 shows TEM micrographs of Cu(0) nanoparticles from a Cu(0) loaded MDP-G0 membrane in one embodiment.

Reactive encapsulation process was used to prepare our new families of PVDF UF membranes with in-situ synthesized PAMAM supramolecular containers for Cu(0) (FIG. 51). Similar to the methods described in Examples 1-6 and Example 9, the PVDF UF membrane with in-situ generated PAMAM dendrimer particles (MDP-G0) using a G0-$NH_2$ PAMAM dendrimer as particle precursor was utilized. The Cu(0) loaded MDP-G1 membrane was characterized by scanning electron microscopy (SEM) (FIG. 52), Raman spectroscopy (FIG. 53), x-ray photoelectron spectroscopy (XPS) (FIG. 54) and transmission electron microscopy (TEM) (FIG. 55-56). The overall results of the characterization experiments show that the embedded PAMAM particles of the MDP-G1 membrane can serve as supramolecular containers for Cu(0) nanoparticles (2-3 nm).

The examples set forth above are provided to give those of ordinary skill in the art a complete disclosure and description of how to make and use the embodiments polymeric membranes with embedded dendrimer-like polymeric micro/nanoparticles and related methods and systems of the disclosure, and are not intended to limit the scope of what the Applicants regard as their disclosure. Modifications of the above-described modes for carrying out the disclosure can be used by persons of skill in the art, and are intended to be within the scope of the following claims.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations which is not specifically disclosed herein.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

In particular, it will be understood that various modifications may be made without departing from the spirit and scope of the present disclosure. Accordingly, other embodiments are within the scope of the following claims.

REFERENCES

1. Tomalia, D. A., *Dendrimers: Synthetic Science To Controlled Organic Nanostructures And A Window To A New Systematic Framework For Unifying Nanoscience*. Handbook Of Nanoscience, Engineering And Technology; 2012. 3rd Ed.: P. 413-467.
2. Myers, V. S., *Dendrimer-Encapsulated Nanoparticles: New Synthetic And Characterization Methods And Catalytic Applications*. Chem. Sci., 2011. 2: P. 1632-1646.
3. Martell, A. E. And R. D. Hancock, *Metal Complexes In Aqueous Solutions.* 1996: Plenum Press New York.
4. Burgess, J., *Ions In Solution: Basic Principles Of Chemical Interactions.* 1999.
5. Karamat, S., *Structural, Compositional And Magnetic Characterization Of Bulk V2o5 Doped Zno System*. Appl. Surf. Sci., 2010. 256: P. 6.
6. Duff, M. C., *Uranium Co-Precipitation With Iron Oxide Minerals*. Geochim. Cosmochim. Acta, 2002. 66: P. 15.
7. Larock, R. C., *Comprehensive Organic Transformations: A Guide To Functional Group Preparations*, 2nd Ed. 1999: Wiley-Vch New York.
8. Brandrup, J., Et Al., *Polymer Handbook*. Vol. 89. 1999: Wiley New York.
9. Liu, F., Et Al., *Progress In The Production And Modification Of Pvdf Membranes*. Journal Of Membrane Science, 2011. 375(1): P. 1-27.
10. Connor, E. E. A., *Pharmaceutical Compositions Comprising Crosslinked Polyamine Polymers,* 2008: Us.
11. Gokmen, M. T. And F. E. Du Prez, *Porous Polymer Particles—A Comprehensive Guide To Synthesis, Characterization, Functionalization And Applications*. Progress In Polymer Science, 2012. 37(3): P. 365-405.
12. Strathmann, H., L. Giorno, And E. Drioli, *An Introduction To Membrane Science And Technology.* 2011: Wiley.
13. Liu, Y., Et Al., *Pamam Dendrimers Undergo Ph Responsive Conformational Changes Without Swelling*. Journal Of The American Chemical Society, 2009. 131(8): P. 2798-2799.
14. Van Krevelen, D. W. And K. Te Nijenhuis, *Properties Of Polymers: Their Correlation With Chemical Structure; Their Numerical Estimation And Prediction From Additive Group Contributions.* 2009: Elsevier Science.
15. Frechet, J. M., *Functional Polymers And Dendrimers: Reactivity, Molecular Architecture, And Interfacial Energy*. Science, 1994. 263(5154): P. 1710-5.
16. Fréchet, J. M. J. And D. A. Tomalia, *Dendrimers And Other Dendritic Polymers.* 2001: Wiley New York.
17. Tomalia, D. A., S. Henderson, And M. Diallo, *Dendrimers—An Enabling Synthetic Science To Controlled Organic Nanostructures*, In *Handbook Of Nanoscience, Engineering And Technology*, W. A. Goddard Iii., Et Al., Editors. 2007, Crc Press Boca Raton, Fl: Boca Raton, Fl. P. 24.1-24.47.
18. Ke, F.-Y., X.-L. Mo, And D.-H. Liang, *Effect Of Overlap Concentration And Persistence Length On Dna Separation In Polymer Solutions By Electrophoresis*. Chinese Journal Of Polymer Science, 2009. 27(5): P. 601-610.
19. Diallo, M. S., *Water Treatment By Dendrimer Enhanced Filtration*, 2008.
20. Diallo, M. S., *Water Treatment By Dendrimer-Enhanced Filtration: Principles And Applications*, In *Nanotechnology Applications For Clean Water*, N. Savage, Et Al., Editors. 2008, William Andrew Applied Science Publishers. P. 143-155.
21. Diallo, M. S., Et Al., *Dendritic Chelating Agents. 2. U(Vi) Binding To Poly(Amidoamine) And Poly(Propyleneimine) Dendrimers In Aqueous Solutions*. Environ Sci Technol, 2008. 42(5): P. 1572-9.
22. Diallo, M. S., Et Al., *Dendritic Anion Hosts: Perchlorate Uptake By G5-Nh2 Poly(Propyleneimine) Dendrimer In Water And Model Electrolyte Solutions*. Environ Sci Technol, 2007. 41(18): P. 6521-7.
23. Diallo, M. S., Et Al., *Dendrimer Enhanced Ultrafiltration. 1. Recovery Of Cu (Ii) From Aqueous Solutions Using Pamam Dendrimers With Ethylene Diamine Core And Terminal Nh2 Groups*. Environmental Science & Technology, 2005. 39(5): P. 1366-1377.
24. Diallo, M. S., Et Al., *Dendritic Chelating Agents. 1. Cu(Ii) Binding To Ethylene Diamine Core Poly(Amidoamine) Dendrimers In Aqueous Solutions*. Langmuir, 2004. 20(7): P. 2640-51.
25. Maiti, P. K. And W. A. Goddard Iii, *Solvent Quality Changes The Structure Of G8 Pamam Dendrimer, A Disagreement With Some Experimental Interpretations*. The Journal Of Physical Chemistry B, 2006. 110(51): P. 25628-25632.
26. Maiti, P. K., Et Al., *Effect Of Solvent And Ph On The Structure Of Pamam Dendrimers*. Macromolecules, 2005. 38(3): P. 979-991.
27. Lin, S. T., Et Al., *Thermodynamic Stability Of Zimmerman Self-Assembled Dendritic Supramolecules From Atomistic Molecular Dynamics Simulations*. The Journal Of Physical Chemistry B, 2004. 108(28): P. 10041-10052.
28. Li, Y., S. T. Lin, And W. A. Goddard Iii, *Efficiency Of Various Lattices From Hard Ball To Soft Ball: Theoretical Study Of Thermodynamic Properties Of Dendrimer Liquid Crystal From Atomistic Simulation*. Journal Of The American Chemical Society, 2004. 126(6): P. 1872-1885.
29. Frechet, J., Et Al., *Extraction Of Anions From Solutions And Mixtures Using Hyperbranched Macromolecules*, 2009.

30. Zhao, Y. H., Et Al., *Porous Membranes Modified By Hyperbranched Polymers: I. Preparation And Characterization Of Pvdf Membrane Using Hyperbranched Polyglycerol As Additive*. Journal Of Membrane Science, 2007. 290(1): P. 222-229.
31. H, B., *Removal Of Heavy Metal Ions From Aqueous Solutions By Filtration With A Novel Complexing Membrane Containing Poly(Ethyleneimine) In A Poly(Vinyl Alcohol) Matrix*. J. Membr. Sci., 2008. 307: P. 249-259.
32. Yoo, H., *Surface Functionalization Of Ptfe Membranes With Hyperbranched Poly(Amidoamine) For The Removal Of Cu2+ Ions From Aqueous Solution*. J. Membr. Sci., 2013. 448: P. 125-134.
33. Chen, D. P., *Branched Polymeric Media: Perchlorate-Selective Resins From Hyperbranched Polyethyleneimine*. Environ Sci Technol, 2012. 46: P. 9.
34. Kotte, M. R., M. Cho, And M. S. Diallo, *A Facile Route To The Preparation Of Mixed Matrix Polyvinylidene Fluoride Membranes With<I> In</I>-<I>Situ<II>Generated Polyethyleneimine Particles*. Journal Of Membrane Science, 2014. 450: P. 93-102.
35. Chen, D. P., Et Al., *Branched Polymeric Media: Perchlorate-Selective Resins From Hyperbranched Polyethyleneimine*. Environ Sci Technol, 2012. 46(19): P. 10718-26.
36. Abramoff, M. D., P. J. Magalhães, And S. J. Ram, *Image Processing With Imagej*. Biophotonics International, 2004. 11(7): P. 36-43.
37. Barrett, E. P., L. G. Joyner, And P. P. Halenda, *The Determination Of Pore Volume And Area Distributions In Porous Substances. I. Computations From Nitrogen Isotherms*. Journal Of The American Chemical Society, 1951. 73(1): P. 373-380.
38. Park, S. J., Et Al., *Nanofiltration Membranes Based On Polyvinylidene Fluoride Nanofibrous Scaffolds And Crosslinked Polyethyleneimine Networks*. Journal Of Nanoparticle Research, 2012. 14(7): P. 1-14.
39. Ottaviani, M. F., Et Al., *Characterization Of Starburst Dendrimers By The Epr Technique. Copper (Ii) Ions Binding Full-Generation Dendrimers*. The Journal Of Physical Chemistry B, 1997. 101(2): P. 158-166.
40. Diallo, M. S., Et Al., *Poly (Amidoamine) Dendrimers: A New Class Of High Capacity Chelating Agents For Cu (Ii) Ions*. Environmental Science & Technology, 1999. 33(5): P. 820-824.
41. Zhou, L., Et Al., *Characterization Of Poly (Amidoamine) Dendrimers And Their Complexes With Cu2+ By Matrix-Assisted Laser Desorption Ionization Mass Spectrometry*. Macromolecules, 2001. 34(11): P. 3567-3573.
42. Mishra, H., Et Al., *Branched Polymeric Media: Boron-Chelating Resins From Hyperbranched Polyethylenimine*. Environ Sci Technol, 2012. 46(16): P. 8998-9004.
43. Kotte, M. R., Et Al., *A One-Pot Method For The Preparation Of Mixed Matrix Polyvinylidene Fluoride Membranes With In Situ Synthesized And Pegylated Polyethyleneimine Particles*. Journal Of Membrane Science, 2015. 474: P. 277-287.
44. Hwang, T., Et Al., *Microalgae Recovery By Ultrafiltration Using Novel Fouling-Resistant Pvdf Membranes With In Situ Pegylated Polyethyleneimine Particles*. Water Research, 2015. 73: P. 181-192.
45. Diallo, M. S., N. A. Fromer, And M. S. Jhon, *Nanotechnology For Sustainable Development: Retrospective And Outlook*. Journal Of Nanoparticle Research, 2013. 15(11): P. 1-16.
46. Zhang, W., Et Al., *Characterization Of Dissolved Organic Matters Responsible For Ultrafiltration Membrane Fouling In Algal Harvesting*. Algal Research, 2013. 2(3): P. 223-229.
47. Popescu, M.-C., Et Al., *Characterization By Fourier Transform Infrared Spectroscopy (Ft-Ir) And 2d Ir Correlation Spectroscopy Of Pamam Dendrimer*. The Journal Of Physical Chemistry B, 2006. 110(29): P. 14198-14211.
48. Tran, M. L., L. R. Gahan, And I. R. Gentle, *Structural Studies Of Copper (Ii)-Amine Terminated Dendrimer Complexes By Exafs*. The Journal Of Physical Chemistry B, 2004. 108(52): P. 20130-20136.
49. Krot, K. A., Et Al., *Speciation, Stability Constants And Structures Of Complexes Of Copper (Ii), Nickel (Ii), Silver (I) And Mercury (Ii) With Pamam Dendrimer And Related Tetraamide Ligands*. Inorganica Chimica Acta, 2005. 358 (12): P. 3497-3505.
50. Camarada, M., Et Al., *Computational Study Of The Complexation Of Metals Ions With Poly (Amidoamine) Pamam G0 Dendrimers*. Chemical Physics Letters, 2014. 616: P. 171-177.
51. Boccaccio, T., Et Al., *Characterization Of Pvdf Membranes By Vibrational Spectroscopy*. Journal Of Membrane Science, 2002. 210(2): P. 315-329.
52. Scott, R. W. J., *Synthesis, Characterization, And Applications Of Dendrimer-Encapsulated Nanoparticles*. J. Phys. Chem. B, 2005. 109: P. 13.
53. Stephenson, C. J., *Pt@Zif-8 Composite For The Regioselective Hydrogenation Of Terminal Unsaturations In 1,3-Dienes And Alkynes*. Inorg. Chem. Front., 2015. 2.
54. Bronstein, L. M., *Dendrimers As Encapsulating, Stabilizing, Or Directing Agents For Inorganic Nanoparticles*. Chem. Rev., 2011. 111: P. 44.
55. Constentin, C., *Catalysis Of The Electrochemical Reduction Of Carbon Dioxide*. Chem. Soc. Rev., 2013. 42: P. 4.

The invention claimed is:
1. A mixed matrix filtration membrane comprising:
a plurality of dendrimer particles embedded in a polymer matrix,
wherein each of the plurality of dendrimer particles comprises at least two dendrimers crosslinked to one another to form a supercontainer structure, each dendrimer having
a core chemical moiety having a core multiplicity Nc;
branch cell units attached to the core chemical moiety or one to another, with the branch cell units having a branch cells multiplicity Nb; and
a number of terminal functional groups presented on terminal branch cell units, wherein the number of terminal functional groups is
$Z = N_c N_b^G$ with $G \leq 3$, and
wherein terminal branch cell units of the at least two dendrimers are stoichiometrically crosslinked through terminal functional groups thus forming the supercontainer structure within the each of the plurality of dendrimer particles.

2. The mixed matrix filtration membrane of claim 1, wherein the at least two dendrimers comprise a polymer of formula

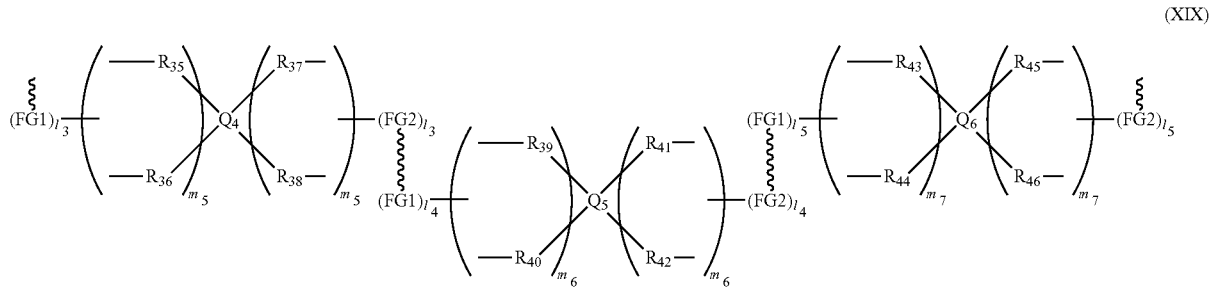

(XIX)

wherein $Q_4$, $Q_5$ and $Q_6$ are independently a core, having a formula selected from:

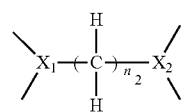

(XII)

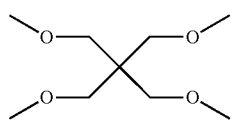

(XIII)

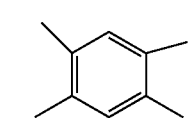

(XIV)

wherein $n_2$ is an integer from 1 to 18; DC-87,Cl
$X_1$ and $X_2$ are N $R_{35}$-$R_{46}$ are independently a branch cell comprising a head attachment atom and one to four tail attachment atoms joined to form a chemical moiety wherein the head attachment atom and one to four tail attachment atoms are linked by covalent bond, the branch cell unit chemical moiety comprising amidoamine groups and/or ester hydroxyl groups;

FG1 and FG2 are terminal functional groups, independently selected from amines, hydroxyl group, carboxylic acids, azides, thiols, diacetylenyl, and acrylates;

$m_5$, $m_6$, or $m_7$ are independently an integer selected from 1-4; and $l_3$ is equal to $2 \times m_5$; $l_4$ is equal to $2 \times m_6$; $l_5$ is equal to $2 \times m_7$.

3. The mixed matrix filtration membrane of claim 1, wherein the polymer matrix is formed by a polymeric aggregate of a polymer component according to Formula (1):

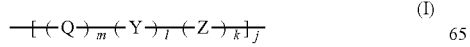

(I)

wherein:
Q, Y, and Z comprise saturated aliphatic hydrocarbon, aromatic hydrocarbon, or unsaturated aliphatic hydrocarbons;
m, l, and k independently are integers ranging between 0-50;
at least one of m, I, k is not equal to zero;
j is an integer ranging between 50-500; and
at least one of Q (when m is greater than zero), Y (when I is greater than zero), or Z (when k is greater than zero), comprises the polymer component functional group.

4. The mixed matrix filtration membrane of claim 3, wherein each of Q, Y, and Z of Formula I has a formula independently selected from the group consisting of Formulas II-X

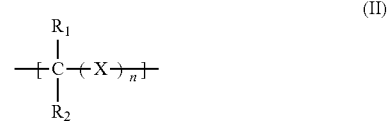

(II)

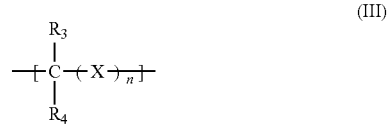

(III)

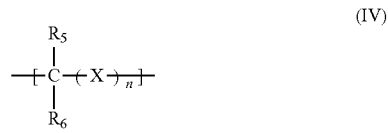

(IV)

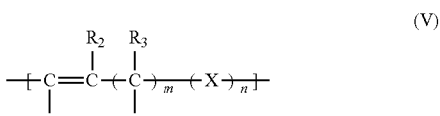

(V)

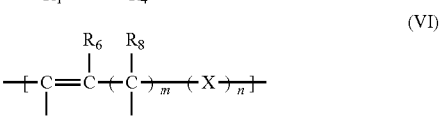

(VI)

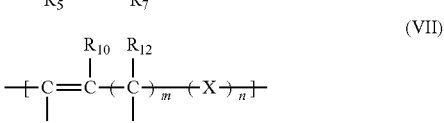

(VII)

-continued

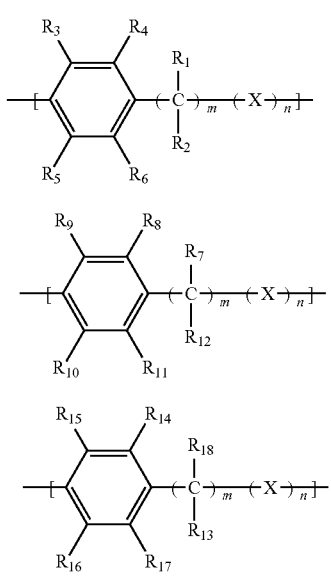

(XVIII)

(IX)

(X)

wherein:
n=0 or 1;
m is an integer ranging from 0-15;
X is a functional group comprising an atom selected from O, S, N, P, or F; and
$R_1$-$R_{18}$ are independently selected from: the polymer component functional group; hydrogen; $C_1$-$C_{20}$ linear, branched, saturated, unsaturated, or aryl hydrocarbon which are either substituted or unsubstituted with O, N, F, S, P; or substituted O, N, F, S, or P.

5. The mixed matrix filtration membrane of claim 1, wherein the dendrimer particles embedded in the polymer matrix are in a concentration of greater than 20 wt %.

6. The mixed matrix filtration membrane of claim 1, wherein the dendrimer particles embedded in the polymer matrix are in a concentration of greater than 40 wt %.

7. The mixed matrix filtration membrane of claim 1, wherein the mixed matrix filtration membrane is a membrane absorber capable of binding metal.

8. The mixed matrix filtration membrane of claim 7, wherein the membrane absorber is capable of binding metal with a mean percentage of bound metal of larger than 50%.

9. The mixed matrix filtration membrane of claim 1, wherein G is equal to 1 or 2.

10. The mixed matrix filtration membrane of claim 1, wherein the at least two dendrimers comprise one or more dendrimers selected from the group consisting of low generation PAMAM, low generation PPI, low generation 2,2-bis(methylol)propionic acid (bis-MPA), and low generation 2 cyclotriphosphazene-phenoxymethyl(methylhydrazono) (PMMH).

11. The mixed matrix filtration membrane of claim 1, wherein the at least two dendrimers comprise one or more dendrimers selected from the group consisting of G0 PAMAM, G1 PAMAM, G2 PAMAM, G1 poly(propyleneimine) (PPI), G2 poly(propyleneimine) (PPI), and G1 PMMH.

* * * * *